United States Patent
Presley et al.

(10) Patent No.: US 12,340,434 B2
(45) Date of Patent: Jun. 24, 2025

(54) INFORMATION MONITORING SYSTEM AND METHOD

(71) Applicant: Gudea, Inc., Baltimore, MD (US)

(72) Inventors: Keith C. Presley, Baltimore, MD (US); James D. Thomin, Fort Walton Beach, FL (US); Beshoy S. Girgis, Kansas City, MO (US); Douglas E. Sheffer, Durham, NC (US); Tyler A. Bohl, Rockville, MD (US); Tyler J. Redenbaugh, Des Moines, IA (US); Jonathan Sperber, Gaithersburg, MD (US)

(73) Assignee: GUDEA, INC., Baltimore, MD (US)

( * ) Notice: Subject to any disclaimer, the term of this patent is extended or adjusted under 35 U.S.C. 154(b) by 0 days.

(21) Appl. No.: 18/540,820

(22) Filed: Dec. 14, 2023

(65) Prior Publication Data

US 2024/0202268 A1    Jun. 20, 2024

Related U.S. Application Data

(60) Provisional application No. 63/387,885, filed on Dec. 16, 2022, provisional application No. 63/489,816, filed on Mar. 13, 2023.

(51) Int. Cl.
*G06F 16/906* (2019.01)
*G06F 16/93* (2019.01)
(Continued)

(52) U.S. Cl.
CPC ......... *G06Q 50/265* (2013.01); *G06F 16/906* (2019.01); *G06F 16/93* (2019.01); *G06F 16/951* (2019.01); *G06F 16/9536* (2019.01); *G06F 16/957* (2019.01); *G06F 16/958* (2019.01); *G06F 21/50* (2013.01); *G06F 21/606* (2013.01); *G06F 40/20* (2020.01); *G06N 20/00* (2019.01);
(Continued)

(58) Field of Classification Search
CPC ..... G06Q 50/265; G06F 16/906; G06F 16/93; G06F 16/951; G06F 16/957; G06F 16/958
USPC ........................................................ 707/607
See application file for complete search history.

(56) References Cited

U.S. PATENT DOCUMENTS 8,296,380 B1    10/2012    Kelly et al.
9,201,955 B1    12/2015    Quintao et al.
(Continued)

FOREIGN PATENT DOCUMENTS

AU    2014274810 A1    4/2016
WO    2017/087833 A1    5/2017

OTHER PUBLICATIONS

International Search Report and Written Opinion issued in related Application Serial No. PCT/US2023/084282 on Apr. 3, 2024.
(Continued)

*Primary Examiner* — Kuen S Lu
(74) *Attorney, Agent, or Firm* — Brian J. Colandreo; Jeffrey T. Placker; Holland & Knight LLP

(57) ABSTRACT

A method, computer program product, and computing system for: identifying a piece of content within a first content platform to be monitored for propagation; and determining a likelihood of propagation for the piece of content, wherein the likelihood of propagation concerns the piece of content propagating with respect to the first content platform.

30 Claims, 22 Drawing Sheets

(51) Int. Cl.
| | |
|---|---|
| *G06F 16/951* | (2019.01) |
| *G06F 16/9536* | (2019.01) |
| *G06F 16/957* | (2019.01) |
| *G06F 16/958* | (2019.01) |
| *G06F 21/50* | (2013.01) |
| *G06F 21/60* | (2013.01) |
| *G06F 40/20* | (2020.01) |
| *G06N 20/00* | (2019.01) |
| *G06Q 30/0251* | (2023.01) |
| *G06Q 50/00* | (2012.01) |
| *G06Q 50/26* | (2012.01) |
| *H04L 9/40* | (2022.01) |
| *H04L 43/08* | (2022.01) |
| *H04L 67/306* | (2022.01) |
| *H04L 67/50* | (2022.01) |
| *H04L 67/53* | (2022.01) |
| *H04N 21/442* | (2011.01) |

(52) U.S. Cl.
CPC ..... *G06Q 30/0252* (2013.01); *G06Q 30/0256* (2013.01); *G06Q 50/01* (2013.01); *H04L 43/08* (2013.01); *H04L 63/1425* (2013.01); *H04L 67/306* (2013.01); *H04L 67/53* (2022.05); *H04L 67/535* (2022.05); *H04N 21/44204* (2013.01)

(56) References Cited

U.S. PATENT DOCUMENTS

| | | | |
|---|---|---|---|
| 11,107,130 | B1 | 8/2021 | Wu et al. |
| 11,195,107 | B1 | 12/2021 | Jiang et al. |
| 11,443,197 | B2 | 9/2022 | Xu et al. |
| 12,001,489 | B1 | 6/2024 | Malur et al. |
| 2005/0273702 | A1 | 12/2005 | Trabucco |
| 2009/0210245 | A1 | 8/2009 | Wold |
| 2009/0327282 | A1 | 12/2009 | Wittig et al. |
| 2011/0258044 | A1 | 10/2011 | Kargupta |
| 2012/0046995 | A1 | 2/2012 | Petersen |
| 2012/0158630 | A1* | 6/2012 | Zaman ............... G06N 5/04 709/224 |
| 2012/0166452 | A1 | 6/2012 | Tseng |
| 2013/0024944 | A1 | 1/2013 | Sasaki |
| 2013/0054357 | A1 | 2/2013 | Mager et al. |
| 2013/0073336 | A1 | 3/2013 | Heath |
| 2013/0132158 | A1 | 5/2013 | L'Huillier et al. |
| 2014/0019443 | A1 | 1/2014 | Golshan |
| 2014/0059185 | A1 | 2/2014 | Siripurapu et al. |
| 2014/0088944 | A1 | 3/2014 | Natarajan et al. |
| 2014/0156681 | A1 | 6/2014 | Lee et al. |
| 2014/0164398 | A1 | 6/2014 | Smith et al. |
| 2014/0365349 | A1 | 12/2014 | Kennon |
| 2015/0020170 | A1 | 1/2015 | Talley |
| 2015/0046151 | A1 | 2/2015 | Lane et al. |
| 2015/0067076 | A1 | 3/2015 | Bounds et al. |
| 2015/0234928 | A1* | 8/2015 | Krishnamurthy ..... G06F 16/284 707/709 |
| 2015/0244682 | A1 | 8/2015 | Biswas et al. |
| 2015/0310018 | A1 | 10/2015 | Fan et al. |
| 2016/0048556 | A1* | 2/2016 | Kelly ............... G06Q 10/10 707/767 |
| 2016/0191447 | A1 | 6/2016 | Firat et al. |
| 2016/0224666 | A1 | 8/2016 | Horvitz et al. |
| 2016/0294753 | A1 | 10/2016 | Centner |
| 2016/0323643 | A1 | 11/2016 | Panchaksharaiah et al. |
| 2016/0380954 | A1 | 12/2016 | Dugan et al. |
| 2017/0200093 | A1 | 7/2017 | Motahari Nezhad |
| 2017/0295244 | A1 | 10/2017 | Borisova et al. |
| 2017/0331909 | A1 | 11/2017 | Iadonisi et al. |
| 2018/0013772 | A1 | 1/2018 | Schmidtler et al. |
| 2018/0025365 | A1 | 1/2018 | Wilkinson et al. |
| 2018/0054411 | A1 | 2/2018 | Halliday et al. |
| 2018/0096417 | A1 | 4/2018 | Cook et al. |
| 2018/0246888 | A1 | 8/2018 | Zholudev et al. |
| 2018/0287989 | A1 | 10/2018 | Hardee et al. |
| 2018/0315094 | A1 | 11/2018 | Ashoori et al. |
| 2019/0012374 | A1 | 1/2019 | Petroni et al. |
| 2019/0026786 | A1 | 1/2019 | Khoury et al. |
| 2019/0034820 | A1 | 1/2019 | Manning et al. |
| 2019/0179861 | A1* | 6/2019 | Goldenstein ........ G06F 16/9535 |
| 2019/0197479 | A1 | 6/2019 | Huang et al. |
| 2019/0342368 | A1 | 11/2019 | Kidambi et al. |
| 2020/0104417 | A1 | 4/2020 | Fox et al. |
| 2020/0125838 | A1 | 4/2020 | Dalley, Jr. et al. |
| 2020/0258147 | A1 | 8/2020 | Song et al. |
| 2020/0286463 | A1 | 9/2020 | Galitsky |
| 2020/0372067 | A1 | 11/2020 | Otero et al. |
| 2021/0049441 | A1* | 2/2021 | Bronstein ............... G06F 17/11 |
| 2021/0097240 | A1 | 4/2021 | Singh |
| 2021/0141897 | A1 | 5/2021 | Seifert et al. |
| 2021/0334908 | A1 | 10/2021 | Shu et al. |
| 2022/0045864 | A1 | 2/2022 | Heppe et al. |
| 2022/0058267 | A1 | 2/2022 | Chow |
| 2022/0222241 | A1 | 7/2022 | Coffing |
| 2022/0277261 | A1 | 9/2022 | Stollman et al. |
| 2022/0318847 | A1 | 10/2022 | Zenoff |
| 2023/0007063 | A1 | 1/2023 | Gupta et al. |
| 2023/0120223 | A1 | 4/2023 | Williams et al. |
| 2023/0334338 | A1 | 10/2023 | Moon et al. |
| 2024/0111616 | A1 | 4/2024 | Khemani et al. |
| 2024/0177255 | A1 | 5/2024 | Okamoto |
| 2024/0256107 | A1 | 8/2024 | Keel |
| 2025/0029472 | A1 | 1/2025 | Kawaguchi |

OTHER PUBLICATIONS

International Search Report and Written Opinion issued in related Application Serial No. PCT/US2023/084288 on Apr. 8, 2024.
International Search Report and Written Opinion issued in related Application Serial No. PCT/US2023/084302 on Apr. 8, 2024.
International Search Report and Written Opinion issued in related Application Serial No. PCT/US2023/084339 on Apr. 3, 2024.
International Search Report and Written Opinion issued in related Application Serial No. PCT/US2023/084311 on Apr. 12, 2024.
International Search Report and Written Opinion issued in related Application Serial No. PCT/US2023/084344 on Apr. 19, 2024.
International Search Report and Written Opinion issued in related Application Serial No. PCT/US2023/084381 on Issue Date; Apr. 1, 2024.
International Search Report and Written Opinion issued in related Application Serial No. PCT/US2023/084390 on Issue Date; Apr. 3, 2024.
International Search Report and Written Opinion issued in related Application Serial No. PCT/US2023/084397 on Apr. 12, 2024.
International Search Report and Written Opinion issued in related Application Serial No. PCT/US2023/084402 on Issue Date; Apr. 3, 2024.
Cha et al. "A Measurement-Driven Analysis of Information Propagation in the Flickr Social Network," WWW '09: Proceedings of the 18th International Conference on World Wide Web, pp. 721-730 (Year: 2009).
Non-Final Office Action issued in related U.S. Appl. No. 18/540,732 on Sep. 29, 2024.
Non-Final Office Action issued in related U.S. Appl. No. 18/540,793 on Sep. 10, 2024.
Non-Final Office Action issued in related U.S. Appl. No. 18/540,812 on Oct. 17, 2024.
Non-Final Office Action issued in related U.S. Appl. No. 18/540,816 on issue Aug. 28, 2024.
Non-Final Office Action issued in related U.S. Appl. No. 18/541,099 on Sep. 10, 2024.
Final Office Action issued in related U.S. Appl. No. 18/540,793 on Jan. 3, 2025.
Non-Final Office Action issued in related U.S. Appl. No. 18/540,781 on Dec. 18, 2024.
Non-Final Office Action issued in related U.S. Appl. No. 18/541,043 on Jan. 29, 2025.

(56) References Cited

OTHER PUBLICATIONS

Non-Final Office Action issued in related U.S. Appl. No. 18/541,200 on Dec. 17, 2024.
Non-Final Office Action issued in related U.S. Appl. No. 18/541,209 on Dec. 19, 2024.
Ruxandra Paun, Methods, systems, and media for prompting influential users to promote content (English (United States)), The IP.com Prior Art Database, May 15, 2014 (Year: 2014).
Final Office Action issued in related U.S. Appl. No. 18/540,732 on Mar. 10, 2025.
Final Office Action issued in related U.S. Appl. No. 18/540,781 on Apr. 9, 2025.
Final Office Action issued in related U.S. Appl. No. 18/540,812 on Feb. 20, 2025.
Final Office Action issued in related U.S. Appl. No. 18/540,816 on Mar. 25, 2025.
Non-Final Office Action issued in related U.S. Appl. No. 18/541,200 on Mar. 27, 2025.

* cited by examiner

INFORMATION MONITORING SYSTEM AND METHOD

RELATED APPLICATION(S)

This application claims the benefit of U.S. Provisional Application No. 63/387,885, filed on 16 Dec. 2022 and U.S. Provisional Application No. 63/489,816, filed on 13 Mar. 2023, the entire contents of which are incorporated herein by reference.

TECHNICAL FIELD

This disclosure relates to information systems and methods and, more particularly, to information systems and methods that monitor the spread of information through a system/network.

BACKGROUND

The dissemination of information on the internet is a multifaceted process shaped by various technological, social, and psychological factors. In this digital age, information is transmitted swiftly through diverse online channels such as social media platforms, news websites, forums, blogs, and messaging apps. The speed and reach of information have dramatically increased, allowing news—whether accurate or not—to reach a global audience within seconds. Social media platforms play a pivotal role in this process, as users share content and algorithms amplify popular or sensationalized posts, contributing to their visibility. However, these platforms also give rise to filter bubbles and echo chambers, where users are exposed to information that aligns with their existing beliefs, reinforcing their perspectives.

The virality of information is often fueled by sensational or emotionally charged content, and misleading headlines and clickbait contribute to the rapid spread of misinformation. Trust in information is influenced by social connections, with users often trusting content shared by friends or contacts, even if it lacks reliability. Cognitive biases, such as confirmation bias, further contribute to the acceptance and propagation of misinformation. Beyond unintentional dissemination, deliberate efforts to spread false information occur through disinformation campaigns. These campaigns, orchestrated by malicious actors, use tactics such as bots, fake accounts, and coordination to amplify false narratives for specific purposes, such as influencing public opinion or sowing discord.

The problems associated with misinformation and disinformation are significant and wide-ranging. They include public misunderstanding, social division, health risks, political manipulation, economic impact, and security threats. Misinformation can lead to widespread misconceptions, shape public opinion, and even impact policy decisions. Disinformation, in particular, can contribute to social polarization and undermine democratic processes. False information about health topics can have serious consequences, while economic instability and security threats can arise from misinformation about companies or nations. To address these challenges, strategies for combating misinformation and disinformation include promoting media literacy, fact-checking, holding online platforms accountable, enhancing education and awareness, and increasing transparency regarding algorithms and content moderation policies. Understanding the dynamics of information spread on the internet is essential for developing effective measures to mitigate the negative consequences of misinformation and disinformation.

SUMMARY OF DISCLOSURE

9) Determining a Likelihood of Propagation

In one implementation, a computer-implemented method is executed on a computing device and includes: identifying a piece of content within a first content platform to be monitored for propagation; and determining a likelihood of propagation for the piece of content, wherein the likelihood of propagation concerns the piece of content propagating with respect to the first content platform.

One or more of the following features may be included. The first content platform may include one or more of: one or more social media platforms; one or more websites; one or more video-sharing platforms; one or more virtual reality platforms; one or more gaming platforms; one or more messaging platforms; one or more financial platforms; and one or more blog platforms. Determining a likelihood of propagation for the piece of content may include one or more of: determining a likelihood that the piece of content will propagate within the first content platform; and determining a likelihood that the piece of content will propagate from the first content platform to other content platforms. Determining a likelihood of propagation for the piece of content may include one or more of: utilizing a graph neural network and/or graph database to identify connections between parties; defining telemetry data for the piece of content; and analyzing the language included within the piece of content. Determining a likelihood of propagation for the piece of content may include one or more of: determining a publisher of the piece of content; identifying what groups/subgroups the publisher of the piece of content belongs to; identifying financial supporters/backers of the publisher of the piece of content; determining if the publisher of the piece of content is included in a bad actor database; determining a publication history for the publisher of the piece of content; determining a notoriety status for the publisher of the piece of content; determining an audience status for the publisher of the piece of content; and determining an influence status for the publisher of the piece of content. The propagation of the piece of content may be monitored from the first content platform to other content platforms. The other content platforms may include one or more of: one or more social media platforms; one or more websites; one or more video-sharing platforms; one or more virtual reality platforms; one or more gaming platforms; one or more messaging platforms; one or more financial platforms; and one or more blog platforms. Monitoring the propagation of the piece of content from the first content platform to other content platforms may include: temporally monitoring the propagation of the piece of content from the first content platform to other content platforms at intervals over a defined period of time. Monitoring the propagation of the piece of content from the first content platform to other content platforms may include: generally monitoring the propagation of the piece of content from the first content platform to other content platforms. Monitoring the propagation of the piece of content from the first content platform to other content platforms may include: specifically monitoring the propagation of the piece of content from the first content platform to other content platforms.

In another implementation, a computer program product resides on a computer readable medium and has a plurality of instructions stored on it. When executed by a processor, the instructions cause the processor to perform operations including: identifying a piece of content within a first content platform to be monitored for propagation; and determining a likelihood of propagation for the piece of content, wherein the likelihood of propagation concerns the piece of content propagating with respect to the first content platform.

One or more of the following features may be included. The first content platform may include one or more of: one or more social media platforms; one or more websites; one or more video-sharing platforms; one or more virtual reality platforms; one or more gaming platforms; one or more messaging platforms; one or more financial platforms; and one or more blog platforms. Determining a likelihood of propagation for the piece of content may include one or more of: determining a likelihood that the piece of content will propagate within the first content platform; and determining a likelihood that the piece of content will propagate from the first content platform to other content platforms. Determining a likelihood of propagation for the piece of content may include one or more of: utilizing a graph neural network and/or graph database to identify connections between parties; defining telemetry data for the piece of content; and analyzing the language included within the piece of content. Determining a likelihood of propagation for the piece of content may include one or more of: determining a publisher of the piece of content; identifying what groups/subgroups the publisher of the piece of content belongs to; identifying financial supporters/backers of the publisher of the piece of content; determining if the publisher of the piece of content is included in a bad actor database; determining a publication history for the publisher of the piece of content; determining a notoriety status for the publisher of the piece of content; determining an audience status for the publisher of the piece of content; and determining an influence status for the publisher of the piece of content. The propagation of the piece of content may be monitored from the first content platform to other content platforms. The other content platforms may include one or more of: one or more social media platforms; one or more websites; one or more video-sharing platforms; one or more virtual reality platforms; one or more gaming platforms; one or more messaging platforms; one or more financial platforms; and one or more blog platforms. Monitoring the propagation of the piece of content from the first content platform to other content platforms may include: temporally monitoring the propagation of the piece of content from the first content platform to other content platforms at intervals over a defined period of time. Monitoring the propagation of the piece of content from the first content platform to other content platforms may include: generally monitoring the propagation of the piece of content from the first content platform to other content platforms. Monitoring the propagation of the piece of content from the first content platform to other content platforms may include: specifically monitoring the propagation of the piece of content from the first content platform to other content platforms.

In another implementation, a computing system includes a processor and memory is configured to perform operations including: identifying a piece of content within a first content platform to be monitored for propagation; and determining a likelihood of propagation for the piece of content, wherein the likelihood of propagation concerns the piece of content propagating with respect to the first content platform.

One or more of the following features may be included. The first content platform may include one or more of: one or more social media platforms; one or more websites; one or more video-sharing platforms; one or more virtual reality platforms; one or more gaming platforms; one or more messaging platforms; one or more financial platforms; and one or more blog platforms. Determining a likelihood of propagation for the piece of content may include one or more of: determining a likelihood that the piece of content will propagate within the first content platform; and determining a likelihood that the piece of content will propagate from the first content platform to other content platforms. Determining a likelihood of propagation for the piece of content may include one or more of: utilizing a graph neural network and/or graph database to identify connections between parties; defining telemetry data for the piece of content; and analyzing the language included within the piece of content. Determining a likelihood of propagation for the piece of content may include one or more of: determining a publisher of the piece of content; identifying what groups/subgroups the publisher of the piece of content belongs to; identifying financial supporters/backers of the publisher of the piece of content; determining if the publisher of the piece of content is included in a bad actor database; determining a publication history for the publisher of the piece of content; determining a notoriety status for the publisher of the piece of content; determining an audience status for the publisher of the piece of content; and determining an influence status for the publisher of the piece of content. The propagation of the piece of content may be monitored from the first content platform to other content platforms. The other content platforms may include one or more of: one or more social media platforms; one or more websites; one or more video-sharing platforms; one or more virtual reality platforms; one or more gaming platforms; one or more messaging platforms; one or more financial platforms; and one or more blog platforms. Monitoring the propagation of the piece of content from the first content platform to other content platforms may include: temporally monitoring the propagation of the piece of content from the first content platform to other content platforms at intervals over a defined period of time. Monitoring the propagation of the piece of content from the first content platform to other content platforms may include: generally monitoring the propagation of the piece of content from the first content platform to other content platforms. Monitoring the propagation of the piece of content from the first content platform to other content platforms may include: specifically monitoring the propagation of the piece of content from the first content platform to other content platforms.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

System Overview

Figure 1:
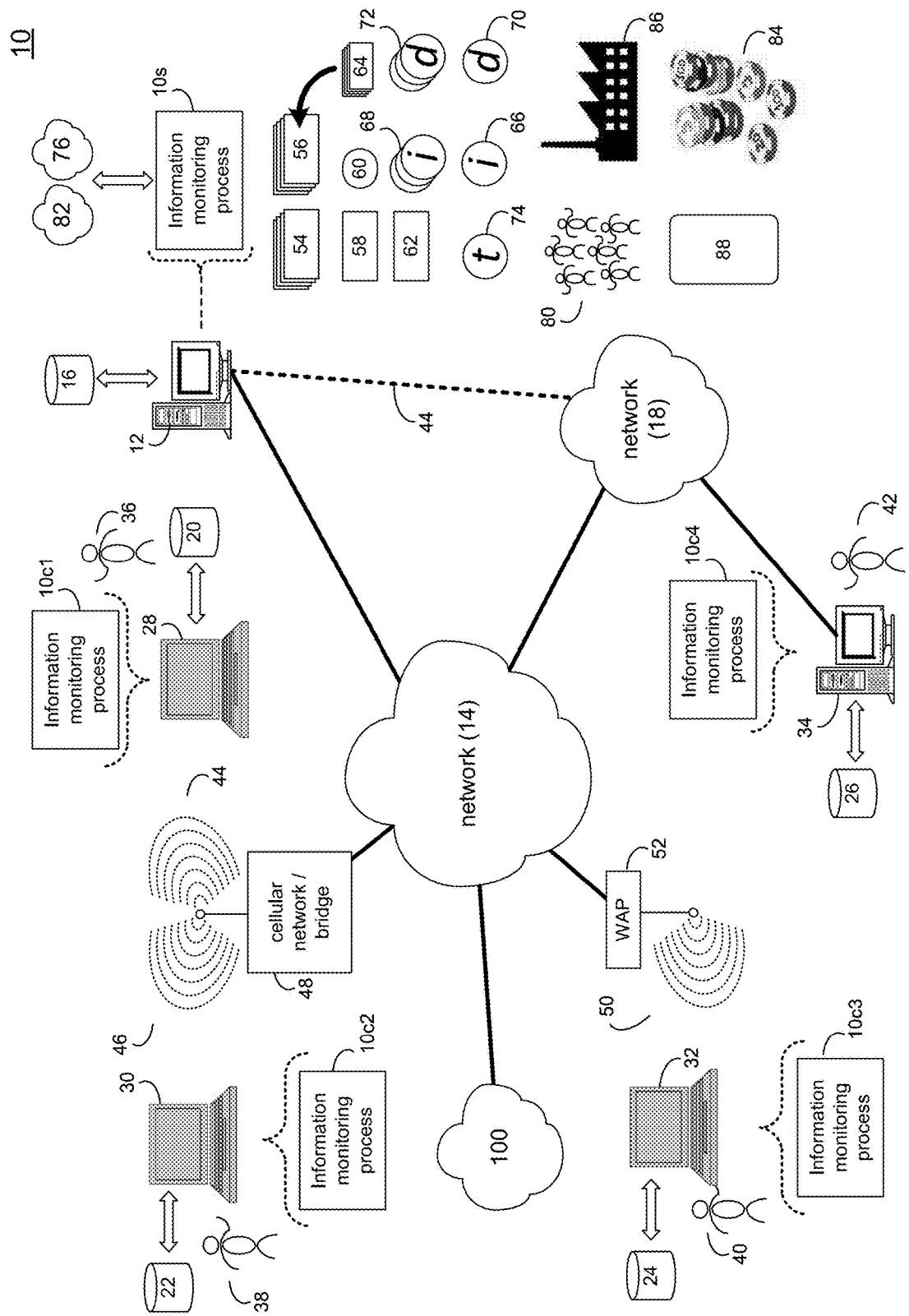
FIG. 1 is a diagrammatic view of a distributed computing network including a computing device that executes an information monitoring process according to an embodiment of the present disclosure.

Referring to FIG. 1, there is shown information monitoring process 10. Information monitoring process 10 may be implemented as a server-side process, a client-side process, or a hybrid server-side/client-side process. For example, information monitoring process 10 may be implemented as a purely server-side process via information monitoring process 10s. Alternatively, information monitoring process 10 may be implemented as a purely client-side process via one or more of information monitoring process 10c1, information monitoring process 10c2, information monitoring process 10c3, and information monitoring process 10c4. Alternatively still, information monitoring process 10 may be implemented as a hybrid server-side/client-side process via information monitoring process 10s in combination with one or more of information monitoring process 10c1, information monitoring process 10c2, information monitoring process 10c3, and information monitoring process 10c4. Accordingly, information monitoring process 10 as used in this disclosure may include any combination of information monitoring process 10s, information monitoring process 10c1, information monitoring process 10c2, information monitoring process 10c3, and information monitoring process 10c4.

Information monitoring process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a cloud-based computing platform.

The instruction sets and subroutines of information monitoring process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a RAID device; a random-access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of information monitoring processes 10c1, 10c2, 10c3, 10c4 may include but are not limited to a web browser, a game console user interface, a mobile device user interface, or a specialized application (e.g., an application running on e.g., the Android™ platform, the iOS™ platform, the Windows™ platform, the Linux™ platform or the UNIX™ platform). The instruction sets and subroutines of information monitoring processes 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; RAID devices; random access memories (RAM); read-only memories (ROM), and all forms of flash memory storage devices.

Examples of client electronic devices 28, 30, 32, 34 may include, but are not limited to, a smartphone (not shown), a personal digital assistant (not shown), a tablet computer (not shown), laptop computers 28, 30, 32, personal computer 34, a notebook computer (not shown), a server computer (not shown), a gaming console (not shown), and a dedicated network device (not shown). Client electronic devices 28, 30, 32, 34 may each execute an operating system, examples of which may include but are not limited to Microsoft Windows™, Android™, iOS™, Linux™, or a custom operating system.

Users 36, 38, 40, 42 may access information monitoring process 10 directly through network 14 or through secondary network 18. Further, information monitoring process 10 may be connected to network 14 through secondary network 18, as illustrated with link line 44.

The various client electronic devices (e.g., client electronic devices 28, 30, 32, 34) may be directly or indirectly coupled to network 14 (or network 18). For example, laptop computer 28 and laptop computer 30 are shown wirelessly coupled to network 14 via wireless communication channels 44, 46 (respectively) established between laptop computers 28, 30 (respectively) and cellular network/bridge 48, which is shown directly coupled to network 14. Further, laptop computer 32 is shown wirelessly coupled to network 14 via wireless communication channel 50 established between laptop computer 32 and wireless access point (i.e., WAP) 52, which is shown directly coupled to network 14. Additionally, personal computer 34 is shown directly coupled to network 18 via a hardwired network connection.

WAP 52 may be, for example, an IEEE 802.11a, 802.11b, 802.11g, 802.11n, Wi-Fi, and/or Bluetooth device that is capable of establishing wireless communication channel 50 between laptop computer 32 and WAP 52. As is known in the art, IEEE 802.11x specifications may use Ethernet protocol and carrier sense multiple access with collision avoidance (i.e., CSMA/CA) for path sharing. As is known in the art, Bluetooth is a telecommunications industry specification that allows e.g., mobile phones, computers, and personal digital assistants to be interconnected using a short-range wireless connection.

Information Monitoring Process Overview

As will be discussed below in greater detail, information monitoring process 10 may be configured to allow for monitoring and analyzing the flow & propagation of information & content across a communication network. Examples of such a communications network may include but are not limited to public networks (e.g., the internet) as well as various private networks (e.g., intranets, corporate networks, government networks). Examples of such information/content may include but is not limited to bad content (e.g., malinformation, misinformation, disinformation, hate speech, etc.) as well as good content (e.g., accurate information, complimentary information, newsworthy information, etc.).

Figure 2:
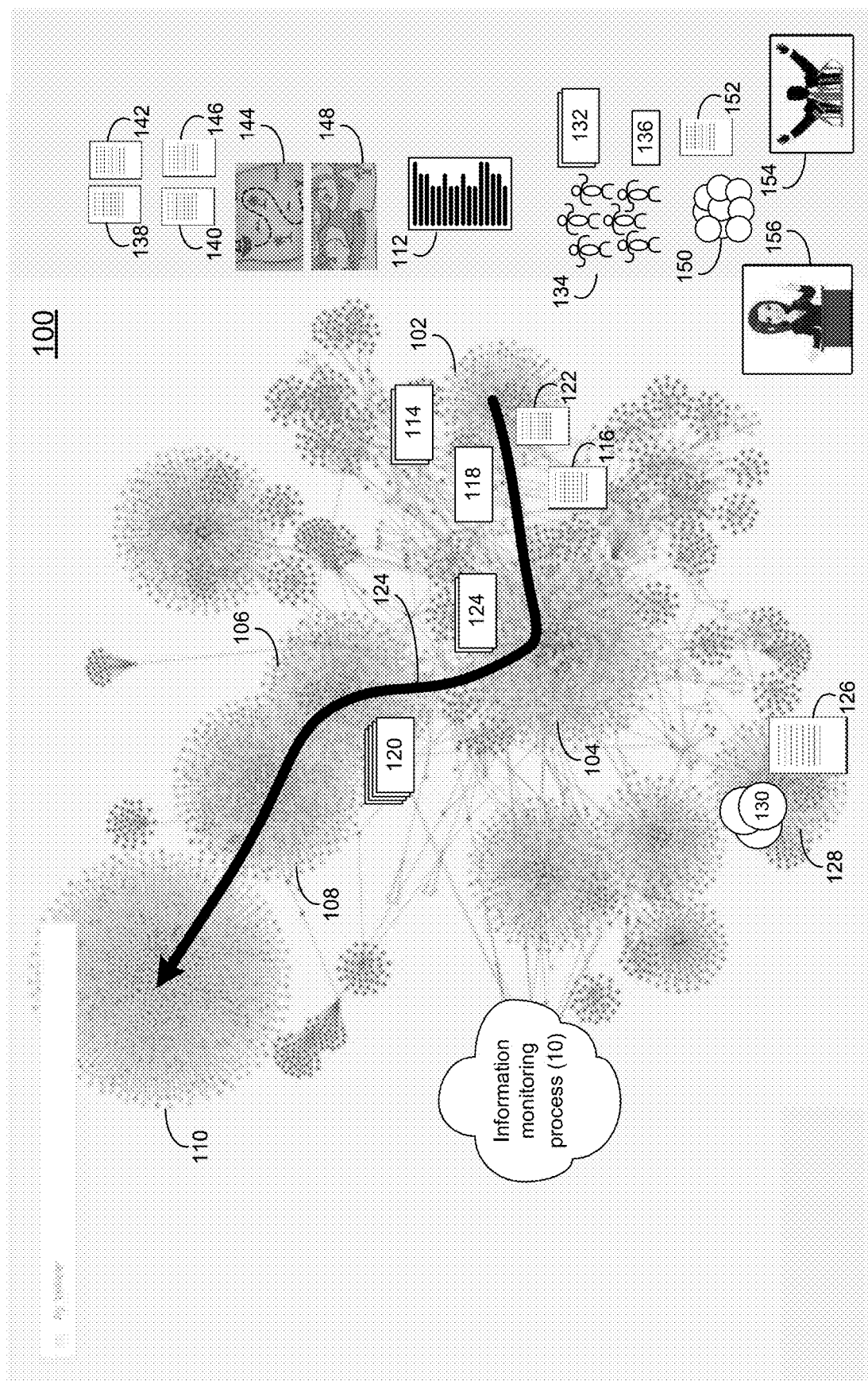
FIG. 2 is a diagrammatic view of a communications network that includes a plurality of communications platforms defined therein according to an embodiment of the present disclosure.

Communications Networks & Platforms (Generally):

Referring to FIG. 2, there is shown a general representation of a communications network (e.g., communications network 100). In this example, communications network 100 (e.g., the internet) is shown to include a plurality of communications platforms (e.g., platforms 102, 104, 106, 108, 110) defined therein.

Examples of such communication platforms (e.g., platforms 102, 104, 106, 108, 110) may include but are not limited to:

Social Media Platforms: Social media platforms refer to online spaces that enable users to create profiles, share content, and connect with others in a digital social network. Examples include Facebook, Instagram, Twitter, and LinkedIn. These platforms provide diverse functionalities such as photo and video sharing, status updates, and messaging, fostering communication, community building, and the dissemination of information on a global scale.

Websites: Websites constitute a collection of related web pages accessible through a common domain name. These pages can contain a variety of content, including text, images, multimedia, and interactive elements. Websites serve as a fundamental component of the online landscape, offering information, services, and resources across diverse topics and purposes.

Video-Sharing Platforms: Video-sharing platforms are online spaces dedicated to the uploading, sharing, and viewing of videos. Prominent examples include YouTube, Vimeo, and Dailymotion. These platforms provide content creators and users with a space to share a wide range of videos, from educational content and entertainment to vlogs and documentaries, contributing to the vast landscape of online video content.

Virtual Reality Platforms: Virtual reality platforms immerse users in computer-generated environments, often through the use of VR headsets or other immersive devices. These platforms, such as Oculus Rift, HTC Vive, or PlayStation VR, create a sense of presence and interaction within digital realms, offering experiences ranging from gaming and simulations to virtual tours and collaborative workspaces.

Gaming Platforms: Gaming platforms are digital environments that facilitate the playing of video games. These can include consoles like PlayStation, Xbox, and Nintendo, as well as PC gaming platforms. Gaming platforms provide the infrastructure and technology necessary for gamers to access, download, and play a wide variety of video games, contributing to the global gaming community.

Messaging Platforms: Messaging platforms encompass digital communication tools that allow users to exchange text, multimedia, and sometimes voice messages. Examples include WhatsApp, Telegram, and Facebook Messenger. These platforms enable real-time communication, fostering personal and group conversations, and often include additional features such as voice and video calls.

Blog Platforms: Blog platforms are online systems that facilitate the creation and publication of blogs. Popular examples include WordPress, Blogger, and Medium. These platforms empower individuals and organizations to share thoughts, opinions, and information through written content, often accompanied by multimedia elements. Blog platforms play a crucial role in shaping online discourse and providing diverse perspectives on a wide range of topics.

As could be imagined, these communication platforms (e.g., platforms 102, 104, 106, 108, 110) may include many reputable communication platforms, examples of which may include but are not limited to:

Email Services (e.g., Gmail, Outlook, Yahoo Mail)
Messaging Apps (e.g., WhatsApp, Signal, Facebook Messenger)
Video Conferencing (e.g., Zoom, Microsoft Teams, Google Meet, Cisco Webex)
Social Media Platforms (e.g., Facebook, Twitter, Instagram, LinkedIn)
Collaboration and Project Management (e.g., Slack, Trello, Asana, Microsoft Teams)
Voice Communication (e.g., Skype).
File Sharing and Storage (e.g., Dropbox, Google Drive, Microsoft OneDrive)
Forums and Communities (e.g., Reddit, Stack Exchange)
Business Communication (e.g., Slack, Microsoft Teams, Salesforce Chatter)

Blogging and Publishing (e.g., WordPress, Medium)

Unfortunately, some of these communication platforms (e.g., platforms 102, 104, 106, 108, 110) may be considered to live in what is generally known as the "dark web".

The dark web is a part of the internet that is intentionally hidden and inaccessible through standard web browsers. It is a subset of the deep web, which includes all parts of the web that are not indexed by traditional search engines. Unlike the surface web, which is easily accessible and indexed by search engines, the dark web requires special tools and software to access.

Here are some key characteristics of the dark web:

Anonymity: Users on the dark web often remain anonymous through the use of encryption and tools like Tor (The Onion Router), which helps in routing internet traffic through a series of volunteer-operated servers to conceal a user's location and usage from network surveillance or traffic analysis.

Content: The dark web hosts a variety of websites and services, some of which are legal and legitimate, while others are associated with illegal activities. Legal content might include forums, blogs, or services that prioritize privacy. However, the dark web is also known for hosting illegal marketplaces, hacking forums, and other illicit activities.

Illegal Marketplaces: Some parts of the dark web are infamous for hosting illegal marketplaces where users can buy and sell drugs, stolen data, hacking tools, counterfeit currency, and other illegal goods and services.

Cybersecurity Concerns: The dark web is often associated with cybercriminal activities, including the sale of hacking tools, stolen data, and other forms of cyber threats. It's a space where individuals with malicious intent can collaborate and exchange information.

As could be imagined, certain types of information flowing through certain types of communication platforms may be totally acceptable; while other type of information flowing through other types of communication platforms may be quite concerning. Accordingly, information monitoring process 10 may be configured to monitor and analyze the flow & propagation of information & content (e.g., content 112) across the communication network (e.g., communications network 100).

Figure 3:
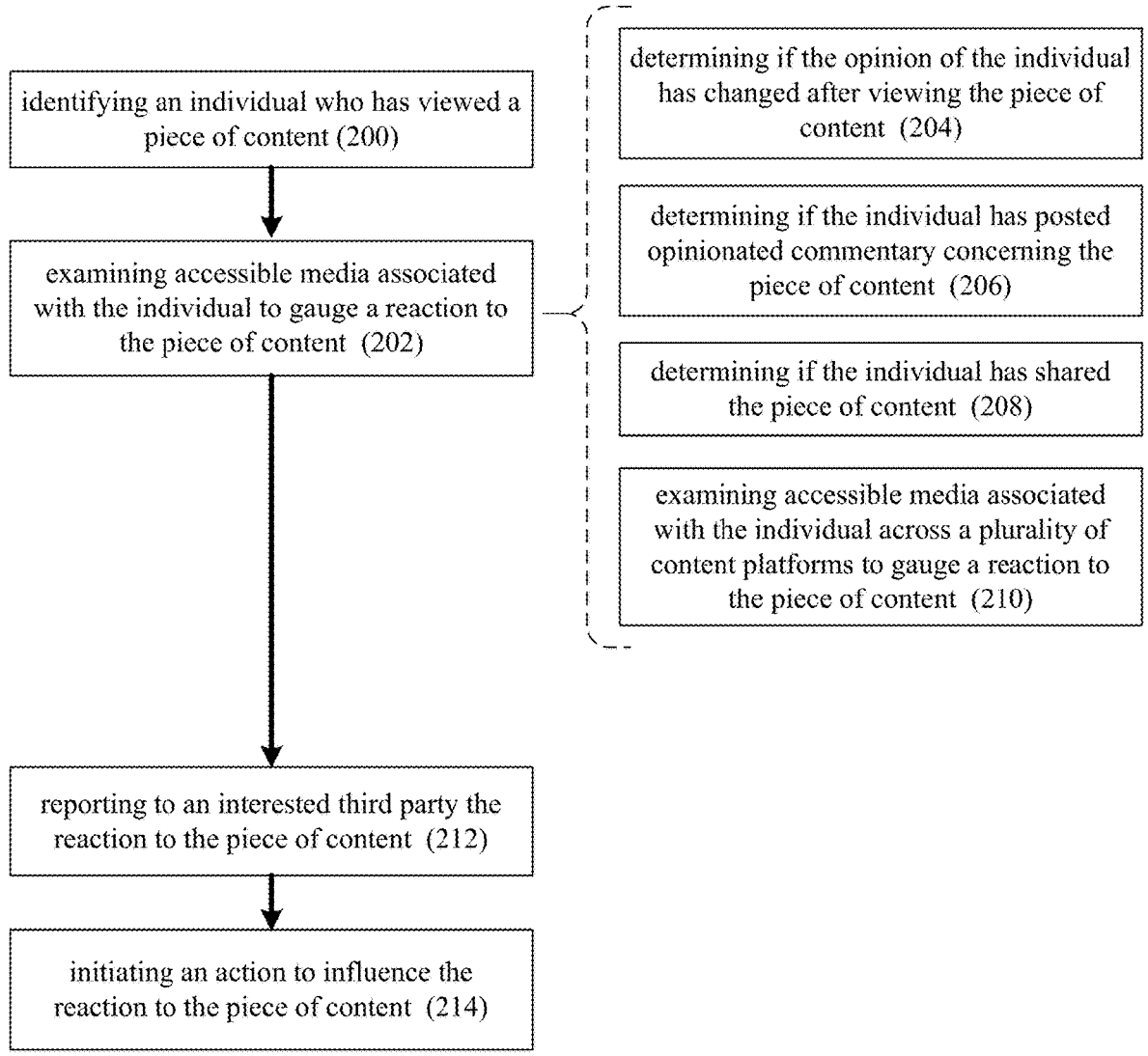
FIG. 3 is a flowchart of the information monitoring process of FIG. 1 according to an embodiment of the present disclosure.

1) Gauging Reaction to Content:

Referring also to FIG. 3 and as will be discussed below in greater detail, information monitoring process 10 may be configured to gauge the manner in which a individual reacts to content (e.g., content 112).

Specifically, information monitoring process 10 may identify 200 an individual (e.g., user 38) who has viewed a piece of content (e.g., content 112).

Examples of the piece of content (e.g., content 112) may include but are not limited to: one or more image-based content; one or more audio-based content; one or more video-based content; one or more social media posts; one or more advertisements; one or more press releases; and one or more stories.

Image-based Content: Image-based content may refer to visual materials that convey information or messages primarily through images or graphics. This can include photographs, illustrations, infographics, memes, and other visual elements designed to communicate ideas without extensive use of text.

Audio-based Content: Audio-based content involves the use of sound or spoken words to convey information or entertainment. This can include podcasts, audiobooks, music, and other forms of content where the primary mode of communication is through audio rather than visual or written means.

Video-based Content: Video-based content involves the use of moving images to convey information, entertain, or tell a story. This can include videos on platforms like YouTube, streaming services, educational videos, and any content where visual elements are combined with audio to create a multimedia experience.

Social Media Posts: Social media posts are short messages or updates shared on social media platforms. These can include text, images, videos, or a combination of these elements and are typically used to share information, engage with an audience, or express opinions on various topics.

Advertisements: Advertisements, or ads, are promotional materials created to persuade an audience to take a specific action, such as buying a product or service. Ads can be presented through various mediums, including print, online banners, video commercials, and social media, with the goal of reaching and influencing a target audience.

Press Releases: Press releases are official statements issued by organizations to provide information to the media and the public. They are often used to announce news, events, or updates related to the organization. Press releases aim to generate media coverage and inform the public about important developments.

Stories: Stories refer to narratives or accounts of events, often presented in a sequential and chronological order. Stories can be conveyed through various mediums, including written text, oral communication, images, or video. In a digital context, "Stories" also commonly may refer to short-lived, multimedia content on social media platforms that disappear after a set period.

Information monitoring process 10 may examine 202 accessible media (e.g., accessible media 114) associated with the individual (e.g., user 38) to gauge a reaction to the piece of content (e.g., content 112).

Accessible media (e.g., accessible media 114) may refer to content that is shared and accessible to a wide audience without restrictions on viewing. Platforms are designed to facilitate the sharing of information, opinions, and multimedia content among users. Publicly available media (e.g., accessible media 114) on these platforms can include various formats such as text posts, images, videos, links, and more.

Some key aspects of publicly available media (e.g., accessible media 114) on a social media platform include:

Visibility to Users: Publicly available media (e.g., accessible media 114) is visible to anyone who visits the social media profile or page where it is posted. Users can typically browse, view, and engage with this content without requiring special permissions.

Privacy Settings: While social media platforms often default to a public setting, users have the option to adjust privacy settings for their posts. Publicly available media (e.g., accessible media 114) is shared with a broad audience unless the user specifically restricts access to a limited audience (e.g., friends, followers).

Engagement Features: Users can interact with publicly available media (e.g., accessible media 114) by liking, commenting, sharing, and sometimes even re-sharing it to their own network. These engagement features contribute to the virality and visibility of the content.

Discoverability: Publicly available media (e.g., accessible media 114) is discoverable through search functions within the social media platform and may be recommended to users based on their interests and activity.

Hashtags and Trends: Content creators often use hashtags to categorize their publicly available media (e.g., accessible media 114) and participate in trending topics. This enhances the discoverability of their content within broader discussions on the platform.

Community Engagement: Publicly available media (e.g., accessible media 114) fosters community engagement as users can participate in discussions, share their thoughts, and connect with others who have similar interests or opinions.

Examples of publicly available media (e.g., accessible media 114) may include but is not limited to accessible social media posts (e.g., tweets on Twitter, public posts on Facebook, public Instagram photos, and public videos on platforms like You Tube and TikTok).

Social media posts are pieces of content shared on social networking platforms. These posts can take various forms, including text, images, videos, links, and more. Users typically create and share posts to express thoughts, share information, engage with their audience, or participate in online conversations. Text-based posts often include status updates, announcements, or short messages conveying the user's thoughts or experiences. Image posts incorporate photographs, graphics, or other visual elements, providing a more visually engaging experience. Video posts, on the other hand, involve sharing video content, which can range from short clips to longer-form videos. Additionally, users may share links to articles, websites, or other online content. Social media posts are a fundamental element of online communication, allowing individuals, businesses, and organizations to connect with their followers, share updates, and participate in broader discussions. The format and style of posts can vary across different social media platforms, each with its own unique features and limitations.

When information monitoring process 10 examines 202 accessible media (e.g., accessible media 114) associated with the individual (e.g., user 38) to gauge a reaction to the piece of content (e.g., content 112), information monitoring process 10 may utilize machine learning and/or artificial intelligence to gauge reaction patterns.

Interpreting an individual's response to content and assessing their reaction can be achieved through the application of machine learning (ML) and artificial intelligence (AI) techniques. Sentiment analysis, a component of natural language processing (NLP), involves training models to discern the sentiment or emotion conveyed in a piece of text. Machine learning models can be trained on labeled datasets to recognize patterns associated with positive, negative, or neutral sentiments. Moving beyond sentiment analysis, more sophisticated models can be developed for emotion recognition, capable of identifying specific emotions expressed in text, such as happiness, anger, sadness, or surprise. Additionally, topic modeling algorithms, such as Latent Dirichlet Allocation (LDA) or Non-negative Matrix Factorization (NMF), can help identify the main themes discussed in a piece of text, contributing to a deeper understanding of the individual's reaction.

Contextual analysis, addressing nuances like sarcasm or irony, enhances the interpretation of language subtleties. Named Entity Recognition (NER) models identify entities like people, organizations, or locations mentioned in the text, providing insights into the contextual elements of the individual's reaction. Furthermore, user profiling based on historical data enables personalized interpretation, learning from past interactions to understand how specific individuals tend to respond to various types of content. Deep learning approaches, including recurrent neural networks (RNNs) or transformer models, leverage complex language patterns for more accurate interpretations.

When examining 202 accessible media (e.g., accessible media 114) associated with the individual (e.g., user 38) to gauge a reaction to the piece of content (e.g., content 112), information monitoring process 10 may determine 204 if the opinion of the individual (e.g., user 38) has changed after viewing the piece of content (e.g., content 112). For example, assume that the piece of content (e.g., content 112) was a political advertisement for Candidate X stating that they support Position 3. If the individual (e.g., user 38) posted a piece of content (e.g., content 116) that stated "I used to support Candidate X but I am appalled to see that Candidate X supports Position 3!". Information monitoring process 10 may determine 204 that the opinion of the individual (e.g., user 38) changed after viewing the piece of content (e.g., content 112).

Further and when examining 202 accessible media (e.g., accessible media 114) associated with the individual (e.g., user 38) to gauge a reaction to the piece of content (e.g., content 112), information monitoring process 10 may determine 206 if the individual (e.g., user 38) has posted opinionated commentary concerning the piece of content (e.g., content 112). Continuing with the above-stated example, assume that the individual (e.g., user 38) generated a meme (e.g., content 116) that included the text "I used to support Candidate X but I am appalled to see that Candidate X supports Position 3!" superimposed over a campaign photo of Candidate X. Further assume that the individual (e.g., user 38) posted this meme (e.g., content 116) on content platform 102. Accordingly, information monitoring process 10 may determine 206 that the individual (e.g., user 38) has posted opinionated commentary (e.g., content 116) concerning the piece of content (e.g., content 112).

Additionally and when examining 202 accessible media (e.g., accessible media 114) associated with the individual (e.g., user 38) to gauge a reaction to the piece of content (e.g., content 112), information monitoring process 10 may determine 208 if the individual (e.g., user 38) has shared the piece of content (e.g., content 112). Continuing with the above-stated example, assume that the individual (e.g., user 38) is a supporter of Position 3 and shared content (e.g., content 112) on content platform 102. Accordingly, information monitoring process 10 may determine 208 that the individual (e.g., user 38) has shared the piece of content (e.g., content 112).

Further and when examining 202 accessible media (e.g., accessible media 114) associated with the individual (e.g., user 38) to gauge a reaction to the piece of content (e.g., content 112), information monitoring process 10 may examine 210 accessible media (e.g., accessible media 114) associated with the individual (e.g., user 38) across a plurality of content platforms (e.g., platforms 102, 104, 106, 108, 110) to gauge a reaction to the piece of content (e.g., content 112). Continuing with the above-stated example, assume that the individual (e.g., user 38) is a supporter of Position 3 and shared the piece of content (e.g., content 112) across e.g., Facebook, Twitter, Instagram, etc. Accordingly, information monitoring process 10 may examine 210 accessible media (e.g., accessible media 114) associated with the individual (e.g., user 38) across this plurality of content platforms (e.g., Facebook, Twitter, Instagram, etc.) to gauge a reaction to the piece of content (e.g., content 112)

The plurality of content platforms (e.g., platforms 102, 104, 106, 108, 110) may include one or more of: one or more social media platforms; one or more websites; one or more video-sharing platforms; one or more virtual reality platforms; one or more gaming platforms; one or more messaging platforms; one or more financial platforms; and one or more blog platforms, as described below:

- Social Media Platforms: Social media platforms refer to online spaces that enable users to create profiles, share content, and connect with others in a digital social network. Examples include Facebook, Instagram, Twitter, and LinkedIn. These platforms provide diverse functionalities such as photo and video sharing, status updates, and messaging, fostering communication, community building, and the dissemination of information on a global scale.
- Websites: Websites constitute a collection of related web pages accessible through a common domain name. These pages can contain a variety of content, including text, images, multimedia, and interactive elements. Websites serve as a fundamental component of the online landscape, offering information, services, and resources across diverse topics and purposes.
- Video-Sharing Platforms: Video-sharing platforms are online spaces dedicated to the uploading, sharing, and viewing of videos. Prominent examples include YouTube, Vimeo, and Dailymotion. These platforms provide content creators and users with a space to share a wide range of videos, from educational content and entertainment to vlogs and documentaries, contributing to the vast landscape of online video content.
- Virtual Reality Platforms: Virtual reality platforms immerse users in computer-generated environments, often through the use of VR headsets or other immersive devices. These platforms, such as Oculus Rift, HTC Vive, or PlayStation VR, create a sense of presence and interaction within digital realms, offering experiences ranging from gaming and simulations to virtual tours and collaborative workspaces.
- Gaming Platforms: Gaming platforms are digital environments that facilitate the playing of video games. These can include consoles like PlayStation, Xbox, and Nintendo, as well as PC gaming platforms. Gaming platforms provide the infrastructure and technology necessary for gamers to access, download, and play a wide variety of video games, contributing to the global gaming community.
- Messaging Platforms: Messaging platforms encompass digital communication tools that allow users to exchange text, multimedia, and sometimes voice messages. Examples include WhatsApp, Telegram, and Facebook Messenger. These platforms enable real-time communication, fostering personal and group conversations, and often include additional features such as voice and video calls.
- Blog Platforms: Blog platforms are online systems that facilitate the creation and publication of blogs. Popular examples include WordPress, Blogger, and Medium. These platforms empower individuals and organizations to share thoughts, opinions, and information through written content, often accompanied by multimedia elements. Blog platforms play a crucial role in shaping online discourse and providing diverse perspectives on a wide range of topics.

Information monitoring process 10 may report 212 to an interested third party (e.g., third party 54) the reaction to the piece of content (e.g., content 112). The third party (e.g., third party 54) may include one or more of: an educational third party; a corporate third party; a legal third party; a moderating third party; an international intelligence third party; a law enforcement third party; a social work third party; and a medical professional third party.

- Educational Third Party: An educational third party is an organization or institution responsible for providing formal instruction, training, and learning opportunities. This can include schools, colleges, universities, and other entities focused on fostering academic development and knowledge acquisition.
- Corporate Third Party: A corporate third party may refer to an organization or entity operating in the business sector. It can include companies, corporations, and business entities engaged in various industries, with the primary goal of generating profit through the provision of goods or services.
- Legal Third Party: A legal third party is an entity, such as a law firm or legal department, that provides legal services, advice, and representation. These third parties may include lawyers, legal professionals, and support staff working to ensure compliance with laws and regulations.
- Moderating Third Party: A moderating third party is an organization or platform responsible for overseeing and regulating discussions, content, or interactions within a particular community, online forum, or social media platform. Moderating third parties aim to maintain a safe and respectful environment by enforcing rules and guidelines.
- International Intelligence Third Party: An international intelligence third party is a government organization responsible for collecting, analyzing, and disseminating intelligence information at a global level. These third parties typically focus on national security and may be involved in counterterrorism, counterintelligence, and foreign intelligence operations.
- Law Enforcement Third Party: A law enforcement third party is a government organization tasked with maintaining public order, enforcing laws, and preventing and investigating criminal activities. Examples include police departments, sheriff's offices, and federal law enforcement agencies.
- Social Work Third Party: A social work third party is an organization that provides social services to individuals and communities. Social work third parties may address various social issues, such as poverty, child welfare, mental health, and family support. Social workers within these third parties aim to enhance the well-being of individuals and promote social justice.
- Medical Professional Third Party: A medical professional third party is an organization that oversees and supports healthcare professionals. This may include medical licensing boards, medical associations, and regulatory bodies responsible for ensuring the competence, ethics, and quality of healthcare delivery by professionals such as doctors, nurses, and other healthcare practitioners.

Generally speaking, the specific third party (e.g., third party 54) notified may be dependent upon the type of reaction generated by the individual (e.g., user 38) in response to the piece of content (e.g., content 112). For example, if the reaction of the individual (e.g., user 38) was threatening, information monitoring process 10 may report 212 the reaction to a law enforcement third party (e.g., third party 54); while information monitoring process 10 may report 212 the reaction to a social work third party (e.g., third party 54) if the reaction of the individual (e.g., user 38) was depressed.

Information monitoring process 10 may initiate 214 an action to influence the reaction to the piece of content (e.g., content 112). For example, if a user (e.g., user 36) publishes a piece of content (e.g., content 118) in response to content 112 that says "Did you see that Candidate X supports Position 3? Call him and explain that this is unacceptable!", such an action (initiated 214 by user 36) may influence the reaction to the piece of content (e.g., content 112) by (in this example) getting people to voice outrage concerning Candidate X's support of Position 3.

Figure 4:
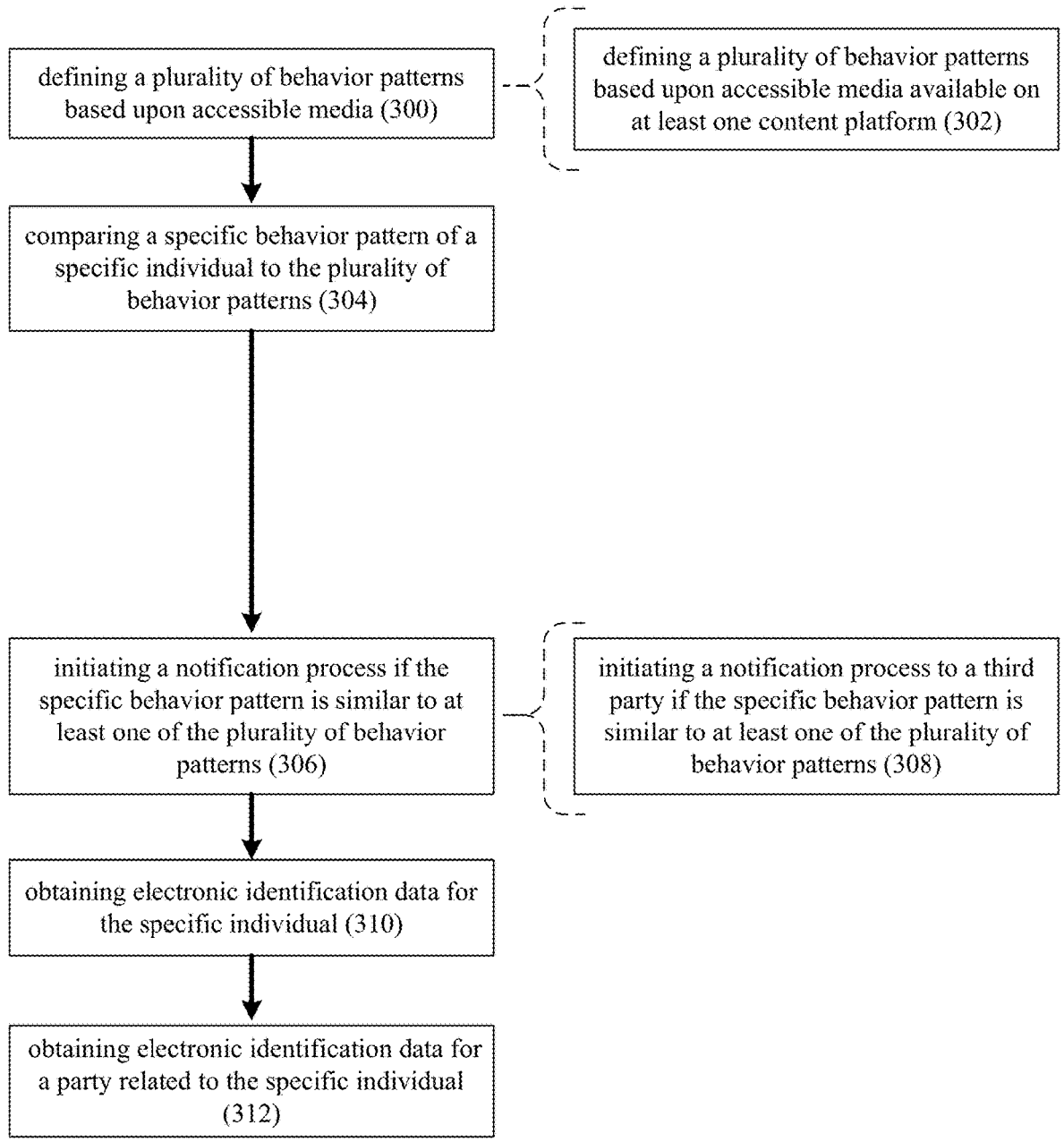
FIG. 4 is a flowchart of the information monitoring process of FIG. 1 according to an embodiment of the present disclosure.

2) Monitoring for Identified Behavior Patterns Via Social Media:

Referring also to FIG. 4 and as will be discussed below in greater detail, information monitoring process 10 may be configured to monitor individuals via social media to determine if they espouse one or more identified behavior patterns.

Specifically, information monitoring process 10 may define 300 a plurality of behavior patterns (e.g., plurality of behavior patterns 56) based upon accessible media (e.g., accessible media 120).

As discussed above, accessible media (e.g., accessible media 120) may refer to content that is shared and accessible to a wide audience without restrictions on viewing. Platforms are designed to facilitate the sharing of information, opinions, and multimedia content among users. Publicly available media (e.g., accessible media 120) on these platforms can include various formats such as text posts, images, videos, links, and more.

When defining 300 a plurality of behavior patterns (e.g., plurality of behavior patterns 56) based upon accessible media (e.g., accessible media 120), information monitoring process 10 may define 302 a plurality of behavior patterns (e.g., plurality of behavior patterns 56) based upon accessible media (e.g., accessible media 120) available on at least one content platform (e.g., at least one of content platforms 102, 104, 106, 108, 110).

Generally speaking, being the accessible media (e.g., accessible media 120) is used by information monitoring process 10 to define 300 a "broad-based" plurality of behavior patterns (e.g., plurality of behavior patterns 56), the accessible media (e.g., accessible media 120) as used in this example may be "broad-based" accessible media (e.g., accessible media 120) that was published by a large quantity of users across the plurality of content platforms (e.g., platforms 102, 104, 106, 108, 110), as opposed to media (e.g., accessible media 114) that was published by just a single individual (e.g., user 38).

As discussed above, the at least one content platform (e.g., at least one of content platforms 102, 104, 106, 108, 110) may include one or more of: one or more social media platforms; one or more websites; one or more video-sharing platforms; one or more virtual reality platforms; one or more gaming platforms; one or more messaging platforms; one or more financial platforms; and one or more blog platforms.

Information monitoring process 10 may compare 304 a specific behavior pattern (e.g., specific behavior pattern 58) of a specific individual (e.g., user 38) to the plurality of behavior patterns (e.g., plurality of behavior patterns 56), wherein the specific behavior pattern (e.g., specific behavior pattern 58) is based upon accessible media (e.g., accessible media 114) associated with the specific individual (e.g., user 38).

As discussed above, accessible media (e.g., accessible media 114) may refer to content that is shared by (in this example) a specific individual (e.g., user 38) and accessible to a wide audience without restrictions on viewing. Such accessible media (e.g., accessible media 114) may include but is not limited to accessible social media posts. Social media posts are pieces of content shared on social networking platforms. These posts can take various forms, including text, images, videos, links, and more. Users typically create and share posts to express thoughts, share information, engage with their audience, or participate in online conversations. Text-based posts often include status updates, announcements, or short messages conveying the user's thoughts or experiences. Image posts incorporate photographs, graphics, or other visual elements, providing a more visually engaging experience. Video posts, on the other hand, involve sharing video content, which can range from short clips to longer-form videos. Additionally, users may share links to articles, websites, or other online content. Social media posts are a fundamental element of online communication, allowing individuals, businesses, and organizations to connect with their followers, share updates, and participate in broader discussions. The format and style of posts can vary across different social media platforms, each with its own unique features and limitations.

The plurality of behavior patterns (e.g., plurality of behavior patterns 56) may include one or more undesirable behavior patterns. The one or more undesirable behavior patterns include one or more of: a sexual harassment behavior pattern; a sexual assault behavior pattern; a revenge porn behavior pattern; a bullying behavior pattern; a criminal behavior pattern; a socially-unacceptable behavior pattern; a protest behavior pattern; a boycott behavior pattern; a suicidal behavior pattern; a self-harm behavior pattern; a terrorism behavior pattern; a homicidal behavior pattern; a mass shooting behavior pattern; and a radicalization behavior pattern, as follows:

Sexual Harassment Behavior Pattern: Involving a repetitive and unwelcome series of actions, comments, or gestures with a sexual nature, this behavior pattern creates a hostile or intimidating environment for the victim. It can include unwarranted advances, inappropriate remarks, or the abuse of power dynamics to exploit individuals in professional, academic, or social settings.

Sexual Assault Behavior Pattern: Comprising non-consensual sexual acts involving force, coercion, or manipulation, this disturbing pattern may involve physical violence, intimidation, or the abuse of vulnerability to perpetrate sexual misconduct, leaving victims traumatized and violated.

Revenge Porn Behavior Pattern: Centering on the malicious distribution of intimate images or videos without the subject's consent, this digital form of abuse has the intent to harm, embarrass, or gain control over the individual depicted. It can have severe emotional, psychological, and reputational consequences for the victim.

Bullying Behavior Pattern: Encompassing repeated aggressive actions, verbal or physical, intended to harm, intimidate, or manipulate others, this persistent pattern can manifest in various settings, such as schools, workplaces, or online platforms, causing emotional distress and, in some cases, long-term psychological damage to the targeted individuals.

Criminal Behavior Pattern: Involving a systematic engagement in activities that violate established laws and regulations within a society, this can range from theft and fraud to more serious offenses such as assault, robbery, or other forms of antisocial conduct.

Socially-Unacceptable Behavior Pattern: Referring to actions or conduct that deviates from societal norms and values, causing discomfort or disapproval within a community, this behavior may vary across cultures and contexts but generally involves actions that are deemed inappropriate or offensive by prevailing social standards.

Protest Behavior Pattern: Entailing organized actions, demonstrations, or expressions of dissent aimed at raising awareness, advocating for social or political change, or expressing opposition to specific policies, practices, or injustices, protests can take various forms, ranging from peaceful marches to more confrontational acts of civil disobedience.

Boycott Behavior Pattern: Involving a collective and intentional refusal to support a person, organization, product, or service as a form of protest or opposition, participants in a boycott typically abstain from purchasing or engaging with the targeted entity to convey disapproval or advocate for change.

Suicidal Behavior Pattern: Comprising thoughts, actions, or tendencies that indicate an individual's contemplation or engagement in self-harm with the intention of ending their own life, this distressing pattern often necessitates urgent intervention and mental health support to prevent tragic outcomes.

Self-Harm Behavior Pattern: Encompassing deliberate, non-suicidal acts of physical harm inflicted upon oneself, often as a coping mechanism for emotional pain or distress, this pattern may include cutting, burning, or other forms of self-injury, indicating underlying psychological struggles that require professional intervention and support.

Terrorism Behavior Pattern: Involving the systematic use of violence, intimidation, or coercion to instill fear and achieve political, ideological, or religious objectives, perpetrators of terrorism often target civilians or non-combatants. Such actions are considered criminal under international law.

Homicidal Behavior Pattern: Consisting of a deliberate and repeated tendency to commit acts of murder or cause the death of others, this pattern may be driven by various motivations, including personal grievances, mental health issues, or criminal intent, posing a serious threat to public safety.

Mass Shooting Behavior Pattern: Involving the intentional use of firearms to cause harm to a significant number of people in a concentrated area, these incidents, often characterized by indiscriminate violence, have tragic consequences and raise concerns about gun control, mental health, and societal safety.

Radicalization Behavior Pattern: Referring to the process by which individuals adopt extreme beliefs, ideologies, or viewpoints that often lead to a rejection of established norms and a willingness to engage in disruptive or violent actions, this pattern can be associated with various contexts, including political, religious, or social ideologies. It may pose a threat to national security and social stability Information monitoring process 10 may initiate 306 a notification process if the specific behavior pattern (e.g., specific behavior pattern 58) is similar to at least one of the plurality of behavior patterns (e.g., plurality of behavior patterns 56). For example, if the plurality of behavior patterns (e.g., plurality of behavior patterns 56) defines a plurality of undesirable behavior patterns (one of which is a suicidal behavior pattern) and a specific behavior pattern (e.g., specific behavior pattern 58) of a specific individual (e.g., user 38) is similar to such a suicidal behavior pattern, information monitoring process 10 may initiate 306 such a notification process.

When initiating 306 a notification process if the specific behavior pattern (e.g., specific behavior pattern 58) is similar to at least one of the plurality of behavior patterns (e.g., plurality of behavior patterns 56), information monitoring process 10 may initiate 308 a notification process to a third party (e.g., third party 54) if the specific behavior pattern (e.g., specific behavior pattern 58) is similar to at least one of the plurality of behavior patterns (e.g., plurality of behavior patterns 56).

As discussed above, the third party (e.g., third party 54) may include one or more of: an educational third party; a corporate third party; a legal third party; a moderating third party; an international intelligence third party; a law enforcement third party; a social work third party; and a medical professional third party.

For example, assume that the plurality of behavior patterns (e.g., plurality of behavior patterns 56) defines a plurality of undesirable behavior patterns, one of which is a radicalization behavior pattern. Further assume that the specific behavior pattern (e.g., specific behavior pattern 58) of the specific individual (e.g., user 38) is similar to such a radicalization behavior pattern (e.g., reading Hamas & Hezbollah material, watching terrorism propaganda videos, joining Islamist groups, and receiving Islamist material). Accordingly, information monitoring process 10 may initiate 308 a notification process to third party 54 (e.g., an international intelligence third party and/or a law enforcement third party).

In the event of a behavior pattern match (e.g., specific behavior pattern 58 of user 38 is similar to a radicalization behavior pattern), information monitoring process 10 may obtain 310 electronic identification data (e.g., electronic identification data 60) for the specific individual (e.g., user 38) and/or information monitoring process 10 may obtain 312 electronic identification data (e.g., electronic identification data 60) for a party (e.g., user 40) related to the specific individual (e.g., user 38). The party (e.g., user 40) related to the specific individual (e.g., user 38) may be associated with/proximate to/related to the specific individual (e.g., user 38). Such electronic identification data (e.g., electronic identification data 60) may define information (e.g., location, identity, demographics, etc.) for the specific individual (e.g., user 38) and/or the party (e.g., user 40) related to the specific individual (e.g., user 38).

Such electronic identification data (e.g., electronic identification data 60) for the specific individual (e.g., user 38) and/or the party (e.g., user 40) related to the specific individual (e.g., user 38) may define e.g., the location and identity of the specific individual (e.g., user 38) and/or the party (e.g., user 40) related to the specific individual (e.g., user 38) and may be accomplished via various methodologies, examples of which may include but are not limited to:

IP Address Geolocation: IP (Internet Protocol) addresses can be used to estimate the geographic location of a device. Geolocation databases map IP addresses to specific regions or cities based on the information provided by internet service providers (ISPs). Keep in mind that this method provides only approximate location information and may be affected by factors such as VPN usage.

GPS Data from Devices: With user consent, some applications and websites can access the GPS data from a user's device. This is commonly used in location-based services, navigation apps, and social media check-ins. Users have control over whether they want to share their precise location.

Wi-Fi Positioning: Devices can use nearby Wi-Fi networks to determine their approximate location. This is often used in conjunction with GPS data and cellular information to provide more accurate positioning in urban areas or places with dense Wi-Fi coverage.

Cellular Tower Triangulation: Mobile devices can connect to nearby cellular towers, and their location can be estimated by triangulating signals from multiple towers. This method provides a rough idea of the device's location based on the proximity of cell towers.

Browser Geolocation API: Modern web browsers have a Geolocation API that allows websites to request a user's location with their consent. The browser may use a combination of GPS, Wi-Fi, and IP address data to provide an approximate location.

Figure 5:
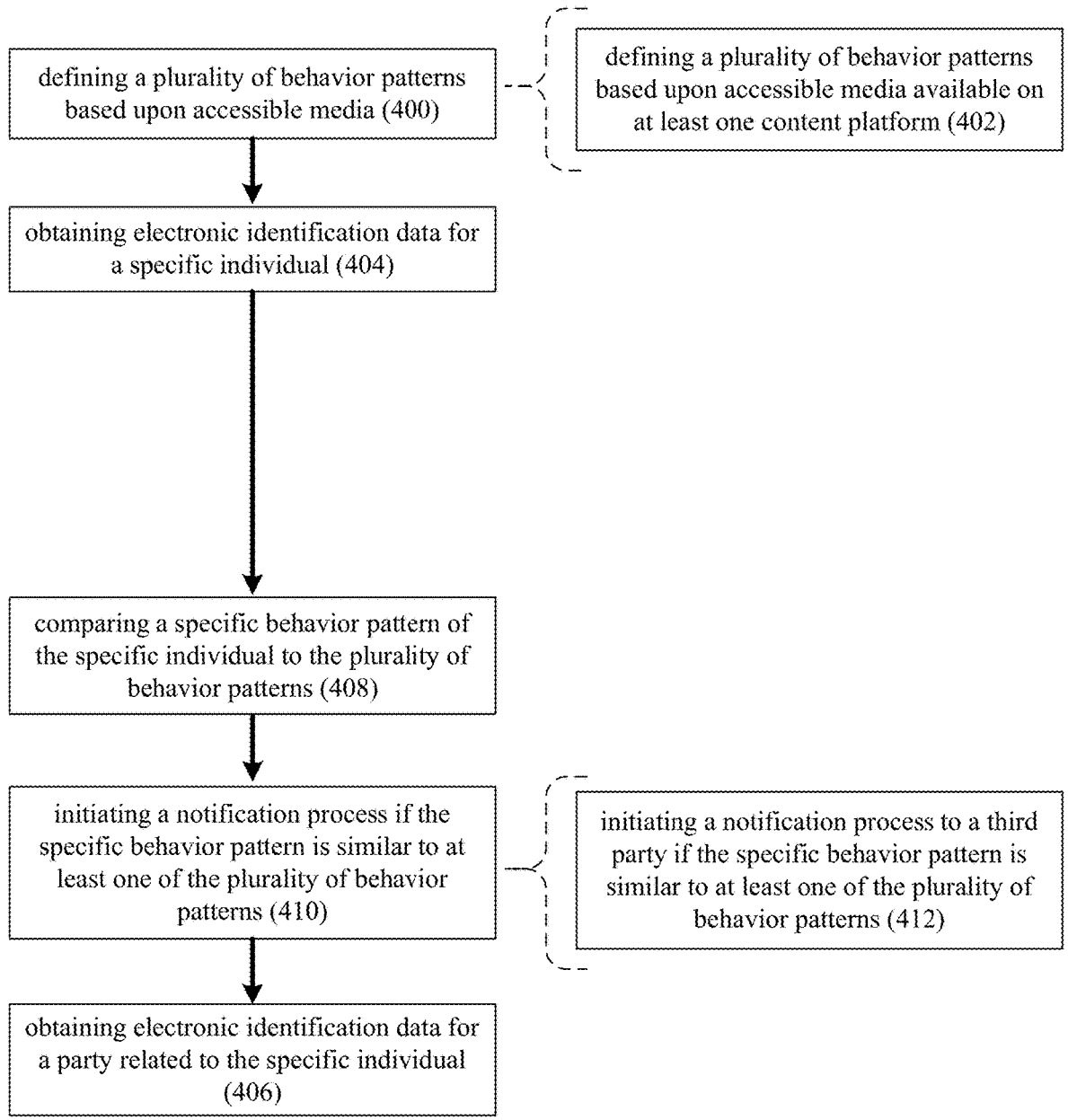
FIG. 5 is a flowchart of the information monitoring process of FIG. 1 according to an embodiment of the present disclosure.

3) Monitoring for Identified Behavior Patterns with Identification Data:

Referring also to FIG. 5 and as will be discussed below in greater detail, information monitoring process 10 may be configured to identify individuals and monitor them via social media to determine if they espouse one or more identified behavior patterns.

Specifically, information monitoring process 10 may define 400 a plurality of behavior patterns (e.g., plurality of behavior patterns 56) based upon accessible media (e.g., accessible media 120).

As discussed above, the plurality of behavior patterns may include one or more undesirable behavior patterns. The one or more undesirable behavior patterns may include one or more of: a sexual harassment behavior pattern; a sexual assault behavior pattern; a revenge porn behavior pattern; a bullying behavior pattern; a criminal behavior pattern; a socially-unacceptable behavior pattern; a protest behavior pattern; a boycott behavior pattern; a suicidal behavior pattern; a self-harm behavior pattern; a terrorism behavior pattern; a homicidal behavior pattern; a mass shooting behavior pattern; and a radicalization behavior pattern, all of which were discussed above.

As discussed above, accessible media (e.g., accessible media 120) may refer to content that is shared and accessible to a wide audience without restrictions on viewing. Platforms are designed to facilitate the sharing of information, opinions, and multimedia content among users. Publicly available media (e.g., accessible media 120) on these platforms can include various formats such as text posts, images, videos, links, and more.

Generally speaking, being the accessible media (e.g., accessible media 120) is used by information monitoring process 10 to define 400 a "broad-based" plurality of behavior patterns (e.g., plurality of behavior patterns 56), the accessible media (e.g., accessible media 120) as used in this example may be "broad-based" accessible media (e.g., accessible media 120) that was published by a large quantity of users across the plurality of content platforms (e.g., platforms 102, 104, 106, 108, 110). An example of such accessible media (e.g., accessible media 120) may include but is not limited to accessible social media posts.

When defining 400 a plurality of behavior patterns (e.g., plurality of behavior patterns 56) based upon accessible media (e.g., accessible media 120), information monitoring process 10 may define 402 a plurality of behavior patterns (e.g., plurality of behavior patterns 56) based upon accessible media (e.g., accessible media 120) available on at least one content platform (e.g., at least one of content platforms 102, 104, 106, 108, 110).

As discussed above, the at least one content platform (e.g., at least one of content platforms 102, 104, 106, 108, 110) may include one or more of: one or more social media platforms; one or more websites; one or more video-sharing platforms; one or more virtual reality platforms; one or more gaming platforms; one or more messaging platforms; one or more financial platforms; and one or more blog platforms, all of which were discussed above.

Information monitoring process 10 may obtain 404 electronic identification data (e.g., electronic identification data 60) for the specific individual (e.g., user 38) and/or information monitoring process 10 may obtain 406 electronic identification data (e.g., electronic identification data 60) for a party (e.g., user 40) related to the specific individual (e.g., user 38). The party (e.g., user 40) related to the specific individual (e.g., user 38) may be associated with/proximate to/related to the specific individual (e.g., user 38). Such electronic identification data (e.g., electronic identification data 60) may define information (e.g., location, identity, demographics, etc.) for the specific individual (e.g., user 38) and/or the party (e.g., user 40) related to the specific individual (e.g., user 38).

As discussed above, such electronic identification data (e.g., electronic identification data 60) for the specific individual (e.g., user 38) and/or the party (e.g., user 40) related to the specific individual (e.g., user 38) may define e.g., the location and identity of the specific individual (e.g., user 38) and/or the party (e.g., user 40) related to the specific individual (e.g., user 38) and may be accomplished via various methodologies, all of which were discussed above.

Information monitoring process 10 may compare 408 a specific behavior pattern (e.g., specific behavior pattern 58) of the specific individual (e.g., user 38) to the plurality of behavior patterns (e.g., plurality of behavior patterns 56).

The specific behavior pattern (e.g., specific behavior pattern 58) may be based upon accessible media (e.g., accessible media 114) associated with the specific individual (e.g., user 38). As discussed above, accessible media (e.g., accessible media 114) may refer to content that is shared by (in this example) a specific individual (e.g., user 38) and accessible to a wide audience without restrictions on viewing. Such accessible media (e.g., accessible media 114) may include but is not limited to accessible social media posts.

Information monitoring process 10 may initiate 410 a notification process if the specific behavior pattern (e.g., specific behavior pattern 58) is similar to at least one of the plurality of behavior patterns (e.g., plurality of behavior patterns 56). For example and upon comparing 408 specific behavior pattern 58 of the specific individual (e.g., user 38) to plurality of behavior patterns 56; if the plurality of behavior patterns (e.g., plurality of behavior patterns 56) defines a suicidal behavior pattern and specific behavior pattern 58 of the specific individual (e.g., user 38) is similar to such a suicidal behavior pattern, information monitoring process 10 may initiate 410 such a notification process.

When initiating 410 a notification process if the specific behavior pattern (e.g., specific behavior pattern 58) is similar to at least one of the plurality of behavior patterns (e.g., plurality of behavior patterns 56), information monitoring process 10 may initiate 412 a notification process to a third party (e.g., third party 54) if the specific behavior pattern (e.g., specific behavior pattern 58) is similar to at least one of the plurality of behavior patterns (e.g., plurality of behavior patterns 56).

As discussed above, the third party may include one or more of: an educational third party; a corporate third party; a legal third party; a moderating third party; an international intelligence third party; a law enforcement third party; a social work third party; and a medical professional third party, all of which were discussed above.

Again, assume that the plurality of behavior patterns (e.g., plurality of behavior patterns 56) defines a plurality of undesirable behavior patterns, one of which is a radicalization behavior pattern. Further assume that the specific behavior pattern (e.g., specific behavior pattern 58) of the specific individual (e.g., user 38) is similar to such a radicalization behavior pattern (e.g., reading Hamas & Hezbollah material, watching terrorism propaganda videos, joining Islamist groups, and receiving Islamist material). Accordingly, information monitoring process 10 may initiate 412 a notification process to third party 54 (e.g., an international intelligence third party and/or a law enforcement third party).

Figure 6:
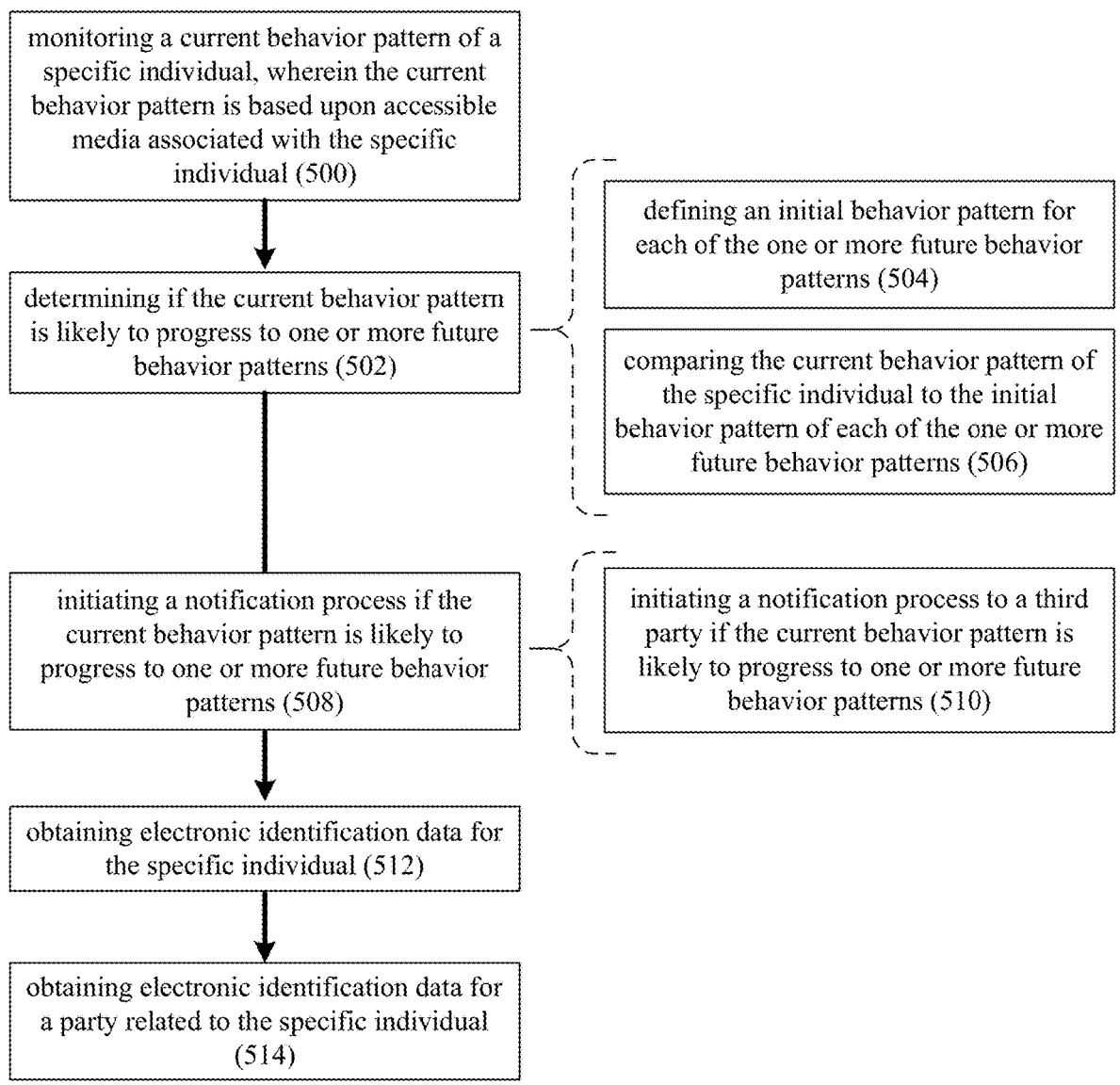
FIG. 6 is a flowchart of the information monitoring process of FIG. 1 according to an embodiment of the present disclosure.

4) Predicting Future Behavior Based Upon Current Behavior:

Referring also to FIG. 6 and as will be discussed below in greater detail, information monitoring process 10 may be configured to predict the future behavior of an individual based upon the current behavior of that individual.

Specifically, information monitoring process 10 may monitor 500 a current behavior pattern (e.g., current behavior pattern 62) of a specific individual (e.g., user 38).

The current behavior pattern (e.g., current behavior pattern 62) may be based upon accessible media (e.g., accessible media 114) associated with the specific individual (e.g., user 38). As discussed above, accessible media (e.g., accessible media 114) may refer to content that is shared by (in this example) the specific individual (e.g., user 38) and accessible to a wide audience without restrictions on viewing. Such accessible media (e.g., accessible media 114) may include but is not limited to accessible social media posts.

Information monitoring process 10 may determine 502 if the current behavior pattern (e.g., current behavior pattern 62) is likely to progress to one or more future behavior patterns (e.g., plurality of behavior patterns 56).

When determining 502 if the current behavior pattern (e.g., current behavior pattern 62) is likely to progress to one or more future behavior patterns (e.g., plurality of behavior patterns 56), information monitoring process 10 may define 504 an initial behavior pattern (e.g., initial behavior patterns 64) for each of the one or more future behavior patterns (e.g., plurality of behavior patterns 56). Information monitoring process 10 may then compare 506 the current behavior pattern (e.g., current behavior pattern 62) of the specific individual (e.g., user 38) to the initial behavior pattern (e.g., initial behavior patterns 64) of each of the one or more future behavior patterns (e.g., plurality of behavior patterns 56).

The one or more future behavior patterns (e.g., plurality of behavior patterns 56) may include desirable behavior patterns, examples of which may include but are not limited to: a purchasing behavior pattern; a promoting behavior pattern; and an assisting behavior pattern, as follows:

Purchasing Behavior Pattern: A purchasing behavior pattern may refer to the systematic way in which consumers make decisions and take actions when acquiring goods or services. This pattern involves a series of steps, from recognizing a need or desire to the final purchase, and can be influenced by various factors such as personal preferences, brand loyalty, or external marketing stimuli. Understanding the purchasing behavior pattern is crucial for businesses as it allows them to tailor their marketing strategies, optimize product placement, and enhance customer experiences to better align with the decision-making processes of their target audience.

Promoting Behavior Pattern: A promoting behavior pattern involves actions taken by individuals or entities to actively endorse, market, or publicize a product, service, idea, or cause. This pattern includes a range of promotional activities such as advertising, social media campaigns, influencer partnerships, and word-of-mouth efforts. Those exhibiting a promoting behavior pattern often seek to create awareness, generate interest, and persuade others to engage with or support what they are promoting. This pattern is significant in the realms of marketing and advocacy, shaping perceptions and influencing the decision-making processes of a broader audience.

Assisting Behavior Pattern: An assisting behavior pattern pertains to actions taken by individuals or entities to provide support, aid, or assistance to others in various contexts. This pattern may involve helping with tasks, offering guidance, or providing resources to contribute positively to someone else's well-being or goals. Assisting behavior patterns are prevalent in professional settings, educational environments, and personal relationships, fostering collaboration, teamwork, and a sense of community. Recognizing and promoting assisting behavior patterns is crucial for building supportive and inclusive communities and workplaces where individuals actively contribute to the success and growth of others.

Conversely, the one or more future behavior patterns (e.g., plurality of behavior patterns 56) may include undesirable behavior patterns, examples of which may include but are not limited to: a sexual harassment behavior pattern; a sexual assault behavior pattern; a revenge porn behavior pattern; a bullying behavior pattern; a criminal behavior pattern; a socially-unacceptable behavior pattern; a protest behavior pattern; a boycott behavior pattern; a suicidal behavior pattern; a self-harm behavior pattern; a terrorism behavior pattern; a homicidal behavior pattern; a mass shooting behavior pattern; and a radicalization behavior pattern, all of which were described above.

As discussed above, one of the future behavior patterns (e.g., plurality of behavior patterns 56) includes a radicalization behavior pattern. As also discussed above, information monitoring process 10 may define 504 an initial behavior pattern (e.g., initial behavior patterns 64) for each of the one or more future behavior patterns (e.g., plurality of behavior patterns 56), including the radicalization behavior pattern. For this example, assume that the initial behavior pattern (e.g., one of initial behavior patterns 64) defined 504 for the future "radicalization" behavior pattern (e.g., one of the plurality of behavior patterns 56) includes e.g., reading Hamas & Hezbollah material and watching terrorism propaganda videos. Further, assume that the current behavior pattern (e.g., current behavior pattern 62) monitored 500 for the specific individual (e.g., user 38) includes actions such as e.g., reading Hamas & Hezbollah material and watching terrorism propaganda videos.

Accordingly, information monitoring process 10 may compare 506 current behavior pattern 62 (e.g., reading Hamas & Hezbollah material and watching terrorism propaganda videos) of the specific individual (e.g., user 38) to initial behavior pattern 64 (e.g., reading Hamas & Hezbollah material and watching terrorism propaganda videos) of the future "radicalization" behavior pattern (e.g., one of plurality of behavior patterns 56).

Accordingly, information monitoring process 10 may determine 502 that the current behavior pattern (e.g., current behavior pattern 62) is likely to progress to the future "radicalization" behavior pattern (e.g., one of plurality of behavior patterns 56).

Information monitoring process 10 may initiate 508 a notification process if the current behavior pattern (e.g., current behavior pattern 62) is likely to progress to one or more future behavior patterns (e.g., one of plurality of behavior patterns 56). Since current behavior pattern 62 (e.g., reading Hamas & Hezbollah material and watching terrorism propaganda videos) is likely to progress to the future "radicalization" behavior pattern (e.g., one of plurality of behavior patterns 56), information monitoring process 10 may initiate 508 such a notification process.

When initiating 508 a notification process if the current behavior pattern (e.g., current behavior pattern 62) is likely to progress to one or more future behavior patterns (e.g., one of plurality of behavior patterns 56), information monitoring process 10 may initiate 510 a notification process to a third party (e.g., third party 54) if the current behavior pattern (e.g., current behavior pattern 62) is likely to progress to one or more future behavior patterns (e.g., one of plurality of behavior patterns 56).

As discussed above, the third party (e.g., third party 54) may include one or more of: an educational third party; a corporate third party; a legal third party; a moderating third party; an international intelligence third party; a law enforcement third party; a social work third party; and a medical professional third party, all of which were discussed above.

Accordingly, information monitoring process 10 may initiate 510 a notification process to third party 54 (e.g., an international intelligence third party and/or a law enforcement third party) since current behavior pattern 54 (e.g., reading Hamas & Hezbollah material and watching terrorism propaganda videos) is likely to progress to the future "radicalization" behavior pattern (e.g., one of plurality of behavior patterns 56).

Information monitoring process 10 may obtain 512 electronic identification data (e.g., electronic identification data 60) for the specific individual (e.g., user 38) and/or information monitoring process 10 may obtain 514 electronic identification data (e.g., electronic identification data 60) for a party (e.g., user 40) related to the specific individual (e.g., user 38). The party (e.g., user 40) related to the specific individual (e.g., user 38) may be associated with/proximate to/related to the specific individual (e.g., user 38). Such electronic identification data (e.g., electronic identification data 60) may define information (e.g., location, identity, demographics, etc.) for the specific individual (e.g., user 38) and/or the party (e.g., user 40) related to the specific individual (e.g., user 38).

As discussed above, such electronic identification data (e.g., electronic identification data 60) for the specific individual (e.g., user 38) and/or the party (e.g., user 40) related to the specific individual (e.g., user 38) may define e.g., the location and identity of the specific individual (e.g., user 38) and/or the party (e.g., user 40) related to the specific individual (e.g., user 38) and may be accomplished via various methodologies, all of which were described above.

Figure 7:
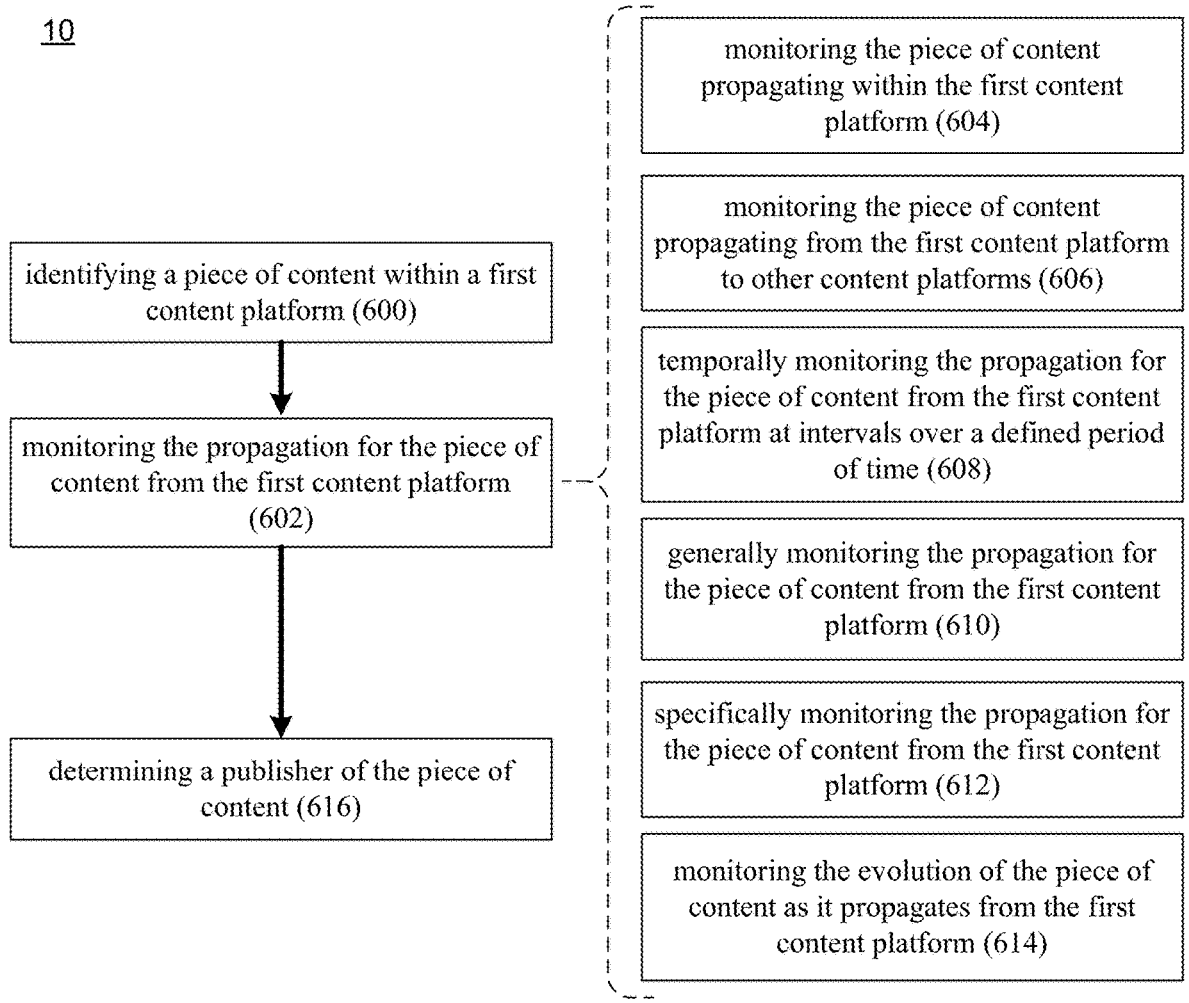
FIG. 7 is a flowchart of the information monitoring process of FIG. 1 according to an embodiment of the present disclosure.

5) Monitoring Propagation of Content:

Referring also to FIG. 7 and as will be discussed below in greater detail, information monitoring process 10 may be configured to monitor the propagation of content from platform to platform.

Specifically, information monitoring process 10 may identify 600 a piece of content (e.g., content 118) within a first content platform (e.g., platform 102). The piece of content (e.g., content 118) may include one or more of: neutral content; negative content; and positive content.

Neutral Content: Neutral content may refer to information, media, or communication that lacks a distinct positive or negative bias, presenting facts or opinions in an unbiased manner. It aims to provide an objective view without influencing the audience's emotions or perceptions. Neutral content is often characterized by an absence of strong language, opinions, or emotional tone, facilitating a balanced and impartial presentation of information. This type of content is commonly found in news reporting, educational materials, and factual presentations, where the goal is to inform rather than sway opinions.

Negative Content: Negative content encompasses information, media, or communication that conveys a pessimistic, critical, or unfavorable perspective. This type of content may include criticism, complaints, or expressions of disapproval, intending to highlight shortcomings, challenges, or undesirable aspects of a subject. Negative content can be found in various forms, such as reviews, critiques, or news articles, and it often elicits emotional responses from the audience. While negative content can serve as a form of critique or warning, its impact on public perception underscores the importance of responsible and ethical communication practices.

Positive Content: Positive content may refer to information, media, or communication that communicates an optimistic, affirmative, or favorable viewpoint. This type of content aims to highlight the strengths, achievements, or positive aspects of a subject, fostering a sense of encouragement, inspiration, or support. Positive content can take various forms, including uplifting stories, motivational messages, or celebratory announcements, and it plays a crucial role in shaping a positive narrative and influencing audience attitudes. While positive content contributes to a more optimistic and uplifting media landscape, it is essential to maintain authenticity and balance in communication to build trust with the audience.

As discussed above, the first content platform (e.g., platform 102) may include one or more of: one or more social media platforms; one or more websites; one or more video-sharing platforms; one or more virtual reality platforms; one or more gaming platforms; one or more messaging platforms; one or more financial platforms; and one or more blog platforms, all of which were described above.

Generally speaking, information monitoring process 10 may monitor 602 the propagation for the piece of content (e.g., content 118) from the first content platform (e.g., platform 102). For example and when monitoring 602 the propagation for the piece of content (e.g., content 118) from the first content platform (e.g., platform 102), information monitoring process 10 may monitor 604 the piece of content (e.g., content 118) propagating within the first content platform (e.g., platform 102).

Continuing with the above-stated example in which a user (e.g., user 36) publishes a piece of content (e.g., content 118) in response to content 112 that says "Did you see that Candidate X supports Position 3? Call him and explain that this is unacceptable!", information monitoring process 10 may monitor 604 the piece of content (e.g., content 118) propagating within the first content platform (e.g., platform 102). For example, how quickly is content 118 spreading within the first content platform (e.g., platform 102). Is the rate at which the piece of content (e.g., content 118) is being shared within the first content platform (e.g., platform 102) increasing . . . or decreasing? Is the rate at which the piece of content (e.g., content 118) is being "liked" within the first content platform (e.g., platform 102) increasing . . . or decreasing?

Additionally/alternatively, when monitoring 602 the propagation for the piece of content (e.g., content 118) from the first content platform (e.g., platform 102), information monitoring process 10 may monitor 606 the piece of content (e.g., content 118) propagating from the first content platform (e.g., platform 102) to other content platforms (e.g., platforms 104, 106, 108, 110). For example, did content 118 spread from the first content platform (e.g., platform 102) to a second content platform (e.g., content platform 104). If so, did content 118 spread from the second content platform (e.g., platform 104) to a third content platform (e.g., content platform 106). If so, did content 118 spread from the third content platform (e.g., platform 106) to a fourth content platform (e.g., content platform 108). And so on.

As discussed above, the other content platforms (e.g., platforms 104, 106, 108, 110) may include one or more of: one or more social media platforms; one or more websites; one or more video-sharing platforms; one or more virtual reality platforms; one or more gaming platforms; one or more messaging platforms; one or more financial platforms; and one or more blog platforms, all of which were described above.

When monitor 602 the propagation for the piece of content (e.g., content 118) from the first content platform (e.g., platform 102), information monitoring process 10 may temporally monitor 608 the propagation for the piece of content (e.g., content 118) from the first content platform (e.g., platform 102) at intervals over a defined period of time. By temporally monitoring 608 the propagation for the piece of content (e.g., content 118) from the first content platform (e.g., platform 102) at intervals over a defined period of time, information monitoring process 10 may determine how quickly the piece of content (e.g., content 118) is spreading.

Further and when monitoring 602 the propagation for the piece of content (e.g., content 118) from the first content platform (e.g., platform 102), information monitoring process 10 may generally monitor 610 the propagation for the piece of content (e.g., content 118) from the first content platform (e.g., platform 102). By generally monitoring 610 the propagation for the piece of content (e.g., content 118) from the first content platform (e.g., platform 102), information monitoring process 10 may determine e.g., the popularity of the piece of content (e.g., content 118) across the content platforms (e.g., platforms 102, 104, 106, 108, 110) over time.

Additionally and when monitoring 602 the propagation for the piece of content (e.g., content 118) from the first content platform (e.g., platform 102), information monitoring process 10 may specifically monitor 612 the propagation for the piece of content (e.g., content 112) from the first content platform (e.g., platform 102). By specifically monitoring 612 the propagation for the piece of content (e.g., content 118) from the first content platform (e.g., platform 102), information monitoring process 10 may track the people that are pushing the piece of content (e.g., content 118) across the content platforms (e.g., platforms 102, 104, 106, 108, 110) over time.

Further and when monitoring 602 the propagation for the piece of content (e.g., content 112) from the first content platform (e.g., platform 102), information monitoring process 10 may monitor 614 the evolution of the piece of content (e.g., content 118) as it propagates from the first content platform (e.g., platform 102) and across the content platforms (e.g., platforms 104, 106, 108, 110). By monitoring 614 the evolution of the piece of content (e.g., content 118), information monitoring process 10 may monitor the manner in which the piece of content (e.g., content 118) changes over time. Is the piece of content (e.g., content 118) getting harder/more concerning over time (e.g., "Show up at his house and tell him how you feel"). Or is the piece of content (e.g., content 118) getting softer/less concerning over time (e.g., "This is not a big deal, as we elected Politician X because of his independence".

As discussed above, information monitoring process 10 may obtain electronic identification data (e.g., electronic identification data 60) for the user (e.g., user 36) who published the piece of content (e.g., content 118). And through the use of such electronic identification data 60, information monitoring process 10 may determine 616 a publisher of the piece of content (e.g., content 118).

As discussed above, such electronic identification data (e.g., electronic identification data 60) for the specific individual (e.g., user 36) may define e.g., the location and identity of the specific individual (e.g., user 36) and may be accomplished via various methodologies, all of which were discussed above.

Figure 8:
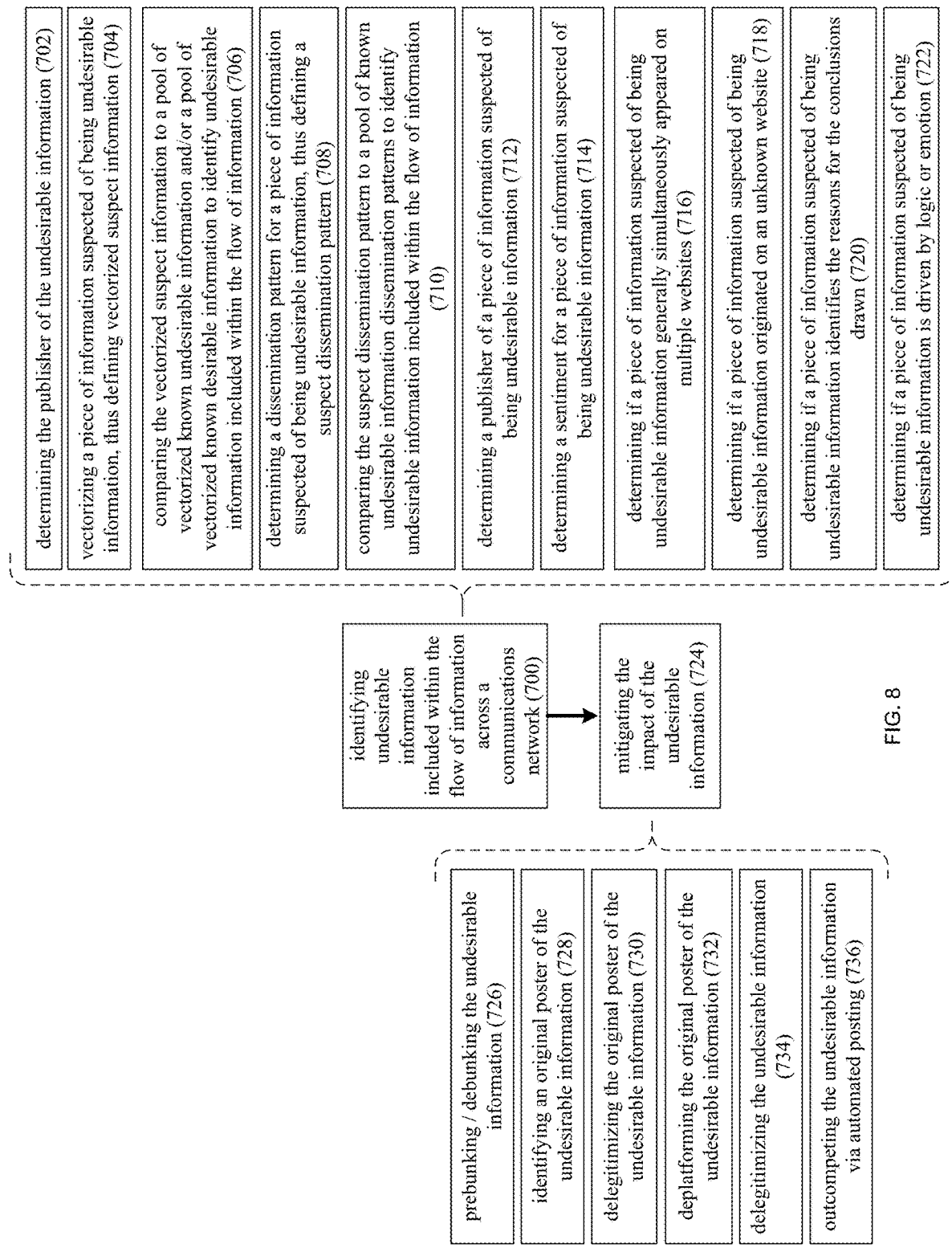
FIG. 8 is a flowchart of the information monitoring process of FIG. 1 according to an embodiment of the present disclosure.

6) Mitigating Undesirable Information:

Referring also to FIG. 8 and as will be discussed below in greater detail, information monitoring process 10 may be configured to identify undesirable information included within the flow of information across a communications network and mitigate the impact of the same.

Specifically, information monitoring process 10 may identify 700 undesirable information (e.g., undesirable information 122) included within the flow of information (e.g., flow of information 124) across a communications network (e.g., communications network 100). As discussed above, this communications network (e.g., communications network 100) may include a plurality of communications platforms (e.g., platforms 102, 104, 106, 108, 110).

The undesirable information (e.g., undesirable information 122) may include one or more of: malinformation; misinformation; and disinformation.

Malinformation: Malinformation may refer to the dissemination of information with the intent to harm, deceive, or damage the reputation of individuals or entities. Unlike misinformation or disinformation, malinformation does not necessarily involve false content. Instead, it involves the strategic exposure of genuine, often private or sensitive, information to create a negative impact. Malinformation may include the intentional leaking of confidential data, private communications, or personal details with the goal of causing harm, embarrassment, or distress to the subject. This type of harmful information sharing can occur through various channels, including social media platforms, online forums, or traditional media outlets.

Misinformation: Misinformation may refer to the spread of false or inaccurate information, often unintentionally, leading to the dissemination of misleading content. It may arise from misunderstandings, misinterpretations, or the lack of fact-checking before sharing information. Misinformation can spread rapidly, especially in the age of social media, where individuals share content quickly without thorough verification. While misinformation may not always involve malicious intent, its impact on public perception and decision-making can be significant, making efforts to combat and correct misinformation crucial for maintaining an informed and educated society.

Disinformation: Disinformation involves the intentional creation and spread of false or misleading information with the purpose of deceiving, manipulating, or influencing public opinion. Unlike misinformation, disinformation is characterized by a deliberate intent to deceive, often driven by political, ideological, or malicious motives. Perpetrators of disinformation may employ various tactics, including the creation of fake news, propaganda, or the use of manipulated images and videos. Disinformation campaigns can target individuals, organizations, or even entire nations, seeking to sow discord, create confusion, or advance a particular agenda. Addressing and countering disinformation requires a multi-faceted approach involving media literacy, fact-checking, and efforts to hold disseminators accountable for their deceptive actions.

The communications network (e.g., communications network 100) may include one or more of: one or more social media platforms; one or more websites; one or more video-sharing platforms; one or more virtual reality platforms; one or more gaming platforms; one or more messaging platforms; one or more financial platforms; and one or more blog platforms, as all of which were described above.

When identifying 700 undesirable information (e.g., undesirable information 122) included within the flow of information (e.g., flow of information 124) across a communications network (e.g., communications network 100), information monitoring process 10 may determine 702 the publisher of the undesirable information (e.g., undesirable information 122). By determining 702 the publisher of the undesirable information (e.g., undesirable information 122), information monitoring process 10 may be able to determine e.g., whether the publisher is a human being versus an automated bot, whether the publisher is a famous person versus a non-famous person, whether the publisher is a person with a large following versus a person with a small/no following, whether the publisher was "spun up" to publish the undesirable information (e.g., undesirable information 122) and has no history prior to such publication, etc.

As discussed above, information monitoring process 10 may obtain electronic identification data (e.g., electronic identification data 60) and, through the use of such electronic identification data 60, information monitoring process 10 may determine 702 a publisher of the undesirable information (e.g., undesirable information 122). As discussed above, such electronic identification data (e.g., electronic identification data 60) may define e.g., the location and identity of the publisher of undesirable information (e.g., undesirable information 122) and may be accomplished via various methodologies, all of which were discussed above.

When identifying 700 undesirable information (e.g., undesirable information 122) included within the flow of information (e.g., flow of information 124) across a communications network (e.g., communications network 100), information monitoring process 10 may vectorize 704 a piece of information suspected of being undesirable information (e.g., undesirable information 122), thus defining vectorized suspect information (e.g., vectorized information 66), wherein information monitoring process 10 may compare 706 the vectorized suspect information (e.g., vectorized information 66) to a pool of vectorized known undesirable information and/or a pool of vectorized known desirable information (e.g., collectively shown as pool of vectorized known information 68) to identify undesirable information (e.g., undesirable information 122) included within the flow of information (e.g., flow of information 124).

Vectorizing information may refer to the process of converting textual or numerical data into a mathematical representation called a vector. In the context of natural language processing (NLP) and machine learning, vectorization is often applied to convert words, phrases, or entire documents into numerical vectors, which are then used as input for various algorithms.

There are different methods for vectorizing information, which include but are not limited to:

Bag-of-Words (BoW): In the bag-of-words model, each document is represented as a vector where each dimension corresponds to a unique word in the entire corpus. The value of each dimension indicates the frequency or presence of the corresponding word in the document. This approach disregards the order of words in the document but captures information about their occurrence.

Term Frequency-Inverse Document Frequency (TF-IDF): TF-IDF is another method used for vectorization. It takes into account not only the frequency of words in a document but also their importance across the entire corpus. Words that are common in a specific document but rare across the corpus receive higher weights, emphasizing their significance.

Word Embeddings: Word embeddings, such as Word2Vec, GloVe, and FastText, are advanced vectorization techniques that represent words as dense vectors in a continuous vector space. These embeddings capture semantic relationships between words, and similar words have similar vector representations. This method is effective at capturing context and semantic meaning.

Doc2Vec: Doc2Vec extends the concept of word embeddings to entire documents. It assigns a unique vector representation to each document, capturing the overall context and semantics of the document. This allows for measuring document similarity and performing various NLP tasks.

Numerical Vectorization: In domains like data analysis, numerical vectorization involves converting numerical data into vector form. Each data point becomes a vector, and the dimensions of the vector represent different features or attributes of the data.

Vectorizing information is crucial in machine learning and data analysis as it transforms raw, unstructured data into a format that algorithms can process effectively. It facilitates tasks such as text classification, sentiment analysis, and clustering by providing a numerical representation that captures the essential characteristics of the data. The choice of vectorization method depends on the specific requirements of the task and the nature of the data being processed.

When identifying 700 undesirable information (e.g., undesirable information 122) included within the flow of information (e.g., flow of information 124) across a communications network (e.g., communications network 100), information monitoring process 10 may determine 708 a dissemination pattern for a piece of information suspected of being undesirable information (e.g., undesirable information 122), thus defining a suspect dissemination pattern (e.g., suspect dissemination pattern 70); wherein information monitoring process 10 may compare 710 the suspect dissemination pattern (e.g., suspect dissemination pattern 70) to a pool of known undesirable information dissemination patterns (e.g., pool of known undesirable information dissemination patterns 72) to identify undesirable information (e.g., undesirable information 122) included within the flow of information (e.g., flow of information 124).

Oftentimes, undesirable information (e.g., undesirable information 122) spreads in a certain way across a communications network (e.g., communications network 100). For example, such undesirable information (e.g., undesirable information 122) may initially be published/revised/republished in the darker portions of a communications network (e.g., communications network 100), collectively referred to as the "dark web".

As discussed above, the dark web is a part of the internet that is intentionally hidden and inaccessible through standard web browsers. It is a subset of the deep web, which includes all parts of the web that are not indexed by traditional search engines. Unlike the surface web, which is easily accessible and indexed by search engines, the dark web requires special tools and software to access.

Here are some key characteristics of the dark web:

Anonymity: Users on the dark web often remain anonymous through the use of encryption and tools like Tor (The Onion Router), which helps in routing internet traffic through a series of volunteer-operated servers to conceal a user's location and usage from network surveillance or traffic analysis.

Content: The dark web hosts a variety of websites and services, some of which are legal and legitimate, while others are associated with illegal activities. Legal content might include forums, blogs, or services that prioritize privacy. However, the dark web is also known for hosting illegal marketplaces, hacking forums, and other illicit activities.

Illegal Marketplaces: Some parts of the dark web are infamous for hosting illegal marketplaces where users can buy and sell drugs, stolen data, hacking tools, counterfeit currency, and other illegal goods and services.

Cybersecurity Concerns: The dark web is often associated with cybercriminal activities, including the sale of hacking tools, stolen data, and other forms of cyber threats. It's a space where individuals with malicious intent can collaborate and exchange information.

Accordingly, monitoring the manner in which a piece of content spreads through a communications network (e.g., communications network 100) may assist information monitoring process 10 in identifying 700 undesirable information (e.g., undesirable information 122) included within the flow of information (e.g., flow of information 124) across a communications network (e.g., communications network 100).

When identifying 700 undesirable information (e.g., undesirable information 122) included within the flow of information (e.g., flow of information 124) across a communications network (e.g., communications network 100), information monitoring process 10 may perform one or more of the following:

determine 712 a publisher of a piece of information suspected of being undesirable information (e.g., undesirable information 122). For example, is the publisher of such suspected information a reputable publisher or someone known for publishing undesirable information?

determine 714 a sentiment for a piece of information suspected of being undesirable information. For example, what is the attitude of the suspected information? Is it agitated or high-strung or calm and informative?

determine 716 if a piece of information suspected of being undesirable information generally simultaneously appeared on multiple websites. Did the suspected information simultaneously appear in generally the same format at 100s of places all at once? Or did it grow organically across the communications network (e.g., communications network 100)?

determine 718 if a piece of information suspected of being undesirable information originated on an unknown website. Did the suspected information originally appear on a trusted and/or known news website? Or did the suspected information first appear on an unknown/irreputable website?

determine 720 if a piece of information suspected of being undesirable information identifies the reasons for the conclusions drawn. Did the suspected information simply provide facts so that the reader can draw their own conclusions? Or was the suspected information lacking of facts and basically telling the reader what to think?

determine 722 if a piece of information suspected of being undesirable information is driven by logic or emotion. Did the suspected information provide content in a calm and even-handed fashion? Or was the suspected information very emotional and lacking of logic?

Once identified 700 as undesirable information (e.g., undesirable information 122). information monitoring process 10 may mitigate 724 the impact of the undesirable information (e.g., undesirable information 122).

For example and when mitigating 724 the impact of the undesirable information, information monitoring process 10 may prebunk/debunk 726 the undesirable information.

Prebunking Information: Prebunking information involves proactive efforts to inoculate individuals against misinformation or disinformation before they encounter it. Unlike debunking, which occurs after exposure to false information, prebunking aims to equip people with the necessary tools to resist and critically evaluate misleading content in advance. This approach often includes educational initiatives, media literacy programs, and awareness campaigns designed to build resilience to misinformation by enhancing individuals' ability to discern credible sources, question information, and recognize common tactics used to spread false narratives. By preemptively fostering a culture of skepticism and critical thinking, prebunking information seeks to empower individuals to navigate the complex landscape of information and make informed decisions.

Debunking Information: Debunking information involves the process of exposing and discrediting false or misleading claims after they have been disseminated. Debunking aims to correct misinformation, clarify facts, and provide evidence-based information to counteract the impact of false narratives. This can be done through fact-checking, investigative journalism, or public awareness campaigns that highlight inaccuracies and falsehoods. While debunking plays a crucial role in mitigating the harm caused by misinformation or disinformation, it often faces challenges, including the persistence of false beliefs even after correction. Nevertheless, debunking efforts contribute to the ongoing battle against the spread of false information by providing accurate and reliable information to the public.

Further and when mitigating 724 the impact of the undesirable information (e.g., undesirable information 122), information monitoring process 10 may identify 728 an original poster of the undesirable information (e.g., undesirable information 122).

As discussed above, information monitoring process 10 may obtain electronic identification data (e.g., electronic identification data 60) and, through the use of such electronic identification data 60, information monitoring process 10 may determine an original poster of the undesirable information (e.g., undesirable information 122). As discussed above, such electronic identification data (e.g., electronic identification data 60) may define e.g., the location and identity of the original poster of the undesirable information (e.g., undesirable information 122) and may be accomplished via various methodologies, all of which were discussed above.

Once identified 728, information monitoring process 10 may delegitimize 730 the original poster of the undesirable information (e.g., undesirable information 122).

To delegitimize a poster of content means to undermine or question the credibility, authority, or legitimacy of the person who posted the content. This can be done through various means, such as casting doubt on their qualifications, expertise, intentions, or the accuracy of the information they provide. Delegitimizing a poster is often a strategy employed in online discussions, debates, or disputes, and it can have a significant impact on how others perceive and engage with the content.

Several tactics may be used to delegitimize a poster:
Questioning Expertise: One common approach is to challenge the individual's expertise or qualifications in the subject matter. This involves raising doubts about their knowledge, experience, or credentials, with the aim of diminishing the perceived value of their contributions.
Highlighting Biases or Motivations: Delegitimizing may involve pointing out potential biases or personal motivations that could influence the poster's perspective. Accusing someone of having a hidden agenda or being driven by personal interests can cast doubt on the objectivity of their content.
Attacking Personal Character: Personal attacks, including character assassination or ad hominem arguments, are sometimes used to delegitimize a poster. This involves focusing on the individual's personal traits, behavior, or history rather than addressing the substance of their content.
Discrediting Sources: If the poster cites sources or references, attempts may be made to discredit those sources. This can involve questioning the reliability, credibility, or bias of the information, thereby casting doubt on the validity of the poster's content.
Spreading Misinformation: Some may try to delegitimize a poster by spreading misinformation about them. This could involve false accusations, rumors, or the distortion of facts to tarnish the person's reputation.

Further and once identified 728, information monitoring process 10 may deplatform 732 the original poster of the undesirable information (e.g., undesirable information 122).

To deplatform a poster of content means to revoke or restrict an individual's access to a specific platform or online space, effectively removing their ability to share content or engage with the audience on that particular platform. Deplatforming is a measure taken by platform administrators or content hosting services to address various issues, including violations of community guidelines, terms of service, or ethical standards. It is a form of moderation that aims to limit the reach and impact of a user whose behavior is deemed inappropriate, harmful, or in violation of the platform's rules.

Deplatforming can involve a range of actions:
Account Suspension or Ban: The most direct form of deplatforming is suspending or banning a user's account. This prevents them from accessing the platform and posting new content. The decision to suspend or ban an account is typically based on a history of rule violations, harassment, hate speech, or other forms of misconduct.
Content Removal: Platforms may choose to selectively remove specific content posted by an individual, particularly if the content violates community standards. This approach allows the user to remain on the platform but restricts the visibility of specific content.
Demonetization: For platforms that involve monetization, such as ad revenue sharing or sponsored content, deplatforming can also involve demonetizing the user. This means removing the ability for the individual to earn revenue from their content.
Shadow Banning: Some platforms implement a form of deplatforming known as shadow banning, where a user's content is made less visible to others without their knowledge. This can include reducing the visibility of their posts in feeds or search results.

Additionally and when mitigating 724 the impact of the undesirable information (e.g., undesirable information 122): information monitoring process 10 may delegitimize 734 the undesirable information (e.g., undesirable information 122).

Delegitimizing may refer to tactics employed to undermine the credibility, visibility, or perceived legitimacy of specific content online. These strategies are often used to manipulate public opinion, influence discussions, or distort the narrative around certain topics. Here's an overview of various methodologies:
Bot Army: A bot army consists of a large number of automated accounts (bots) that can be programmed to perform specific actions, such as posting comments, sharing content, or interacting with posts. By deploying a bot army, individuals or groups can artificially amplify the reach or engagement of certain content, creating an illusion of popularity or support. Conversely, bot armies can also be used to flood discussions with spam, creating noise and diverting attention away from legitimate content.
Upvote/Downvote Manipulation: On platforms that use voting mechanisms, such as upvoting or downvoting on social media or discussion forums, manipulating these votes can be a tactic to control the visibility and perceived credibility of information. Upvoting can artificially boost the prominence of certain content, making it more visible to users. Conversely, downvoting can be used to bury content, reduce its visibility, and create the impression of disapproval.
Change of Directions: Changing directions involves steering discussions away from the main topic or narrative. This can be achieved by introducing unrelated content, shifting the focus of the conversation, or employing diversionary tactics. By changing the direction of a discussion, individuals or groups aim to dilute the impact of undesirable information and shift the narrative in a more favorable direction.

Further and when mitigating 724 the impact of the undesirable information (e.g., undesirable information 122), information monitoring process 10 may outcompete 736 the undesirable information (e.g., undesirable information 122) via automated posting.

Outcompeting content through automated posting is a strategy where automated tools or bots are used to flood a platform with a large volume of content in an attempt to dominate or overshadow other content. This strategy can be employed on various online platforms, such as social media, forums, or websites as follows:

- Automated Posting: Automated tools or bots are programmed to generate and publish a high volume of content rapidly. These tools can be set to post text, links, images, or other types of content.
- Frequency and Volume: The strategy involves posting content at a frequency and volume that surpasses the posting activity of other users or entities on the platform. This high frequency can flood the platform, making it challenging for other content to gain visibility.
- Diverse Content Types: Automated systems can be configured to post a variety of content types to diversify the range of information being shared. This may include text posts, images, links, or any other format supported by the platform.
- Keyword Manipulation: Content generated by automated tools may be optimized for specific keywords or topics to increase visibility in search results or trending sections.
- Engagement Metrics: Some strategies may involve artificially inflating engagement metrics (likes, comments, shares) to make the content appear popular and gain further visibility.
- Crowding Out Other Content: By flooding the platform with a large volume of automated content, the goal is to crowd out or push down the visibility of other content. This can impact the organic reach and discoverability of content shared by genuine users.
- Purpose and Motivation: The motivation behind outcompeting content through automated posting can vary. It might be done for promotional purposes, to spread a particular message, or, in some cases, to disrupt and create chaos on the platform.

Figure 9:
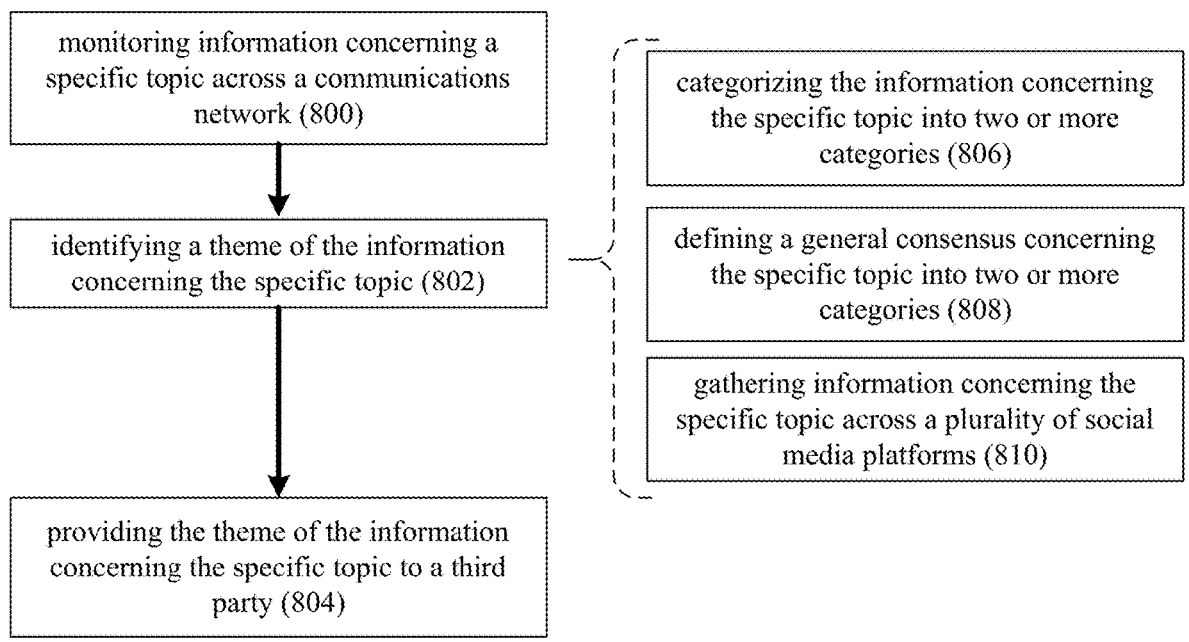
FIG. 9 is a flowchart of the information monitoring process of FIG. 1 according to an embodiment of the present disclosure.

7) Information Tracking Use Case:

Referring also to FIG. 9 and as will be discussed below in greater detail, information monitoring process 10 may be configured to monitor information concerning a specific topic across a communications network and identify a theme of the information concerning the specific topic.

Specifically, information monitoring process 10 may monitor 800 information (e.g., information 124) concerning a specific topic across a communications network (e.g., communications network 100).

The specific topic may include one or more of: information concerning a financial security; information concerning a political position; information concerning a public expenditure; and information concerning a product/service.

- A Financial Security: A financial security is a tradable asset representing a financial value or ownership interest. Common types include stocks, bonds, and derivatives, each with unique characteristics and risk profiles. Investors often buy financial securities as part of a diversified portfolio, seeking returns through capital appreciation, dividends, or interest payments. The value of financial securities is influenced by market forces, economic conditions, and the performance of the issuing entity. Investors assess various factors, including financial statements, market trends, and risk factors, to make informed decisions about buying, selling, or holding financial securities. Regulatory bodies often oversee the issuance and trading of financial securities to ensure transparency, fairness, and the integrity of financial markets.
- A Political Position: A political position may refer to an individual's or a party's stance on key issues and policies within the political landscape. This includes views on social, economic, and foreign policy matters, reflecting a broader ideological perspective. Political positions are articulated through speeches, party platforms, and legislative actions, providing voters with insight into the values and priorities of political candidates or parties. Transparency and effective communication of political positions are essential in democratic systems, allowing voters to make informed choices based on alignment with their own beliefs and values. Political positions can evolve over time, shaped by public discourse, changing societal norms, and responses to dynamic challenges.
- A Public Expenditure: A public expenditure may refer to the allocation and use of government funds for various programs, services, and infrastructure projects. This encompasses government spending on education, healthcare, defense, public infrastructure, and social welfare, among other areas. Public expenditure information is typically outlined in government budgets, financial reports, and expenditure statements. Transparency in public expenditure is crucial for accountability and citizen engagement, allowing taxpayers to understand how their money is being used, evaluate the effectiveness of government programs, and participate in discussions about fiscal priorities. Effective management of public expenditure is a key responsibility of government officials to ensure efficient use of resources and the delivery of essential public services.
- A Product/Service: A product or service may refer to an offering in the marketplace that fulfills a consumer's need or want. Products are tangible items, while services are intangible actions or experiences provided by businesses. Product information includes details about features, specifications, and benefits, enabling consumers to make informed purchasing decisions. Services, on the other hand, may be described through service offerings, customer testimonials, and service agreements. Clear and accurate communication of product or service information is essential for building consumer trust, fostering brand loyalty, and ensuring customer satisfaction. This information is often conveyed through marketing materials, product labels, user manuals, and online platforms, providing consumers with the knowledge they need to assess the value and suitability of the product or service.

For this example, assume that the specific topic is content 112, namely a political advertisement for Candidate X stating that they support Position 3; wherein information (e.g., information 124) concerns the discussion of content 112 (e.g., the discussion that Candidate X supports Position 3).

As discussed above, the communications network (e.g., communications network 100) may include one or more of: one or more social media platforms; one or more websites; one or more video-sharing platforms; one or more virtual reality platforms; one or more gaming platforms; one or more messaging platforms; one or more financial platforms; and one or more blog platforms, all of which were discussed above.

Information monitoring process 10 may identify 802 a theme (e.g., theme 74) of the information (e.g., information 124) concerning the specific topic (e.g., content 112 which states that Candidate X supports Position 3).

Once identified 802, information monitoring process 10 may provide 804 the theme (e.g., theme 74) of the information (e.g., information 124) concerning the specific topic (e.g., content 112 which states that Candidate X supports Position 3) to a third party (e.g., third party 54).

In this example, the third party (e.g., third party 54) may include one or more of: a potential investor in a financial security; a potential supporter in a political position; a potential supporter of a public expenditure; and a potential supporter of a product/service.

- Potential Investor in a Financial Security: A potential investor in a financial security is an individual or entity considering the allocation of capital to various investment instruments such as stocks, bonds, or other financial assets. This individual assesses the potential risks and rewards associated with different securities based on factors such as market trends, financial performance, and economic indicators. The decision-making process involves conducting thorough research, analyzing financial statements, and evaluating the overall investment landscape to make informed choices that align with the investor's financial goals and risk tolerance. Effective communication from financial institutions, transparent disclosures, and regulatory oversight contribute to building trust with potential investors, fostering a climate of confidence in the financial markets.
- Potential Supporter in a Political Position: A potential supporter in a political position is an individual considering alignment with the views and policies articulated by a political candidate or party. This involves assessing the candidate's stance on key issues, evaluating their track record, and understanding their vision for governance. Political campaigns use various communication channels, such as speeches, manifestos, and social media, to convey their positions and connect with potential supporters. Transparency and authenticity in presenting political positions are crucial for gaining trust and inspiring individuals to actively support a candidate or party through activities like volunteering, donating, or voting. The engagement of potential supporters plays a pivotal role in the democratic process, shaping the outcome of elections and influencing the direction of public policy.
- Potential Supporter of a Public Expenditure: A potential supporter of a public expenditure is an individual or group considering endorsement or approval of government spending on specific programs, services, or projects. This involves assessing the impact and benefits of the proposed expenditure on the community or society at large. Transparency in communicating the purpose, goals, and expected outcomes of the public expenditure is essential to garner support. Public engagement, town hall meetings, and information campaigns contribute to informing potential supporters about how their tax dollars will be utilized. The involvement of potential supporters in discussions about public expenditure fosters a sense of civic participation and ensures that government decisions align with the priorities and needs of the community.
- Potential Supporter of a Product/Service: A potential supporter of a product or service is an individual considering the purchase or endorsement of a particular offering in the marketplace. This involves evaluating product features, quality, reviews, and brand reputation to determine whether the product or service meets their needs or preferences. Marketing strategies, including advertising, product demonstrations, and customer testimonials, play a crucial role in influencing potential supporters. The transparency of product information, clear communication of benefits, and responsive customer service contribute to building trust and loyalty. Potential supporters may engage with the brand through social media, online reviews, or word-of-mouth recommendations, influencing the overall perception of the product or service within the market.

When identifying 802a theme (e.g., theme 74) of the information (e.g., information 124) concerning the specific topic (e.g., content 112 which states that Candidate X supports Position 3), information monitoring process 10 may gather 806 information concerning the specific topic (e.g., content 112 which states that Candidate X supports Position 3) across a plurality of social media platforms (e.g., platforms 102, 104, 106, 108, 110).

As discussed above, communications network 100 (e.g., the internet) is shown to include a plurality of communications platforms (e.g., platforms 102, 104, 106, 108, 110) defined therein, wherein examples of such communication platforms (e.g., platforms 102, 104, 106, 108, 110) may include but are not limited to one or more of: one or more social media platforms; one or more websites; one or more video-sharing platforms; one or more virtual reality platforms; one or more gaming platforms; one or more messaging platforms; one or more financial platforms; and one or more blog platforms, all of which were discussed above.

Accordingly and in order to accurately gauge the theme (e.g., theme 74) of the information (e.g., information 124) concerning the specific topic (e.g., content 112 which states that Candidate X supports Position 3), information monitoring process 10 may gather 806 information (e.g., information 124) concerning the specific topic (e.g., content 112 which states that Candidate X supports Position 3) across a plurality of social media platforms (e.g., platforms 102, 104, 106, 108, 110).

When identifying 802a theme (e.g., theme 74) of the information (e.g., information 124) concerning the specific topic (e.g., content 112 which states that Candidate X supports Position 3), information monitoring process 10 may categorize 808 the information (e.g., information 124) concerning the specific topic (e.g., content 112 which states that Candidate X supports Position 3) into two or more categories. For example, information 124 may be placed into three categories: a) those who agree with Candidate X supporting Position 3; b) those who disagree with Candidate X supporting Position 3; and c) those who neither agree nor disagree with Candidate X supporting Position 3.

When identifying 802a theme (e.g., theme 74) of the information (e.g., information 124) concerning the specific topic (e.g., content 112 which states that Candidate X supports Position 3), information monitoring process 10 may define 810 a general consensus concerning the specific topic (e.g., content 112 which states that Candidate X supports Position 3) into two or more categories. Continuing with the above-stated example, assume that information monitoring process 10 determines that information 124 indicates the following: a) 13% of people agree with Candidate X supporting Position 3; b) 82% of people disagree with Candidate X supporting Position 3; and c) 5% of people neither agree nor disagree with Candidate X supporting Position 3. Accordingly, information monitoring process 10 may define 810 a general consensus concerning the specific topic (e.g., content 112 which states that Candidate X supports Position 3) as the vast majority of the people disagree with Candidate X supporting Position 3.

Accordingly and in this example, the theme (e.g., theme 74) of the information (e.g., information 124) concerning a specific topic (e.g., content 112 which states that Candidate X supports Position 3) was generally negative (e.g., 82% of people disagree with Candidate X supporting Position 3), which may result in the third party (e.g., third party 54) generally not supporting the specific topic (e.g., content 112 which states that Candidate X supports Position 3).

When information is generally negative and a third party is not supportive of a specific topic, it indicates a critical or unfavorable assessment of that particular subject. In this context, the third party, whether an individual, organization, or entity, has reviewed information related to the topic and formed a negative opinion or stance. The negative information may include drawbacks, concerns, criticisms, or any factors that contribute to a pessimistic view.

The lack of support from a third party implies a disapproval or a decision not to align with the topic due to the negative information available. This lack of support can manifest in various ways, such as public statements expressing disagreement, avoidance of association with the topic, or opposition to initiatives related to it. In essence, a generally negative information environment creates a climate of skepticism or dissent, and the third party's decision not to support the specific topic reflects its assessment of the overall negative aspects associated with it. This negative perception can influence public opinion and potentially impact the topic's reputation or standing within a community or broader context.

Conversely, if the theme (e.g., theme 74) of the information (e.g., information 124) concerning a specific topic (e.g., content 112 which states that Candidate X supports Position 3) was generally positive (e.g., 0.60% of the people agree with Candidate X supporting Position 3), such an outcome may result in the third party (e.g., third party 54) generally supporting the specific topic (e.g., content 112 which states that Candidate X supports Position 3).

When information is generally positive and a third party is supportive of the specific topic, it indicates a favorable perception or endorsement of that particular subject. In this context, the third party, which could be an individual, organization, or entity, has evaluated information related to the topic and formed a positive opinion or stance. The positive information may include favorable attributes, achievements, benefits, or any other factors that contribute to a constructive view.

Support from a third party implies an acknowledgment of the positive aspects associated with the topic, and this support can manifest in various ways, such as public endorsements, testimonials, or active participation. The third party may communicate its support through statements, actions, or engagement in initiatives related to the topic. In essence, a generally positive information environment fosters a supportive atmosphere, contributing to a favorable perception and potentially influencing others to view the topic positively as well.

Figure 10:
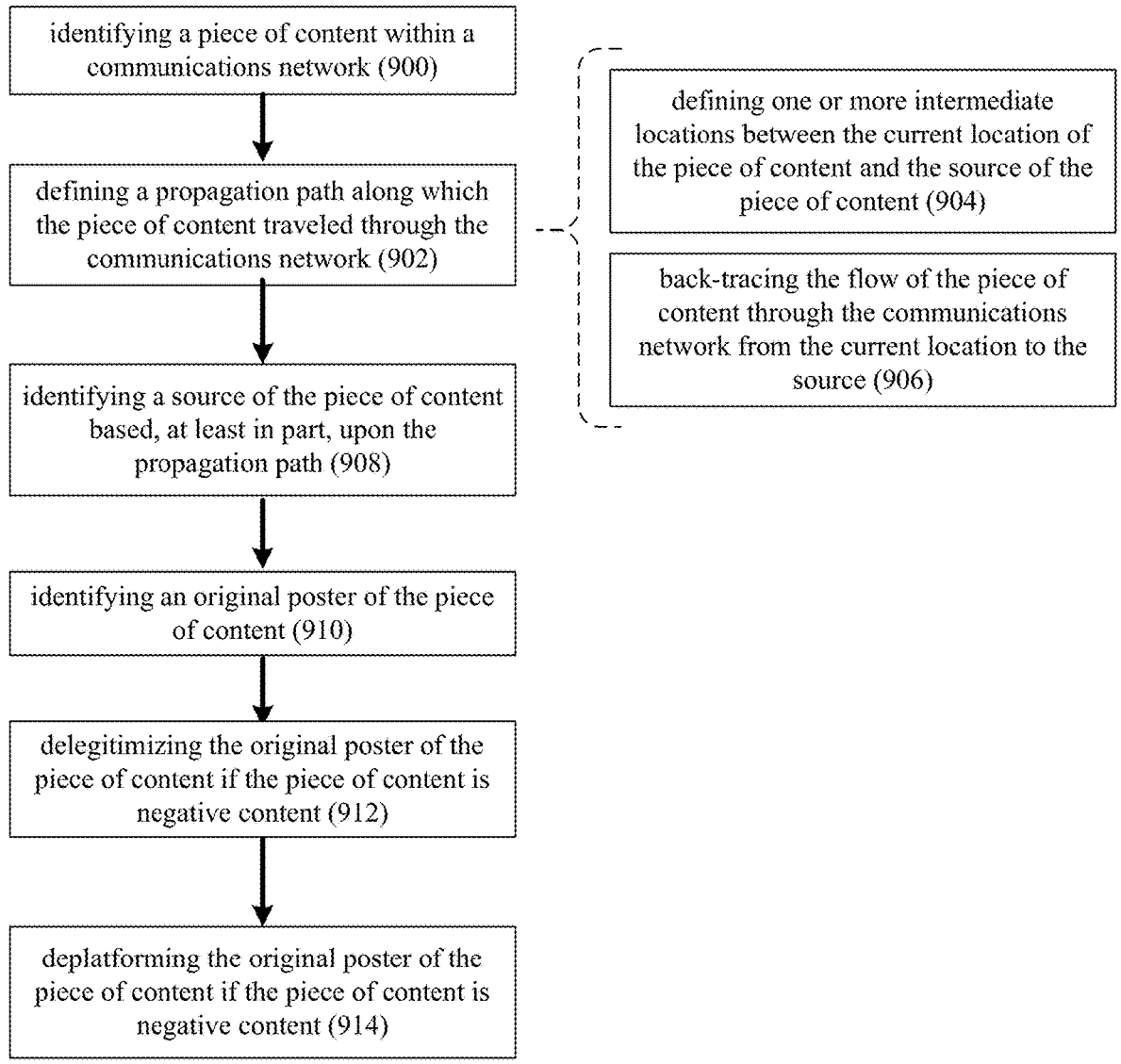
FIG. 10 is a flowchart of the information monitoring process of FIG. 1 according to an embodiment of the present disclosure.

8) Identifying an Information Source:

Referring also to FIG. 10 and as will be discussed below in greater detail, information monitoring process 10 may be configured to identify a piece of content within a communications network, define a propagation path for the same and identify a source of the piece of content (based, at least in part, upon the propagation path).

Specifically, information monitoring process 10 may identify 900 a piece of content (e.g., content 116) within a communications network (e.g., communications network 100).

As discussed above, the piece of content (e.g., content 116) may include one or more of: neutral content; negative content; and positive content.

Neutral Content: Neutral content may refer to information, media, or communication that lacks a distinct positive or negative bias, presenting facts or opinions in an unbiased manner. It aims to provide an objective view without influencing the audience's emotions or perceptions. Neutral content is often characterized by an absence of strong language, opinions, or emotional tone, facilitating a balanced and impartial presentation of information. This type of content is commonly found in news reporting, educational materials, and factual presentations, where the goal is to inform rather than sway opinions.

Negative Content: Negative content encompasses information, media, or communication that conveys a pessimistic, critical, or unfavorable perspective. This type of content may include criticism, complaints, or expressions of disapproval, intending to highlight shortcomings, challenges, or undesirable aspects of a subject. Negative content can be found in various forms, such as reviews, critiques, or news articles, and it often elicits emotional responses from the audience. While negative content can serve as a form of critique or warning, its impact on public perception underscores the importance of responsible and ethical communication practices.

Positive Content: Positive content may refer to information, media, or communication that communicates an optimistic, affirmative, or favorable viewpoint. This type of content aims to highlight the strengths, achievements, or positive aspects of a subject, fostering a sense of encouragement, inspiration, or support. Positive content can take various forms, including uplifting stories, motivational messages, or celebratory announcements, and it plays a crucial role in shaping a positive narrative and influencing audience attitudes. While positive content contributes to a more optimistic and uplifting media landscape, it is essential to maintain authenticity and balance in communication to build trust with the audience.

Examples of negative content (e.g., content 116) may include but are not limited to one or more of: malinformation; misinformation; and disinformation.

Malinformation: Malinformation may refer to the dissemination of information with the intent to harm, deceive, or damage the reputation of individuals or entities. Unlike misinformation or disinformation, malinformation does not necessarily involve false content. Instead, it involves the strategic exposure of genuine, often private or sensitive, information to create a negative impact. Malinformation may include the intentional leaking of confidential data, private communications, or personal details with the goal of causing harm, embarrassment, or distress to the subject. This type of harmful information sharing can occur through various channels, including social media platforms, online forums, or traditional media outlets.

Misinformation: Misinformation may refer to the spread of false or inaccurate information, often unintentionally, leading to the dissemination of misleading content. It may arise from misunderstandings, misinterpretations, or the lack of fact-checking before sharing information. Misinformation can spread rapidly, especially in the age of social media, where individuals share content quickly without thorough verification. While misinformation may not always involve malicious intent, its impact on public perception and decision-making can be significant, making efforts to combat and correct misinformation crucial for maintaining an informed and educated society.

Disinformation: Disinformation involves the intentional creation and spread of false or misleading information with the purpose of deceiving, manipulating, or influencing public opinion. Unlike misinformation, disinformation is characterized by a deliberate intent to deceive, often driven by political, ideological, or malicious motives. Perpetrators of disinformation may employ various tactics, including the creation of fake news, propaganda, or the use of manipulated images and videos. Disinformation campaigns can target individuals, organizations, or even entire nations, seeking to sow discord, create confusion, or advance a particular agenda. Addressing and countering disinformation requires a multi-faceted approach involving media literacy, fact-checking, and efforts to hold disseminators accountable for their deceptive actions.

Examples of positive content (e.g., content 116) may include but are not limited to one or more of: one or more image-based content; one or more audio-based content; one or more video-based content; one or more social media posts; one or more advertisements; one or more press releases; and one or more stories.

Image-Based Content: One or more image-based content may refer to a collection of visual materials, such as photographs, graphics, or illustrations, presented together. This could be a series of related images conveying a narrative, illustrating a concept, or providing a visual journey. Image-based content is commonly used in digital media, marketing, storytelling, and various communication platforms to engage and inform audiences visually.

Audio-Based Content: One or more audio-based content involves a compilation of sound elements, including but not limited to music, spoken word, or sound effects, presented as a cohesive unit. This type of content is prevalent in podcasts, music albums, or audio documentaries where a series of audio segments contribute to a broader theme or narrative. Audio-based content offers a dynamic and immersive experience, relying on auditory senses to convey information or evoke emotions.

Video-Based Content: One or more video-based content encompasses a sequence of moving visual elements, often including audio, to convey a story, share information, or entertain. This category includes video series, documentaries, or compilations where multiple video segments contribute to a comprehensive viewing experience. Video-based content is widely utilized across platforms like social media, streaming services, and educational websites, offering a versatile means of communication.

Social Media Posts: One or more social media posts involve a series of entries shared on social networking platforms, such as Facebook, Instagram, or Twitter. These posts can include text, images, videos, or a combination, and are typically organized to convey a specific message, document an event, or engage with an audience. Social media posts are an integral part of online communication, enabling individuals and organizations to share updates, opinions, and multimedia content with their followers.

Advertisements: One or more advertisements refer to a collection of promotional materials designed to market a product, service, or idea. This could include a series of print ads, digital banners, or video commercials strategically crafted to reach a target audience and convey key messages. Advertisements are essential in the business and marketing realm, employing visual and textual elements to create compelling narratives that encourage consumer engagement.

Press Releases: One or more press releases involve a series of official statements issued to the media to announce news, events, or information relevant to an organization. These releases are carefully crafted to provide journalists with essential details and quotes, ensuring accurate and consistent coverage. Press releases serve as a crucial tool for public relations, enabling companies, government agencies, or individuals to control the narrative and disseminate information to the public and stakeholders.

Stories: One or more stories encompass a series of narrative elements, often presented sequentially, to form a cohesive and engaging tale. This could include written stories, digital storytelling on platforms like Instagram or Snapchat, or even oral storytelling traditions. Stories serve as a fundamental means of human communication, allowing for the conveyance of information, culture, and emotions in a structured and relatable format.

As discussed above, the communications network (e.g., communications network 100) may include one or more of: one or more social media platforms; one or more websites; one or more video-sharing platforms; one or more virtual reality platforms; one or more gaming platforms; one or more messaging platforms; one or more financial platforms; and one or more blog platforms, all of which were discussed above.

Information monitoring process 10 may define 902 a propagation path (e.g., flow of information 124) along which the piece of content (e.g., content 116) traveled through the communications network (e.g., communications network 100).

For this example, assume that the piece of content (e.g., content 116) was discovered/first noticed in communications platform 110 and information monitoring process 10 would like to know where this piece of content (e.g., content 116) was first published. Accordingly, information monitoring process 10 may define 902 a propagation path (e.g., flow of information 124) along which content 116 traveled through communications network 100.

When defining 902 a propagation path (e.g., flow of information 124) along which the piece of content (e.g., content 116) traveled through the communications network (e.g., communications network 100), information monitoring process 10 may define 904 one or more intermediate locations between the current location of the piece of content (e.g., content 116) and the source of the piece of content (e.g., content 116). For this example, assume that information monitoring process 10 may define 904 several intermediate locations (e.g., communications platforms 104, 106, 108) between the current location (e.g., communications platform 110) of the piece of content (e.g., content 116) and the source (e.g., communications platform 102) of the piece of content (e.g., content 116).

When defining 902 a propagation path (e.g., flow of information 124) along which the piece of content (e.g., content 116) traveled through the communications network (e.g., communications network 100), information monitoring process 10 may back-trace 906 the flow of the piece of content (e.g., content 116) through the communications network (e.g., communications network 100) from the current location to the source.

Backtracing, in the context of the internet, may refer to the process of tracing the origin or source of digital content back to its point of origin or the user who created it. This is often done for various reasons, such as investigating cybercrimes, identifying the source of malicious activities, or enforcing content policies. Here are some general steps and methods involved in backtracing content:

- IP Address Tracking: Every device connected to the internet has an IP address. Tracing the IP address associated with certain online activities can provide information about the general geographic location and sometimes the internet service provider (ISP) of the user.
- Server Logs: If the content in question is hosted on a server or website, examining server logs can reveal details about visitors and their interactions. Server logs may include IP addresses, timestamps, and specific actions taken on the site.
- Digital Forensics: In cases of cybercrimes, digital forensics involves analyzing digital evidence to reconstruct events. This can include examining file metadata, timestamps, and other digital artifacts to trace the source of content.
- Metadata Analysis: Many types of digital files, such as images and documents, contain metadata that can include information about the creation date, location, and device used. Analyzing metadata can provide clues about the origin of the content.
- Social Media Investigation: If the content is shared on social media, investigating social media profiles and connections may help identify the user. Users often leave traces of their identity through profiles, posts, and interactions.
- User Account Information: Platforms and websites often require users to create accounts. Tracing user account information, including email addresses or usernames, can provide insights into the identity of the person behind the content.
- Legal Requests and Subpoenas: Law enforcement agencies and legal authorities may issue requests or subpoenas to internet service providers, hosting providers, or online platforms to obtain information about a user's identity and location.

Information monitoring process 10 may identify 908 a source of the piece of content (e.g., content 116) based, at least in part, upon the propagation path (e.g., flow of information 124). As discussed above and continuing with this example, the source of the piece of content (e.g., content 116) is communications platform 102.

Information monitoring process 10 may identify 910 an original poster of the piece of content (e.g., content 116). In this particular example and as discussed above, the original poster of the piece of content (e.g., content 116) is user 38. As discussed above, information monitoring process 10 may obtain electronic identification data (e.g., electronic identification data 60) and, through the use of such electronic identification data 60, information monitoring process 10 may determine the original poster (e.g., user 38) of the piece of content (e.g., content 116). As discussed above, such electronic identification data (e.g., electronic identification data 60) may define e.g., the location and identity of the original poster (e.g., user 38) of the piece of content (e.g., content 116) and may be accomplished via various methodologies, all of which were discussed above.

Information monitoring process 10 may delegitimize 912 the original poster (e.g., user 38) of the piece of content (e.g., content 116) if the piece of content (e.g., content 116) is negative content.

As discussed above, to delegitimize a poster of content means to undermine or question the credibility, authority, or legitimacy of the person who posted the content. This can be done through various means, such as casting doubt on their qualifications, expertise, intentions, or the accuracy of the information they provide. Delegitimizing a poster is often a strategy employed in online discussions, debates, or disputes, and it can have a significant impact on how others perceive and engage with the content.

Information monitoring process 10 may deplatform 914 the original poster (e.g., user 38) of the piece of content (e.g., content 116) if the piece of content (e.g., content 116) is negative content.

As discussed above, to deplatform a poster of content means to revoke or restrict an individual's access to a specific platform or online space, effectively removing their ability to share content or engage with the audience on that particular platform. Deplatforming is a measure taken by platform administrators or content hosting services to address various issues, including violations of community guidelines, terms of service, or ethical standards. It is a form of moderation that aims to limit the reach and impact of a user whose behavior is deemed inappropriate, harmful, or in violation of the platform's rules.

Alternatively, information monitoring process 10 may thank 916 the original poster (e.g., user 38) of the piece of content (e.g., content 116) if the piece of content (e.g., content 116) is positive content; and/or reward 918 the original poster (e.g., user 38) of the piece of content (e.g., content 116) if the piece of content (e.g., content 116) is positive content.

Figure 11:
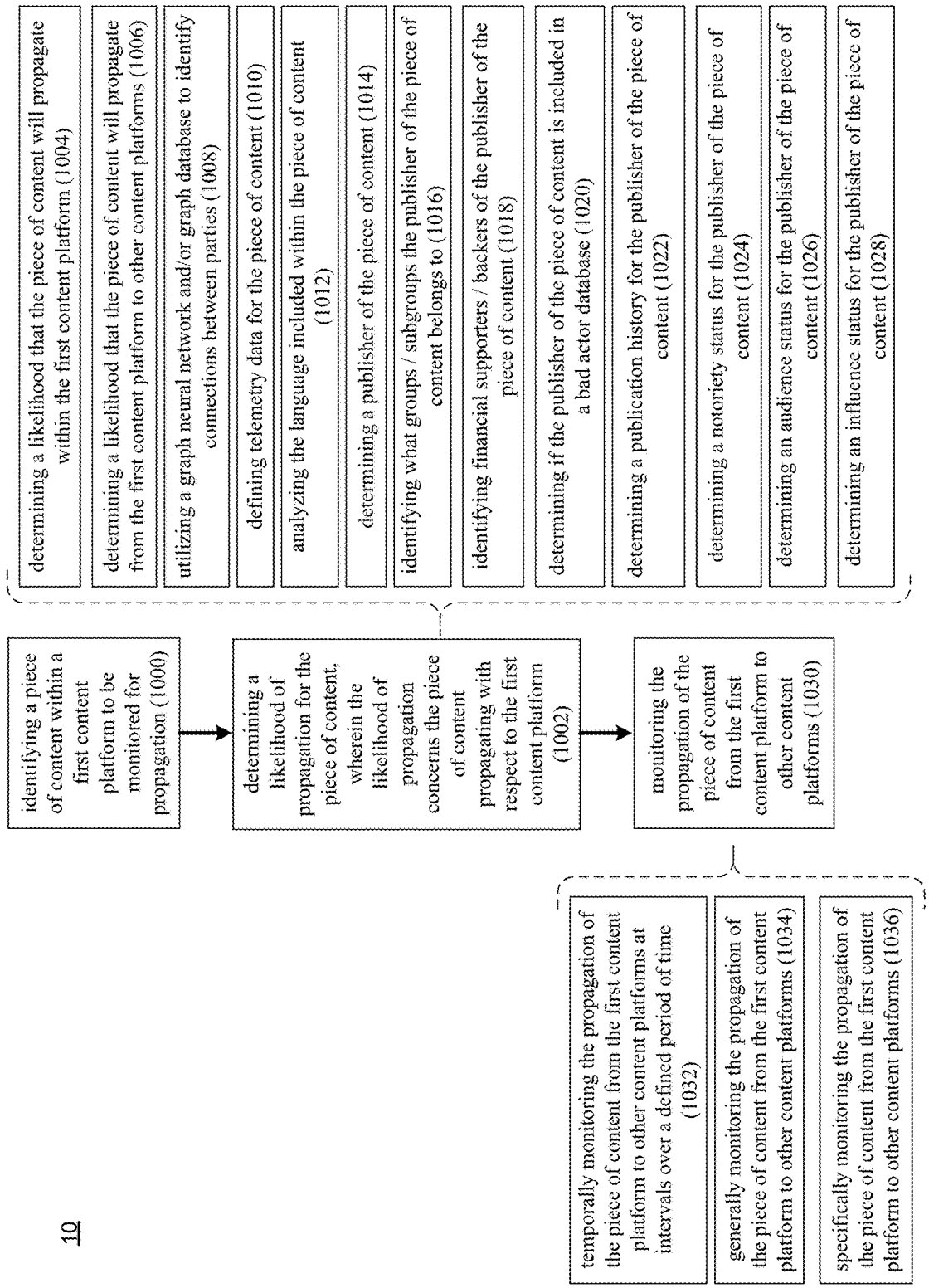
FIG. 11 is a flowchart of the information monitoring process of FIG. 1 according to an embodiment of the present disclosure.

9) Determining a Likelihood of Propagation:

Referring also to FIG. 11 and as will be discussed below in greater detail, information monitoring process 10 may be configured to identify a piece of content within a first content platform to be monitored for propagation and determine a likelihood of propagation for the piece of content.

Specifically, information monitoring process 10 may identify 1000 a piece of content (e.g., content 116) within a first content platform (e.g., communications platform 102) to be monitored for propagation.

Information monitoring process 10 may determine 1002 a likelihood of propagation for the piece of content (e.g., content 116), wherein the likelihood of propagation concerns the piece of content (e.g., content 116) propagating with respect to the first content platform (e.g., communications platform 102). For example, the piece of content (e.g., content 116) is probably not welcome news for the campaign of Candidate X, as content 116 voices outrage over Candidate X supporting Position 3. However, if information monitoring process 10 determines 1002 that the likelihood of propagation for the piece of content (e.g., content 116) is very low, should the campaign of Candidate X really be concerned content 116?

As discussed above, the first content platform (e.g., communications platform 102) may include one or more of: one or more social media platforms; one or more websites; one or more video-sharing platforms; one or more virtual reality platforms; one or more gaming platforms; one or more messaging platforms; one or more financial platforms; and one or more blog platforms, all of which were discussed above.

When determining 1002 a likelihood of propagation for the piece of content (e.g., content 116), information monitoring process 10 may perform one or more of the following:
  determine 1004 a likelihood that the piece of content (e.g., content 116) will propagate within the first content platform (e.g., communications platform 102). For example, will the piece of content (e.g., content 116) bounce around and be shared within the first content platform (e.g., communications platform 102)?
  determine 1006 a likelihood that the piece of content (e.g., content 116) will propagate from the first content platform (e.g., communications platform 102) to other content platforms (e.g., communications platforms 104, 106, 108, 110). For example and regardless of whether the piece of content (e.g., content 116) bounces around and is shared within the first content platform (e.g., communications platform 102), will the piece of content (e.g., content 116) be shared into other content platforms (e.g., communications platforms 104, 106, 108, 110)?

Further and when determining 1002 a likelihood of propagation for the piece of content (e.g., content 116), information monitoring process 10 may utilize 1008 a graph neural network and/or graph database (e.g., graph system 76) to identify connections between parties.

Graph neural networks (GNNs) and graph databases are powerful tools for analyzing connections between people, commonly represented as a network or graph. They operate on the principles of graph theory, which models relationships between entities as nodes and edges in a graph structure.

In a Graph Database, nodes represent individuals and contain information such as names, ages, and locations. Edges represent relationships or interactions between individuals, such as friendship or family ties. Graph databases allow for efficient querying and traversal of the graph structure, enabling the retrieval of information about individuals, the discovery of connections between people, and the identification of patterns within the network. Many graph databases use query languages like Cypher, specifically designed for expressing graph patterns and relationships.

On the other hand, a Graph Neural Network (GNN) is a neural network architecture designed for graph-structured data. GNNs learn embeddings (vector representations) for each node in the graph, capturing features and characteristics of individuals in a social network. Graph convolutional layers aggregate information from neighboring nodes, allowing the model to consider connections and relationships during the learning process. Once trained, GNNs can make predictions or inferences about new connections, identify influential individuals, or recommend connections based on learned patterns. GNNs find applications in social network analysis, recommendation systems, and fraud detection, leveraging their ability to model complex relationships. In summary, graph databases are efficient for querying and exploring existing relationships, while GNNs excel at learning patterns and making predictions based on the underlying graph structure. Combining these approaches can offer a comprehensive understanding of connections in a network.

Further and when determining 1002 a likelihood of propagation for the piece of content (e.g., content 116), information monitoring process 10 may perform one or more of the following
  define 1010 telemetry data for the piece of content (e.g., content 116). For example, is the publisher of content 116 a lone US citizen or a member of a team of bad actors that operate out of a troll hotspot in Saint Peterburg, Russia?
  analyze 1012 the language included within the piece of content. Is content 116 provided in a calm and even-handed fashion? Or is content 116 very emotional, using extreme language and lacking of logic?

Additionally and when determining 1002 a likelihood of propagation for the piece of content (e.g., content 116), information monitoring process 10 may perform one or more of the following:
  determine 1014 a publisher of the piece of content (e.g., content 116). For example, is the publisher of content 116 a reputable publisher or someone known for publishing undesirable information?
  identify 1016 what groups/subgroups the publisher of the piece of content (e.g., content 116) belongs to. Is the publisher of content 116 a law-abiding lone individual or a member of a team of bad actors (e.g., radical groups, extremist groups)?
  identify 1018 financial supporters/backers of the publisher of the piece of content. Is the publisher of content 116 a supporter of (or supported by) bad actors (e.g., dark money groups or mysterious parties)?
  determine 1020 if the publisher of the piece of content (e.g., content 116) is included in a bad actor database. Is the publisher of content 116 included in a bad actor database (e.g., not shown)?
  determine 1022 a publication history for the publisher of the piece of content (e.g., content 116). Has the publisher of content 116 published content before? Does the publisher of content 116 have a history of publishing undesirable information?
  determine 1024 a notoriety status for the publisher of the piece of content (e.g., content 116). Is the publisher of content 116 a well-known/famous individual?
  determine 1026 an audience status for the publisher of the piece of content (e.g., content 116). Does the publisher of content 116 have a large social media following?
  determine 1028 an influence status for the publisher of the piece of content (e.g., content 116). Is the publisher of content 116 an influencer?

Information monitoring process 10 may monitor 1030 the propagation of the piece of content (e.g., content 116) from the first content platform (e.g., communications platform 102) to other content platforms (e.g., communications platforms 104, 106, 108, 110).

As discussed above, the other content platform (e.g., communications platform 102) may include one or more of: one or more social media platforms; one or more websites; one or more video-sharing platforms; one or more virtual reality platforms; one or more gaming platforms; one or more messaging platforms; one or more financial platforms; and one or more blog platforms, all of which were discussed above.

When monitoring 1030 the propagation of the piece of content (e.g., content 116) from the first content platform (e.g., communications platform 102) to other content platforms (e.g., communications platforms 104, 106, 108, 110), information monitoring process 10 may temporally monitor 1032 the propagation of the piece of content (e.g., content 116) from the first content platform (e.g., communications platform 102) to other content platforms (e.g., communications platforms 104, 106, 108, 110) at intervals over a defined period of time. By temporally monitoring 1032 the propagation for the piece of content (e.g., content 116) from the first content platform (e.g., platform 102) to other content platforms (e.g., communications platforms 104, 106, 108, 110) at intervals over a defined period of time, information monitoring process 10 may determine how quickly the piece of content (e.g., content 116) is spreading.

When monitoring 1030 the propagation of the piece of content (e.g., content 116) from the first content platform (e.g., communications platform 102) to other content platforms (e.g., communications platforms 104, 106, 108, 110), information monitoring process 10 may generally monitor 1034 the propagation of the piece of content (e.g., content 116) from the first content platform (e.g., communications platform 102) to other content platforms (e.g., communications platforms 104, 106, 108, 110). By generally monitoring 1034 the propagation for the piece of content (e.g., content 116) from the first content platform (e.g., platform 102) to other content platforms (e.g., communications platforms 104, 106, 108, 110), information monitoring process 10 may determine e.g., the popularity of the piece of content (e.g., content 116) across the content platforms (e.g., platforms 102, 104, 106, 108, 110) over time.

When monitoring 1030 the propagation of the piece of content (e.g., content 116) from the first content platform (e.g., communications platform 102) to other content platforms (e.g., communications platforms 104, 106, 108, 110), information monitoring process 10 may specifically monitor 1036 the propagation of the piece of content (e.g., content 116) from the first content platform (e.g., communications platform 102) to other content platforms (e.g., communications platforms 104, 106, 108, 110). By specifically monitoring 1036 the propagation for the piece of content (e.g., content 116) from the first content platform (e.g., platform 102) to other content platforms (e.g., communications platforms 104, 106, 108, 110), information monitoring process 10 may track the people that are pushing the piece of content (e.g., content 116) across the content platforms (e.g., platforms 102, 104, 106, 108, 110) over time.

Figure 12:
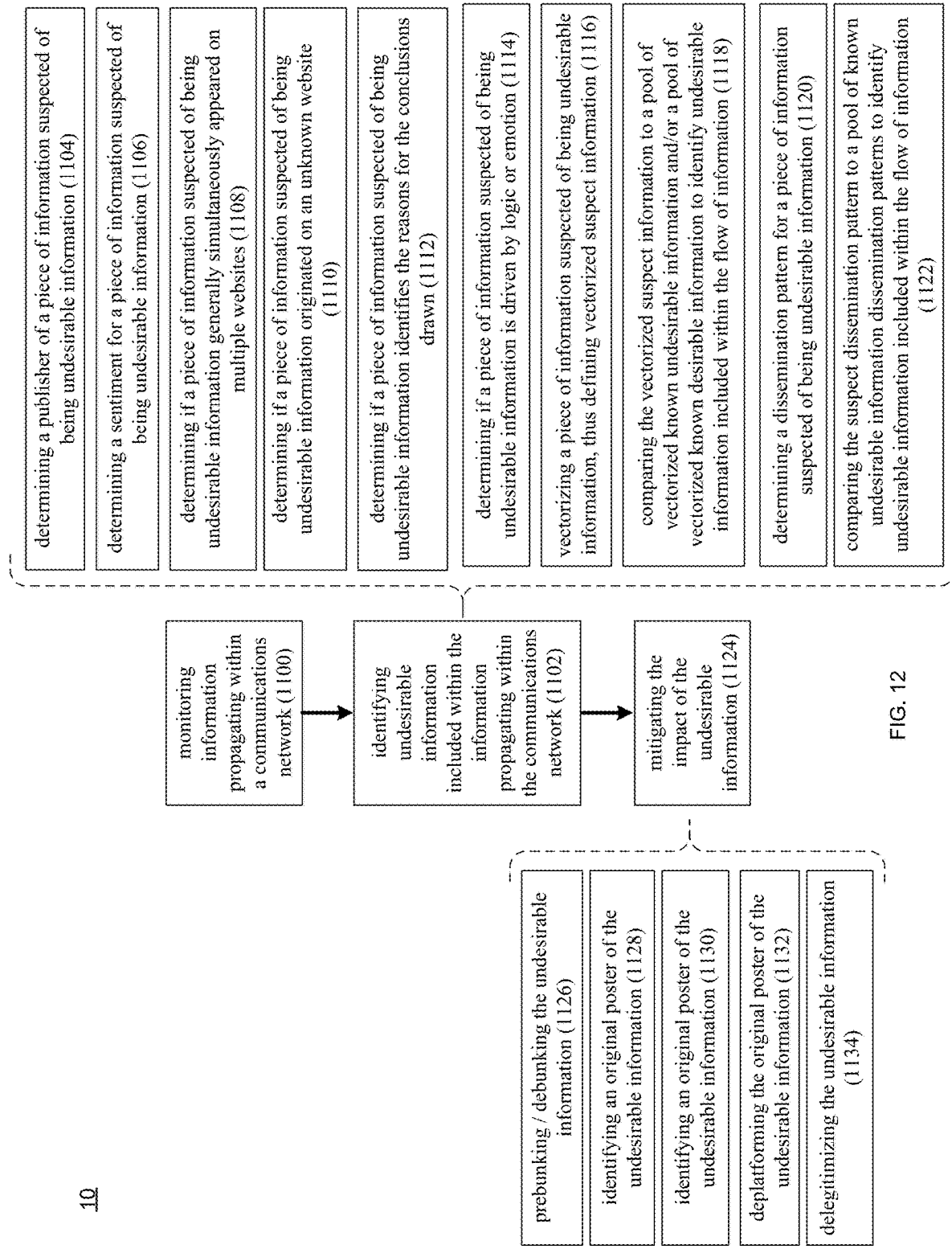
FIG. 12 is a flowchart of the information monitoring process of FIG. 1 according to an embodiment of the present disclosure.

10) Identifying Undesirable Information within an Information Flow:

Referring also to FIG. 12 and as will be discussed below in greater detail, information monitoring process 10 may be configured to monitor information propagating within a communications network and identify undesirable information included therein.

Specifically, information monitoring process 10 may monitor 1100 information propagating within a communications network (e.g., communications network 100). For example, information monitoring process 10 may monitor 1100 information included within the flow of information (e.g., flow of information 124) across communications network 100.

As discussed above, communications network (e.g., communications network 100) may include one or more of: one or more social media platforms; one or more websites; one or more video-sharing platforms; one or more virtual reality platforms; one or more gaming platforms; one or more messaging platforms; one or more financial platforms; and one or more blog platforms, all of which were discussed above.

Information monitoring process 10 may identify 1102 undesirable information (e.g., undesirable information 122) included within the information propagating within the communications network (e.g., communications network 100). As discussed above, the undesirable information (e.g., undesirable information 122) may include one or more of: malinformation; misinformation; and disinformation, all of which was discussed above.

When identifying 1102 undesirable information (e.g., undesirable information 122) included within the information propagating within the communications network (e.g., communications network 100), information monitoring process 10 may perform one or more of the following:

- determine 1104 a publisher of a piece of information suspected of being undesirable information (e.g., undesirable information 122). For example, is the publisher of content 116 a reputable publisher or someone known for publishing undesirable information?
- determine 1106 a sentiment for a piece of information suspected of being undesirable information (e.g., undesirable information 122). For example, what is the attitude of the suspected information? Is it agitated and high-strung or calm and informative?
- determine 1108 if a piece of information suspected of being undesirable information generally simultaneously appeared on multiple websites. Did the suspected information simultaneously appear in generally the same format at 100s of places all at once? Or did it grow organically across the communications network (e.g., communications network 100)?
- determine 1110 if a piece of information suspected of being undesirable information originated on an unknown website. Did the suspected information originally appear on a trusted and/or known news website? Or did the suspected information first appear on an unknown/irreputable website?
- determine 1112 if a piece of information suspected of being undesirable information identifies the reasons for the conclusions drawn. Did the suspected information simply provide facts so that the reader can draw their own conclusions? Or was the suspected information lacking of facts and basically telling the reader what to think?
- determine 1114 if a piece of information suspected of being undesirable information is driven by logic or emotion. Did the suspected information provide content in a calm and even-handed fashion? Or was the suspected information very emotional and lacking of logic?

When identifying 1102 undesirable information (e.g., undesirable information 122) included within the information propagating within the communications network (e.g., communications network 100), information monitoring process 10 may vectorize 1116 a piece of information suspected of being undesirable information (e.g., undesirable information 122), thus defining vectorized suspect information (e.g., vectorized information 66); wherein information monitoring process 10 may compare 1118 the vectorized suspect information (e.g., vectorized information 66) to a pool of vectorized known undesirable information and/or a pool of vectorized known desirable information (e.g., collectively shown as pool of vectorized known information 68) to identify undesirable information (e.g., undesirable information 122) included within the flow of information (e.g., flow of information 124).

As discussed above, vectorizing information may refer to the process of converting textual or numerical data into a mathematical representation called a vector. In the context of natural language processing (NLP) and machine learning, vectorization is often applied to convert words, phrases, or entire documents into numerical vectors, which are then used as input for various algorithms.

When identifying 1102 undesirable information (e.g., undesirable information 122) included within the information propagating within the communications network (e.g., communications network 100), information monitoring process 10 may determine 1120 a dissemination pattern for a piece of information suspected of being undesirable information, thus defining a suspect dissemination pattern (e.g., suspect dissemination pattern 70); wherein information monitoring process 10 may compare 1122 the suspect dissemination pattern (e.g., suspect dissemination pattern 70) to a pool of known undesirable information dissemination patterns (e.g., pool of known undesirable information dissemination patterns 72) to identify undesirable information (e.g., undesirable information 122) included within the flow of information (e.g., flow of information 124). For example, does the undesirable information (e.g., undesirable information 122) included within the information propagating within the communications network (e.g., communications network 100) trace back to a Wall Street Journal website or an Alex Jones website.

Once identified 1102, information monitoring process 10 may mitigate 1124 the impact of the undesirable information (e.g., undesirable information 122).

For example and when mitigating 1124 the impact of the undesirable information, information monitoring process 10 may prebunk/debunk 1126 the undesirable information (e.g., undesirable information 122) in the manner described above.

Further and when mitigating 1124 the impact of the undesirable information (e.g., undesirable information 122), information monitoring process 10 may identify 1128 an original poster of the undesirable information (e.g., undesirable information 122).

As discussed above, information monitoring process 10 may obtain electronic identification data (e.g., electronic identification data 60) and, through the use of such electronic identification data 60, information monitoring process 10 may determine an original poster of the undesirable information (e.g., undesirable information 122). As discussed above, such electronic identification data (e.g., electronic identification data 60) may define e.g., the location and identity of the original poster of the undesirable information (e.g., undesirable information 122) and may be accomplished via various methodologies (as described above).

Once identified 1128, information monitoring process 10 may delegitimize 1130 the original poster of the undesirable information (e.g., undesirable information 122);

As discussed above, to delegitimize a poster of content means to undermine or question the credibility, authority, or legitimacy of the person who posted the content. This can be done through various means, such as casting doubt on their qualifications, expertise, intentions, or the accuracy of the information they provide. Delegitimizing a poster is often a strategy employed in online discussions, debates, or disputes, and it can have a significant impact on how others perceive and engage with the content.

Further and once identified 1128, information monitoring process 10 may deplatform 1132 the original poster of the undesirable information (e.g., undesirable information 122).

As discussed above, to deplatform a poster of content means to revoke or restrict an individual's access to a specific platform or online space, effectively removing their ability to share content or engage with the audience on that particular platform. Deplatforming is a measure taken by platform administrators or content hosting services to address various issues, including violations of community guidelines, terms of service, or ethical standards. It is a form of moderation that aims to limit the reach and impact of a user whose behavior is deemed inappropriate, harmful, or in violation of the platform's rules.

Additionally and when mitigating 1124 the impact of the undesirable information (e.g., undesirable information 122), information monitoring process 10 may delegitimize 1134 the undesirable information (e.g., undesirable information 122).

As discussed above, delegitimizing information through the use of a bot army, upvote/downvote manipulation, or changing directions may refer to tactics employed to undermine the credibility, visibility, or perceived legitimacy of specific content online. These strategies are often used to manipulate public opinion, influence discussions, or distort the narrative around certain topics.

11) Disrupting Propagation from Alternative Social Media

Figure 13:
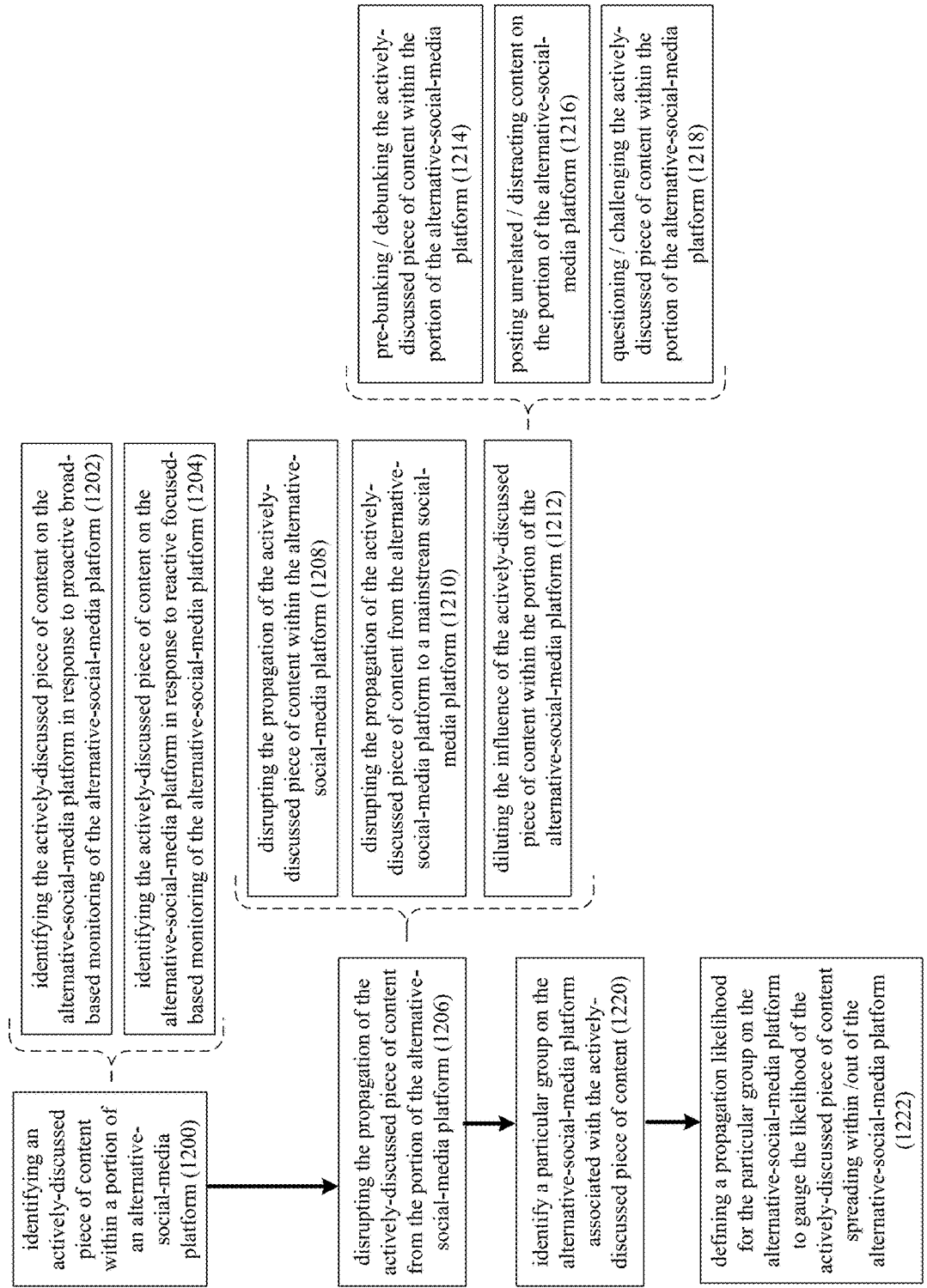
FIG. 13 is a flowchart of the information monitoring process of FIG. 1 according to an embodiment of the present disclosure.

Referring also to FIG. 13 and as will be discussed below in greater detail, information monitoring process 10 may be configured to identify an actively-discussed piece of content within a portion of an alternative-social-media platform and disrupt the propagation of the same.

Specifically, information monitoring process 10 may identify 1200 an actively-discussed piece of content (e.g., piece of content 126) within a portion of an alternative-social-media platform (e.g., alternative social-media platform 128). Such an alternative-social-media platform (e.g., alternative social-media platform 128) may be considered to be part of what is generally known as the "dark web".

As discussed above, the dark web is a part of the internet that is intentionally hidden and inaccessible through standard web browsers. It is a subset of the deep web, which includes all parts of the web that are not indexed by traditional search engines. Unlike the surface web, which is easily accessible and indexed by search engines, the dark web requires special tools and software to access.

Examples of such an alternative-social-media platform (e.g., alternative-social-media platform 128) may include but are not limited to: 4Chan, 8Kun, Gab, Telegram, Discord, etc.).

4CHAN: 4chan is an imageboard website that serves as an anonymous online forum for discussions, image sharing, and content creation. Launched in 2003, 4chan allows users to post images and comments without the need for user accounts, promoting a high degree of anonymity. The platform is divided into various boards dedicated to different topics, and it has gained attention for being a source of diverse internet subcultures and memes. While 4chan has been influential in shaping internet culture, it has also been associated with controversies due to the anonymity it provides, which can sometimes lead to the spread of inappropriate or harmful content.

8KUN: 8kun, formerly known as 8chan, is an imageboard website that shares similarities with 4chan. Established in 2013, 8kun distinguishes itself by allowing users to create and moderate their boards, fostering a decentralized approach to content curation. Like 4chan, 8kun is known for its commitment to free speech and anonymity, but it has faced increased scrutiny for hosting controversial content and being linked to extremist ideologies. The platform has been a subject of debates surrounding internet regulation and the responsibility of online platforms in mitigating harmful content.

Gab: Gab is a social media platform launched in 2016, positioning itself as an alternative to mainstream platforms. Known for its commitment to free speech, Gab has gained attention for its lax content moderation policies. The platform attracts users who feel marginalized or restricted on other social media sites due to their views. However, Gab has also faced criticism for hosting extremist content and being associated with individuals with far-right ideologies. Its approach to content moderation and the balance between free speech and preventing harmful activities have sparked discussions about the responsibilities of social media platforms.

Telegram: Telegram is a cloud-based instant messaging app that emphasizes privacy and security. Launched in 2013, Telegram gained popularity for its encrypted messaging features, secret chats, and channels. While it is widely used for personal communication, it has also become a platform for large group discussions and content sharing. Telegram channels allow users to broadcast messages to a large audience, making it a tool for disseminating information. However, like other messaging platforms, Telegram faces challenges related to misinformation, disinformation, and the spread of extremist content in some channels.

Discord: Discord is a communication platform designed for creating communities, particularly in the gaming space. Launched in 2015, Discord offers voice, video, and text communication features in servers, which are essentially community hubs. Users can create or join servers dedicated to specific topics, allowing for real-time interaction. While Discord has been praised for its user-friendly interface and versatility, it has also faced challenges related to the moderation of content and the potential for misuse, including the coordination of cyberattacks, harassment, or the spread of inappropriate material. Discord continues to evolve and adapt its policies to address these challenges.

When identifying 1200 an actively-discussed piece of content (e.g., piece of content 126) on an alternative-social-media platform (e.g., alternative-social-media platform 128), information monitoring process 10 may identify 1202 the actively-discussed piece of content (e.g., piece of content 126) on the alternative-social-media platform (e.g., alternative-social-media platform 128) in response to proactive broad-based monitoring of the alternative-social-media platform (e.g., alternative-social-media platform 128). For example, a user of information monitoring process 10 may locate the actively-discussed piece of content (e.g., piece of content 126) on the alternative-social-media platform (e.g., alternative-social-media platform 128) by broad-based monitoring of all content on the alternative-social-media platform (e.g., alternative-social-media platform 128).

Alternatively and when identifying 1200 an actively-discussed piece of content (e.g., piece of content 126) on an alternative-social-media platform (e.g., alternative-social-media platform 128), information monitoring process 10 may identify 1204 the actively-discussed piece of content (e.g., piece of content 126) on the alternative-social-media platform (e.g., alternative-social-media platform 128) in response to reactive focused-based monitoring of the alternative-social-media platform (e.g., alternative-social-media platform 128). For example, a user of information monitoring process 10 may locate the actively-discussed piece of content (e.g., piece of content 126) on the alternative-social-media platform (e.g., alternative-social-media platform 128) by proactively searching for and locating the actively-discussed piece of content (e.g., piece of content 126) on the alternative-social-media platform (e.g., alternative-social-media platform 128).

Information monitoring process 10 may disrupt 1206 the propagation of the actively-discussed piece of content (e.g., piece of content 126) from the portion of the alternative-social-media platform (e.g., alternative-social-media platform 128).

When disrupting 1206 the propagation of the actively-discussed piece of content (e.g., piece of content 126) from the portion of the alternative-social-media platform (e.g., alternative-social-media platform 128), information monitoring process 10 may disrupt 1208 the propagation of the actively-discussed piece of content (e.g., piece of content 126) within the alternative-social-media platform (e.g., alternative-social-media platform 128). For example, information monitoring process 10 may disrupt 1208 the sharing/liking/viewing of the actively-discussed piece of content (e.g., piece of content 126) within the portion of the alternative-social-media platform 128.

When disrupting 1206 the propagation of the actively-discussed piece of content (e.g., piece of content 126) from the portion of the alternative-social-media platform (e.g., alternative-social-media platform 128), information monitoring process 10 may disrupt 1210 the propagation of the actively-discussed piece of content (e.g., piece of content 126) from the alternative-social-media platform (e.g., alternative-social-media platform 128) to a mainstream social-media platform (e.g., one or more of communication platforms 102, 104, 106, 108, 110). For example, information monitoring process 10 may disrupt 1210 the sharing/liking/viewing of the actively-discussed piece of content (e.g., piece of content 126) outside of the alternative-social-media platform 128.

When disrupting 1206 the propagation of the actively-discussed piece of content (e.g., piece of content 126) from the portion of the alternative-social-media platform (e.g., alternative-social-media platform 128), information monitoring process 10 may dilute 1212 the influence of the actively-discussed piece of content (e.g., piece of content 126) within the portion of the alternative-social-media platform (e.g., alternative-social-media platform 128).

When diluting 1212 the influence of the actively-discussed piece of content (e.g., piece of content 126) within the portion of the alternative-social-media platform (e.g., alternative-social-media platform 128), information monitoring process 10 may pre-bunk/debunk 1214 the actively-discussed piece of content (e.g., piece of content 126) within the portion of the alternative-social-media platform (e.g., alternative-social-media platform 128), as discussed above.

When diluting 1212 the influence of the actively-discussed piece of content (e.g., piece of content 126) within the portion of the alternative-social-media platform (e.g., alternative-social-media platform 128), information monitoring process 10 may post 1216 unrelated/distracting content on the portion of the alternative-social-media platform (e.g., alternative-social-media platform 128).

As discussed above, diluting the influence of a piece of content by posting unrelated or distracting content may refer to a strategy or tactic employed to diminish the impact or visibility of specific information or messaging. This approach aims to divert attention away from the original content or message by introducing unrelated or tangential information.

When diluting 1212 the influence of the actively-discussed piece of content (e.g., piece of content 126) within the portion of the alternative-social-media platform (e.g., alternative-social-media platform 128), information monitoring process 10 may question/challenge 1218 the actively-discussed piece of content (e.g., piece of content 126) within the portion of the alternative-social-media platform (e.g., alternative-social-media platform 128).

As discussed above, diluting the influence of a piece of content by posting challenging or questioning content involves introducing content that challenges the assertions, questions the credibility, or raises doubts about the original information or message. This strategy aims to create a counter-narrative, spark debate, and potentially diminish the impact or credibility of the initial content.

Information monitoring process 10 may identify 1220 a particular group (e.g., group 130) on the alternative-social-media platform (e.g., alternative-social-media platform 128) associated with the actively-discussed piece of content (e.g., piece of content 126); and define 1222 a propagation likelihood for the particular group (e.g., group 130) on the alternative-social-media platform (e.g., alternative-social-media platform 128) to gauge the likelihood of the actively-discussed piece of content (e.g., piece of content 126) spreading within/out of the alternative-social-media platform (e.g., alternative-social-media platform 128).

For example, if the actively-discussed piece of content (e.g., piece of content 126) was initially published by a group that has never had a piece of their content reach the mainstream social-media platforms (e.g., one or more of communication platforms 102, 104, 106, 108, 110), information monitoring process 10 may gauge the likelihood of the actively-discussed piece of content (e.g., piece of content 126) spreading within/out of the alternative-social-media platform (e.g., alternative-social-media platform 128) to be relatively low. Alternatively, if the actively-discussed piece of content (e.g., piece of content 126) was initially published by a group that has had every piece of their content reach the mainstream social-media platforms (e.g., one or more of communication platforms 102, 104, 106, 108, 110), information monitoring process 10 may gauge the likelihood of the actively-discussed piece of content (e.g., piece of content 126) spreading within/out of the alternative-social-media platform (e.g., alternative-social-media platform 128) to be relatively high.

12) Bot Army

Figure 14:
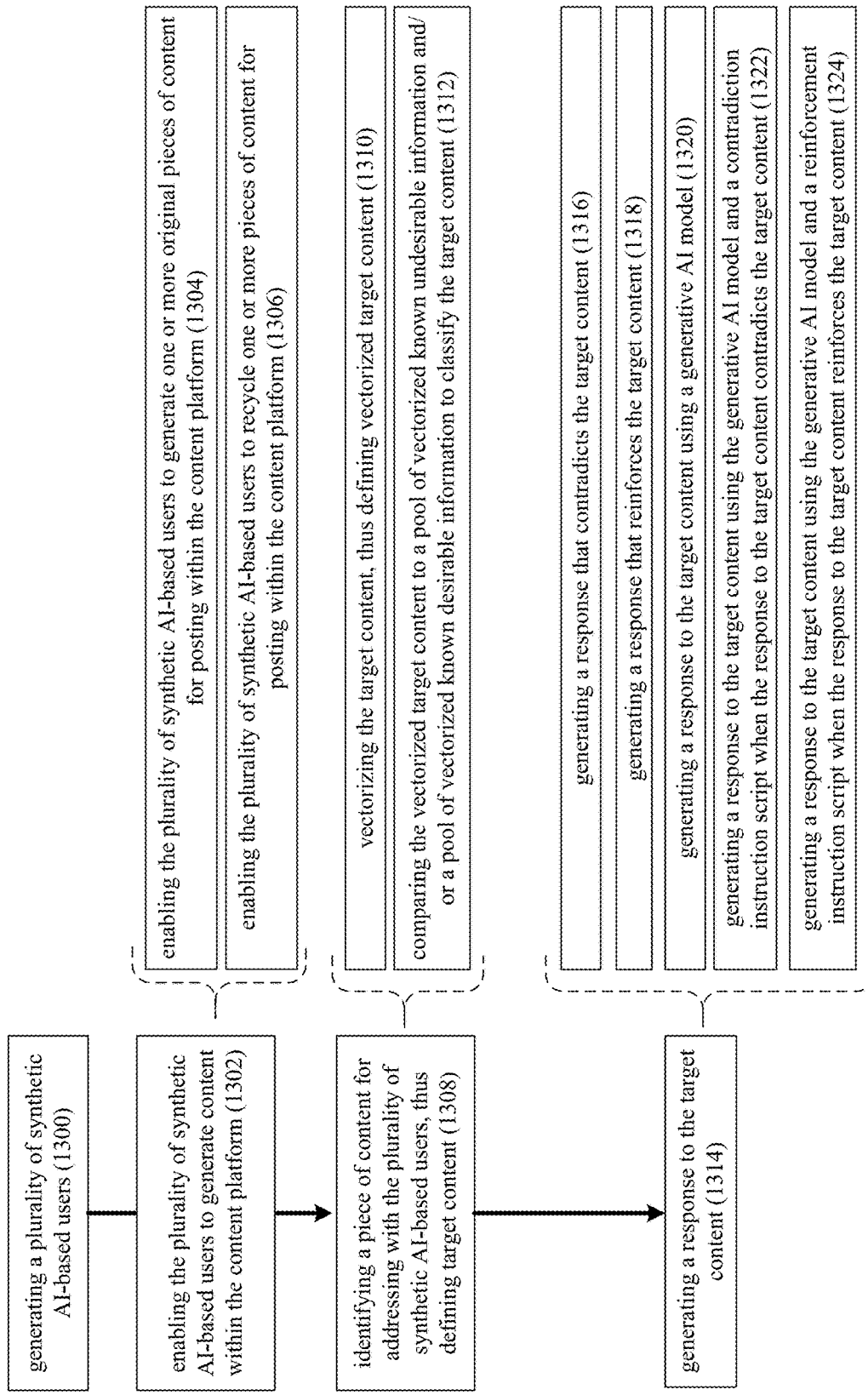
FIG. 14 is a flowchart of the information monitoring process of FIG. 1 according to an embodiment of the present disclosure.

Referring also to FIG. 14 and as will be discussed below in greater detail, information monitoring process 10 may be configured to enable a plurality of synthetic AI-based users to generate content, identify a piece of content for addressing with the plurality of synthetic AI-based users (thus defining target content), and generate a response to the target content.

Specifically, information monitoring process 10 may generate 1300 a plurality of synthetic AI-based users (e.g., synthetic AI-based users 80), wherein each of these synthetic AI-based users (e.g., synthetic AI-based users 80) has a plurality of interests within a content platform (e.g., platform 102). For example, a portion of the plurality of synthetic AI-based users (e.g., synthetic AI-based users 80) may have interest in sports; while a portion of the plurality of synthetic AI-based users (e.g., synthetic AI-based users 80) may have interest in politics; and a portion of the plurality of synthetic AI-based users (e.g., synthetic AI-based users 80) may have interest in celebrities. Naturally, these interests may overlap and some of the plurality of synthetic AI-based users (e.g., synthetic AI-based users 80) may have multiple interests.

The plurality of synthetic AI-based users (e.g., synthetic AI-based users 80) may include: a plurality of content platform bot accounts.

Bot accounts are automated accounts designed to perform specific tasks on content platforms, and their usage can vary widely based on the intent of the account creator. Here are some common ways in which bot accounts are used to generate content on platforms:

Content Amplification and Engagement: Bot accounts are often employed to artificially boost the visibility and engagement of content. This can include liking, sharing, retweeting, or upvoting posts to make them appear more popular than they actually are. The aim is to manipulate algorithms and trends, increasing the reach of specific content or creating a false sense of popularity.

Dissemination of Information: Bots can be used to spread information rapidly across platforms. This could involve sharing news, articles, or promotional material to amplify a message or influence public opinion. In some cases, these bots are part of coordinated campaigns to shape narratives or manipulate discussions.

Spamming and Phishing: Bot accounts are frequently involved in spamming activities, bombarding platforms with unsolicited content, advertisements, or malicious links. Some bots are specifically designed for phishing attacks, attempting to trick users into providing sensitive information.

Political Manipulation: Bot accounts are often employed in political campaigns to sway public opinion or create the illusion of widespread support. These bots may engage in political discussions, promote or discredit candidates, and amplify specific political messages.

Influence in Online Communities: Bots can be used to participate in online discussions within communities or forums. They might post comments, respond to threads, or contribute content to shape conversations and influence community dynamics.

Creating Fake Followers or Engagement: On social media platforms, bots are used to artificially inflate the number of followers, likes, or comments on an account. This deceptive tactic is often employed to create a false sense of popularity or credibility.

Automated Content Generation: Some bots are programmed to generate and publish content automatically. This could include writing articles, creating artwork, or even generating social media posts. While this technology is not inherently malicious, it can be misused to flood platforms with low-quality or misleading content.

Data Scraping: Bots are employed to scrape data from various sources on the internet. This data can then be used for various purposes, such as building user profiles, extracting information for marketing purposes, or conducting research.

Information monitoring process 10 may enable 1302 the plurality of synthetic AI-based users (e.g., synthetic AI-based users 80) to generate content (e.g., content 132) within the content platform (e.g., platform 102) based, at least in part, upon the plurality of interests. Assume for this example, the interest is politics with the intent of generating support for Candidate X.

When enabling 1302 the plurality of synthetic AI-based users (e.g., synthetic AI-based users 80) to generate content (e.g., content 132) within a content platform (e.g., platform 102) based, at least in part, upon the plurality of interests (e.g., politics generally and Candidate X specifically), information monitoring process 10 may enable 1304 the plurality of synthetic AI-based users (e.g., synthetic AI-based users 80) to generate one or more original pieces of content for posting within the content platform (e.g., platform 102). For example, the plurality of synthetic AI-based users (e.g., synthetic AI-based users 80) may generate original content (e.g., content 132) in support of Candidate X.

When enabling 1302 the plurality of synthetic AI-based users (e.g., synthetic AI-based users 80) to generate content (e.g., content 132) within a content platform (e.g., platform 102) based, at least in part, upon the plurality of interests (e.g., politics generally and Candidate X specifically), information monitoring process 10 may enable 1306 the plurality of synthetic AI-based users (e.g., synthetic AI-based users 80) to recycle one or more pieces of content for posting within the content platform (e.g., platform 102). For example, the plurality of synthetic AI-based users (e.g., synthetic AI-based users 80) may recycle (e.g., share) content (e.g., content 132) in support of Candidate X that was written/published by others.

Information monitoring process 10 may identify 1308 a piece of content for addressing with the plurality of synthetic AI-based users (e.g., synthetic AI-based users 80), thus defining target content. As discussed above, the plurality of synthetic AI-based users (e.g., synthetic AI-based users 80) may be tasked with generating original content (e.g., content 132) in support of Candidate X. Further and as discussed above, an individual (e.g., user 38) posted a piece of content (e.g., content 116) that stated "I used to support Candidate X but I am appalled to see that Candidate X supports Position 3!" Accordingly, information monitoring process 10 may identify 1308 content 116 as the target content for addressing with the plurality of synthetic AI-based users (e.g., synthetic AI-based users 80).

When identifying 1308 a piece of content (e.g., content 116) for addressing with the plurality of synthetic AI-based users (e.g., synthetic AI-based users 80), thus defining target content, information monitoring process 10 may vectorize 1310 the target content (e.g., content 116), thus defining vectorized target content (e.g., vectorized information 66); wherein information monitoring process 10 may compare 1312 the vectorized target content (e.g., vectorized information 66) to a pool of vectorized known undesirable information and/or a pool of vectorized known desirable information (e.g., collectively shown as pool of vectorized known information 68) to classify the target content (e.g., content 116).

As discussed above, vectorizing information may refer to the process of converting textual or numerical data into a mathematical representation called a vector. In the context of natural language processing (NLP) and machine learning, vectorization is often applied to convert words, phrases, or entire documents into numerical vectors, which are then used as input for various algorithms.

Information monitoring process 10 may generate 1314 a response to the target content (e.g., content 116). As discussed above, information monitoring process 10 may enable 1302 synthetic AI-based users 80 to generate content 132 within platform 102. For example and when generating 1314 a response to the target content (e.g., content 116), information monitoring process 10 may:

generate 1316 a response (e.g., content 132) that contradicts the target content (e.g., content 116). In this example, being synthetic AI-based users 80 were tasked with generating original content (e.g., content 132) in support of Candidate X, information monitoring process 10 may generate 1316 content 132 that contradicts content 116 (which spoke unfavorably of Candidate X).

generate 1318 a response (e.g., content 132) that reinforces the target content (e.g., content 116). This option would most likely be utilized if the target content (e.g., content 116) had supported Candidate X (which it did not).

generate 1320 a response (e.g., content 132) to the target content (e.g., content 116) using a generative AI model (e.g., generative AI model 82).

A generative AI model (e.g., generative AI model 82) creates content on a specific topic through a process known as natural language generation (NLG). These models are trained on large datasets containing diverse and extensive text samples, enabling them to learn patterns, language structures, and contextual relationships. A simplified overview of how a generative AI model creates content is as follows:

Pre-training: The model undergoes pre-training on a massive corpus of text data. During this phase, it learns the statistical patterns and relationships present in the data without any specific task in mind.

Fine-tuning (Optional): Depending on the use case, the model may undergo fine-tuning on a more specific dataset related to the desired topic or domain. This helps tailor the model's output to a particular context.

Prompt Input: To generate content on a specific topic, users provide a prompt or starting text to the model. This prompt guides the model toward generating content relevant to the given topic.

Autoregressive Generation: The model generates content in an autoregressive manner, predicting one word or token at a time based on the context provided by the preceding words. At each step, the model considers the entire context of the prompt and the generated content so far.

Probability Distribution: The model produces a probability distribution over the vocabulary for the next word. This distribution is based on the learned associations and patterns from the training data.

Sampling: A specific word is sampled from the probability distribution, and this word becomes the next part of the generated content. Sampling strategies can vary, and techniques like top-k sampling or nucleus sampling may be employed to control the diversity of generated output.

Repetition and Context Consideration: The model is capable of generating coherent and contextually relevant content by considering the entire context, avoiding excessive repetition, and maintaining a sense of coherence within the generated text.

Iterative Process: The process is repeated for a desired length or until a stopping condition is met, resulting in a piece of content generated by the model.

When generating 1320 a response (e.g., content 132) to the target content (e.g., content 116) using a generative AI model (e.g., generative AI model 82), information monitoring process 10 may generate 1322 a response (e.g., content 132) to the target content (e.g., content 116) using the generative AI model (e.g., generative AI model 82) and a contradiction instruction script (e.g., a script that instructs the generative AI model 82 to contradict the target content) when the response (e.g., content 132) to the target content (e.g., content 116) contradicts the target content (e.g., content 116).

When generating 1320 a response (e.g., content 132) to the target content (e.g., content 116) using a generative AI model (e.g., generative AI model 82), information monitoring process 10 may generate 1324 a response (e.g., content 132) to the target content (e.g., content 116) using the generative AI model (e.g., generative AI model 82) and a reinforcement instruction script (e.g., a script that instructs the generative AI model 82 to reinforce the target content) when the response (e.g., content 132) to the target content (e.g., content 116) reinforces the target content (e.g., content 116).

13) Monitoring for the Disclosure of Confidential Information

Figure 15:
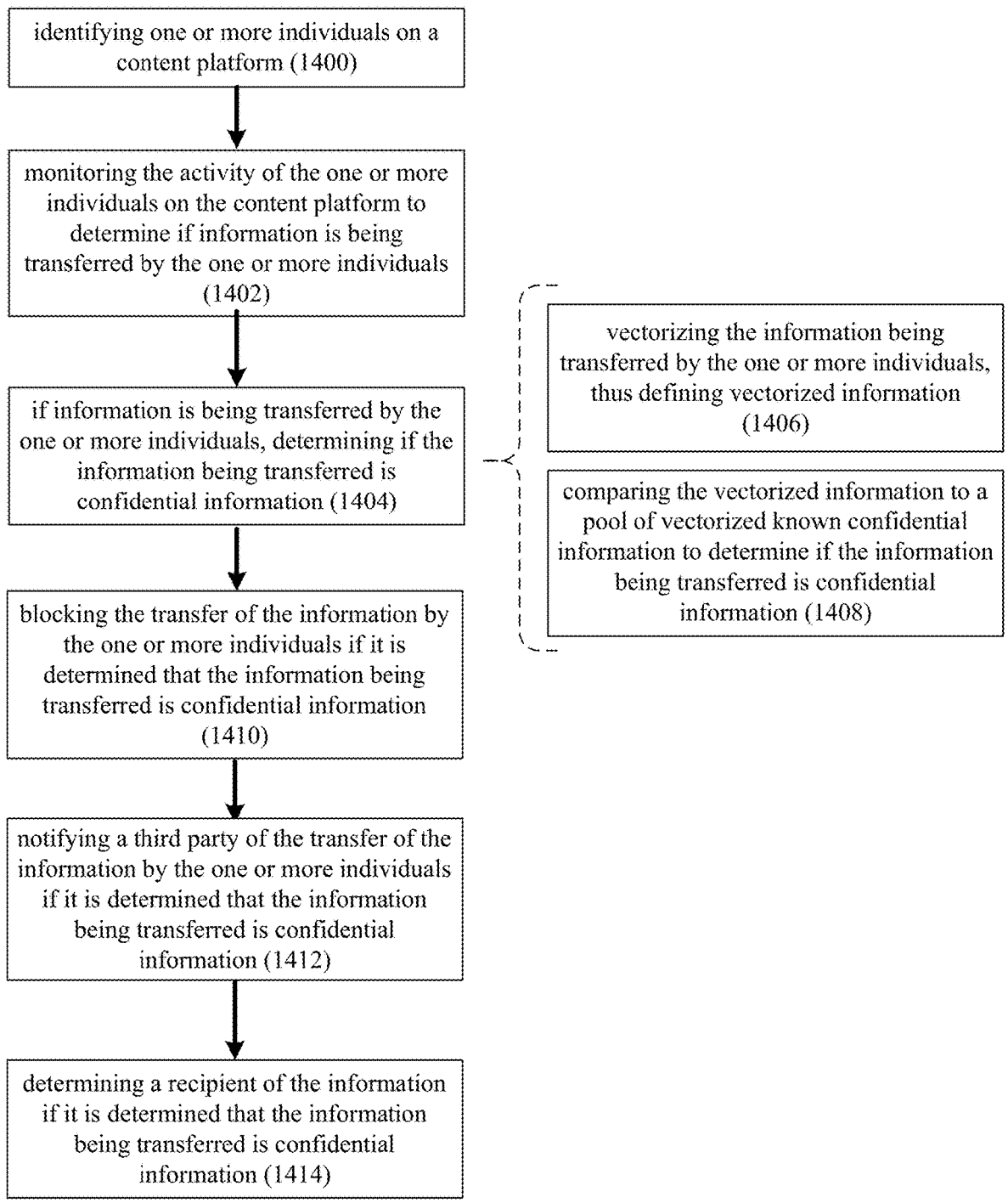
FIG. 15 is a flowchart of the information monitoring process of FIG. 1 according to an embodiment of the present disclosure.

Referring also to FIG. 15 and as will be discussed below in greater detail, information monitoring process 10 may be configured to identify and monitor the activity of one or more individuals on a content platform to determine if confidential information is being transferred by these individuals.

Specifically, information monitoring process 10 may identify 1400 one or more individuals (e.g., individuals 134) on a content platform (e.g., platform 102). These one or more individuals (e.g., individuals 134) may include one or more of: one or more employees of a company; one or more contractors of a company; and/or one or more agents of a company.

Employees of a Company: Employees are individuals who work for a company on a more permanent and long-term basis. They are typically hired under an employment contract and are considered part of the company's workforce. Employees often receive benefits, have taxes withheld from their paychecks, and are subject to the company's policies and regulations. Employees are closely integrated into the company's structure, and the company has a higher degree of control over their work. Employers are responsible for providing benefits, training, and managing taxes for employees.

Contractors of a Company: Contractors, also known as freelancers or independent contractors, are individuals or entities hired by a company to perform specific tasks or projects. They are not permanent employees and are usually engaged for a defined period or project. Contractors often work on a project basis and may have their own business operations. Contractors operate independently, and the company has less direct control over their work methods and schedules. Contractors are typically responsible for their own taxes, benefits, and equipment.

Agents of a Company: Agents are individuals or entities appointed by a company to represent it in specific business activities, such as sales, negotiations, or legal matters. Agents may act on behalf of the company but may not be employees. Agents could include sales representatives, attorneys, or other representatives with specific delegated authority. While agents may act on behalf of the company, they often have a specific and limited scope of authority. Agents may work on a commission basis or under a separate contractual arrangement, and they may have more independence in how they conduct their activities.

As discussed above, content platform (e.g., platform 102) may include one or more of: one or more social media platforms; one or more websites; one or more video-sharing platforms; one or more virtual reality platforms; one or more gaming platforms; one or more messaging platforms; one or more financial platforms; and one or more blog platforms, all of which were discussed above.

Information monitoring process 10 may monitor 1402 the activity of the one or more individuals (e.g., individuals 134) on the content platform (e.g., platform 102) to determine if information (e.g., information 136) is being transferred by the one or more individuals (e.g., individuals 134).

The information (e.g., information 136) being transferred by the one or more individuals may include one or more of: social media posts; image-based content; audio-based content; video-based content; and/or text-based content.

Social Media Posts: Social media posts refer to content shared on various social media platforms by users and entities. These posts can take various forms, including text updates, images, videos, links, and more, and they serve as a means for individuals and organizations to communicate, share information, and engage with their audience. Social media posts are often characterized by their brevity and immediacy, allowing users to share thoughts, experiences, and multimedia content with a wide audience. The interactive nature of social media enables users to respond, like, share, or comment on posts, fostering dynamic online conversations and communities.

Image-Based Content: Image-based content encompasses visual media such as photographs, illustrations, graphics, and memes that convey information or evoke emotions without relying on extensive textual elements. This form of content is prevalent across various digital platforms, including social media, websites, and messaging apps. Image-based content is known for its ability to capture attention quickly and convey messages efficiently, making it a popular choice for storytelling, marketing, and communication in the digital age.

Audio-Based Content: Audio-based content involves the use of sound, including spoken words, music, podcasts, and other audio formats, to convey information or entertain audiences. Podcasts, audiobooks, and music streaming are prominent examples of audio-based content, which has gained significant popularity due to the rise of digital platforms. This form of content allows for a multisensory experience, offering a unique way to consume information or entertainment while multitasking or engaging in activities that do not require visual attention.

Video-Based Content: Video-based content may refer to multimedia presentations that use moving images and sound to communicate messages or tell stories. This form of content is widely utilized across platforms such as social media, streaming services, and websites. Videos can range from short clips to long-form documentaries, providing a versatile medium for entertainment, education, marketing, and communication. The popularity of video-based content has grown with the accessibility of high-quality recording equipment and the widespread availability of high-speed internet, enabling seamless video consumption.

Text-Based Content: Text-based content involves the use of written language to convey information, ideas, or stories. This form of content is prevalent in articles, blog posts, social media updates, and various online publications. Text-based content allows for in-depth exploration of topics, providing detailed information, analysis, and narratives. While multimedia content has gained prominence, text remains a fundamental and powerful means of communication, offering depth and clarity in conveying complex ideas and facilitating in-depth discussions.

If information (e.g., information 136) is being transferred by the one or more individuals (e.g., individuals 134), information monitoring process 10 may determine 1404 if the information (e.g., information 136) being transferred is confidential information.

Confidential information may include one or more of: confidential design information; confidential corporate information; confidential financial information; confidential customer information; confidential employee information; confidential product information; and confidential strategic information.

Confidential Design Information: Confidential design information may refer to proprietary and sensitive details related to the design and development of products, systems, or processes within a company. This information encompasses design blueprints, specifications, schematics, and other intellectual property that is critical to maintaining a competitive edge in the market. Protecting confidential design information is paramount for businesses, as unauthorized access or disclosure could lead to intellectual property theft, counterfeiting, or the compromise of innovative features that give a company a technological advantage.

Confidential Corporate Information: Confidential corporate information encompasses sensitive data and proprietary knowledge pertaining to the internal workings and strategies of a business. This may include strategic plans, business models, trade secrets, market research, and other critical information that gives a company a competitive edge. Safeguarding confidential corporate information is essential to maintaining a company's competitive position, protecting its market share, and ensuring that key business strategies remain undisclosed to competitors. Unauthorized access to or disclosure of this information could lead to significant financial losses and jeopardize a company's standing within its industry.

Confidential Financial Information: Confidential financial information includes sensitive data related to a company's financial status, transactions, budgets, and forecasts. This information is crucial for internal decision-making and is often subject to strict regulatory requirements. Examples of confidential financial information include profit and loss statements, balance sheets, financial projections, and details of financial transactions. Protecting this information is vital to maintaining financial integrity, complying with legal requirements, and preventing insider trading or unauthorized disclosure that could harm the company's financial stability and reputation.

Confidential Customer Information: Confidential customer information encompasses private and sensitive data about a company's clients or customers. This may include personal details, contact information, purchase history, and any other data collected during customer interactions. Safeguarding this information is essential for maintaining customer trust, complying with privacy regulations, and preventing identity theft or fraud. Companies must implement robust security measures to protect confidential customer information from unauthorized access or disclosure, as a breach could lead to legal consequences and damage to the organization's reputation.

Confidential Employee Information: Confidential employee information involves private data about a company's workforce, including personal details, employment records, salary information, and performance evaluations. Protecting this information is crucial for maintaining employee trust, complying with privacy laws, and preventing identity theft or misuse of sensitive employee data. Unauthorized access to or disclosure of confidential employee information can lead to legal repercussions and harm the employer-employee relationship.

Confidential Product Information: Confidential product information includes proprietary details about a company's products, such as formulas, manufacturing processes, and unique features. This information is critical to a company's competitive advantage and market positioning. Protecting confidential product information is essential to prevent intellectual property theft, counterfeiting, or the replication of innovative features by competitors. Companies must implement robust security measures to ensure that this sensitive information remains confidential throughout the product development lifecycle.

Confidential Strategic Information: Confidential strategic information may refer to sensitive data related to a company's long-term plans, goals, and overarching strategies. This may include market entry plans, expansion strategies, mergers and acquisitions, and other key initiatives that contribute to the company's competitive positioning. Protecting this information is crucial for maintaining a competitive edge, as unauthorized access or disclosure could lead to competitors gaining insights into the company's future moves, potentially compromising its strategic advantage. Robust security measures and strategic planning are essential to safeguard confidential strategic information and ensure the continued success of the company's business initiatives.

When determining 1404 if the information (e.g., information 136) is confidential information, information monitoring process 10 may vectorize 1406 the information (e.g., information 136) being transferred by the one or more individuals (e.g., individuals 134), thus defining vectorized information (e.g., vectorized information 66), wherein information monitoring process 10 may compare 1408 the vectorized information (e.g., vectorized information 66) to a pool of vectorized known confidential information (e.g., vectorized known information 68) to determine if the information (e.g., information 136) being transferred is confidential information.

As discussed above, vectorizing information may refer to the process of converting textual or numerical data into a mathematical representation called a vector. In the context of natural language processing (NLP) and machine learning, vectorization is often applied to convert words, phrases, or entire documents into numerical vectors, which are then used as input for various algorithms.

Information monitoring process 10 may block 1410 the transfer of the information (e.g., information 136) by the one or more individuals (e.g., individuals 134) if it is determined that the information (e.g., information 136) being transferred is confidential information. Accordingly and by blocking 1410 the transfer of the information (e.g., information 136), the confidentiality of the information (e.g., information 136) may be maintained by information monitoring process 10.

Additionally/alternatively, information monitoring process 10 may notify 1412 a third party (e.g., third party 54) of the transfer of the information (e.g., information 136) by the one or more individuals (e.g., individuals 134) if it is determined that the information (e.g., information 136) being transferred is confidential information.

As discussed above, the third party (e.g., third party 54) may include one or more of: an educational third party; a corporate third party; a legal third party; a moderating third party; an international intelligence third party; a law enforcement third party; a social work third party; and a medical professional third party, all of which are discussed above.

Additionally/alternatively, information monitoring process 10 may determine 1414 a recipient of the information (e.g., information 136) if it is determined that the information (e.g., information 136) being transferred is confidential information. Assume for this example that the information (e.g., information 136) being transferred by the one or more individuals (e.g., individuals 134) is confidential and it is being transferred to user 42. Accordingly, information monitoring process 10 may determine 1414 that the recipient of the information (e.g., information 136) is user 42.

As discussed above, information monitoring process 10 may obtain electronic identification data (e.g., electronic identification data 60) and, through the use of such electronic identification data 60, information monitoring process 10 may identify user 42. As discussed above, such electronic identification data (e.g., electronic identification data 60) may define e.g., the location and identity of user 42 and may be accomplished via various methodologies (as described above).

14) Monitoring for the Disclosure of Sensitive Information

Figure 16:
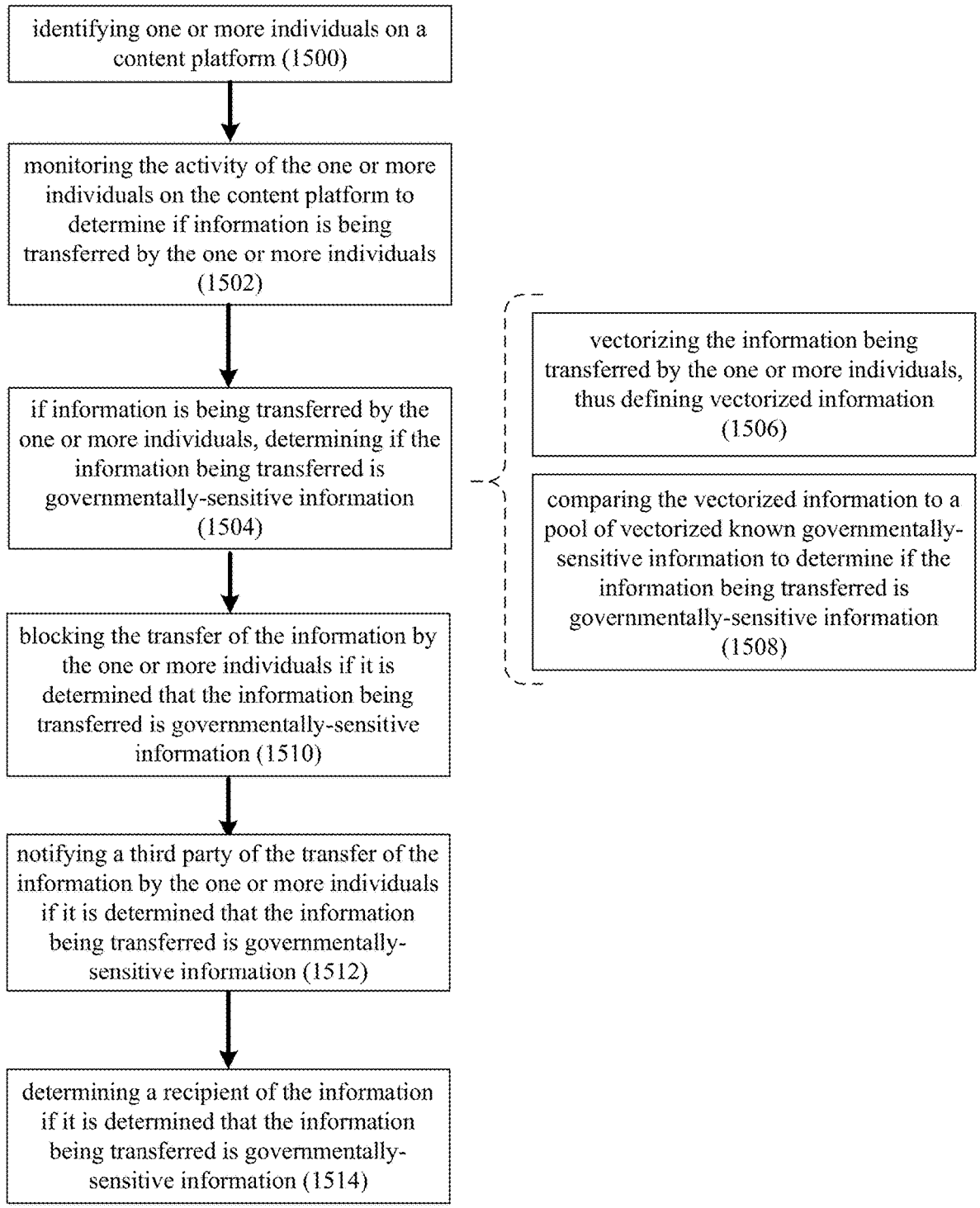
FIG. 16 is a flowchart of the information monitoring process of FIG. 1 according to an embodiment of the present disclosure.

Referring also to FIG. 16 and as will be discussed below in greater detail, information monitoring process 10 may be configured to identify and monitor the activity of one or more individuals on a content platform to determine if governmentally-sensitive information is being transferred by these individuals.

Specifically, information monitoring process 10 may identify 1500 one or more individuals (e.g., individuals 134) on a content platform (e.g., platform 102). The one or more individuals (e.g., individuals 134) may include one or more of: one or more employees of a governmental organization; one or more contractors of the governmental organization; one or more agents of the governmental organization; one or more politicians of the governmental organization; one or more members of the governmental organization; one or more appointees of the governmental organization; one or more electees of the governmental organization; and one or more volunteers of the governmental organization.

Employees of a Governmental Organization: Employees of a governmental organization are individuals hired by the government to perform specific roles and responsibilities within various departments or agencies. These individuals may include civil servants, administrative staff, law enforcement officers, and specialists across diverse fields. Government employees are typically subject to specific rules, regulations, and ethical standards, and they play crucial roles in implementing government policies, delivering public services, and ensuring the efficient functioning of governmental entities.

Contractors of a Governmental Organization: Contractors of a governmental organization are external entities or individuals hired on a contractual basis to provide specific goods, services, or expertise to the government. These contractors may include private companies, consultants, or freelance professionals who work on projects, services, or initiatives commissioned by the government. Governmental organizations often engage contractors to leverage specialized skills, meet project requirements, or address temporary needs. The contractual relationship typically involves defined terms, deliverables, and obligations, and contractors are expected to adhere to relevant laws and regulations while delivering their services to the government.

Agents of a Governmental Organization: Agents of a governmental organization are individuals who act on behalf of the government to perform specific tasks, represent the government's interests, or carry out delegated responsibilities. These individuals may include legal representatives, spokespersons, or envoys who engage in negotiations, advocacy, or communication on behalf of the government. Agents play a crucial role in facilitating interactions between the government and external entities, ensuring that government policies and positions are effectively communicated and implemented.

Politicians of a Governmental Organization: Politicians of a governmental organization are elected officials who hold public office and represent the interests of the public or specific constituencies. These individuals may include members of legislative bodies, such as parliamentarians or congresspersons, as well as executives like governors or mayors. Politicians are responsible for making and shaping laws, formulating policies, and overseeing the implementation of government initiatives. They are elected through democratic processes and are accountable to the public for their actions and decisions.

Members of a Governmental Organization: Members of a governmental organization are individuals who are part of a governing body, such as a legislative assembly or council. These individuals collectively contribute to decision-making processes, debates, and policy formulation. Members may represent various political parties or constituencies and play a vital role in shaping the direction and priorities of the government.

Appointees of a Governmental Organization: Appointees of a governmental organization are individuals appointed by elected officials or executives to specific roles within the government. These appointments may include positions in the executive branch, regulatory bodies, or advisory committees. Appointees are chosen based on their qualifications, expertise, and alignment with the government's objectives. They contribute to the efficient functioning of the government by providing specialized knowledge and guidance.

Electees of a Governmental Organization: Electees of a governmental organization are individuals who have been elected to public office through democratic processes. This category includes officials such as presidents, governors, mayors, and members of legislative bodies. Electees are chosen by the public through voting, and they have the responsibility to represent the interests of their constituents, make policy decisions, and oversee the functioning of the government.

Volunteers of a Governmental Organization: Volunteers of a governmental organization are individuals who offer their time and services to support government initiatives, community projects, or public service activities on a voluntary basis. These individuals contribute to various social, environmental, or civic causes without monetary compensation. Volunteers play a crucial role in extending the reach and impact of governmental programs, fostering community engagement, and addressing social issues. Their efforts contribute to the overall well-being and resilience of the community served by the governmental organization.

As discussed above, the content platform (e.g., platform 102) may include one or more of: one or more social media platforms; one or more websites; one or more video-sharing platforms; one or more virtual reality platforms; one or more gaming platforms; one or more messaging platforms; one or more financial platforms; and one or more blog platforms, all of which were discussed above.

Information monitoring process 10 may monitor 1502 the activity of the one or more individuals (e.g., individuals 134) on the content platform (e.g., platform 102) to determine if information (e.g., information 136) is being transferred by the one or more individuals (e.g., individuals 134).

As discussed above, the information (e.g., information 136) being transferred by the one or more individuals (e.g., individuals 134) may include one or more of: social media posts; image-based content; audio-based content; video-based content; and text-based content, all of which were discussed above.

If information (e.g., information 136) is being transferred by the one or more individuals (e.g., individuals 134), information monitoring process 10 may determine 1504 if the information (e.g., information 136) being transferred is governmentally-sensitive information.

Governmentally-sensitive information may include one or more of: confidential governmental information; confidential military information; confidential financial information; confidential relationship information; and confidential espionage information, as follows:

Confidential Governmental Information: Information held by a government that is treated with confidentiality due to its sensitive nature, often related to policy, decision-making, or governmental operations. Access to this information is restricted to authorized personnel to prevent unauthorized disclosure that could harm national interests.

Confidential Military Information: Military information that is designated as confidential to safeguard national security. This includes details on military strategies, plans, weapon systems, and other sensitive data critical to the defense of a nation.

Confidential Government Financial Information: Sensitive financial data held by a government, such as budget details, expenditure plans, or economic forecasts. This information is treated as confidential to prevent misuse and maintain the stability of financial systems.

Confidential Government Relationship Information: Information related to diplomatic, political, or international relationships that is considered confidential to protect sensitive negotiations, agreements, or discussions between governments. Unauthorized disclosure could have diplomatic repercussions.

Confidential Espionage Information: Information related to espionage activities, including covert operations, intelligence gathering, and classified techniques employed by intelligence agencies. This information is closely guarded to ensure the effectiveness of espionage efforts.

Confidential Intelligence: Sensitive information gathered through intelligence sources, analysis, and assessments. It encompasses a wide range of data critical to national security, including threat assessments, foreign intelligence, and counterintelligence information.

Classified Information: Information that has been assigned a security classification level (e.g., Confidential, Secret, Top Secret) based on its sensitivity. The classification denotes the degree of protection required to prevent unauthorized access.

Secret Information: Information classified at a higher level of sensitivity than "Confidential." It includes data that, if disclosed, could cause serious harm to national security. Access is restricted to individuals with the appropriate security clearance.

Top Secret Information: Information classified at the highest level of sensitivity. Access to top-secret information is extremely limited, and its unauthorized disclosure could cause exceptionally grave damage to national security.

Secure Compartmentalized Information Facility (SCIF) Information: Information discussed or stored within a SCIF, a secure facility designed to prevent unauthorized access to classified information. SCIFs provide a controlled environment for handling sensitive information, ensuring confidentiality and preventing eavesdropping.

When determining 1504 if the information (e.g., information 136) is governmentally-sensitive information, information monitoring process 10 may vectorize 1506 the information (e.g., information 136) being transferred by the one or more individuals (e.g., individuals 134), thus defining vectorized information (e.g., vectorized information 66), wherein information monitoring process 10 may compare 1508 the vectorized information (e.g., vectorized information 66) to a pool of vectorized known governmentally-sensitive information (e.g., vectorized known information 68) to determine if the information (e.g., information 136) being transferred is governmentally-sensitive information.

As discussed above, vectorizing information may refer to the process of converting textual or numerical data into a mathematical representation called a vector. In the context of natural language processing (NLP) and machine learning, vectorization is often applied to convert words, phrases, or entire documents into numerical vectors, which are then used as input for various algorithms.

Information monitoring process 10 may block 1510 the transfer of the information (e.g., information 136) by the one or more individuals (e.g., individuals 134) if it is determined that the information (e.g., information 136) being transferred is governmentally-sensitive information. Accordingly and by blocking 1510 the transfer of the information (e.g., information 136), the confidentiality of the governmentally-sensitive information (e.g., information 136) may be maintained by information monitoring process 10.

Additionally/alternatively, information monitoring process 10 may notify 1512 a third party (e.g., third party 54) of the transfer of the information (e.g., information 136) by the one or more individuals (e.g., individuals 134) if it is determined that the information (e.g., information 136) being transferred is governmentally-sensitive information.

As discussed above, the third party (e.g., third party 54) may include one or more of: an educational third party; a corporate third party; a legal third party; a moderating third party; an international intelligence third party; a law enforcement third party; a social work third party; and a medical professional third party, all of which were discussed above.

Additionally/alternatively, information monitoring process 10 may determine 1514 a recipient of the information (e.g., information 136) if it is determined that the information (e.g., information 136) being transferred is governmentally-sensitive information. Assume for this example that the information (e.g., information 136) being transferred by the one or more individuals (e.g., individuals 134) is governmentally-sensitive and it is being transferred to user 42. Accordingly, information monitoring process 10 may determine 1514 that the recipient of the information (e.g., information 136) is user 42.

As discussed above, information monitoring process 10 may obtain electronic identification data (e.g., electronic identification data 60) and, through the use of such electronic identification data 60, information monitoring process 10 may identify user 42. As discussed above, such electronic identification data (e.g., electronic identification data 60) may define e.g., the location and identity of user 42 and may be accomplished via various methodologies (as described above).

15) Suppressing Inaccurate Information that could Influence Online Gaming

Figure 17:
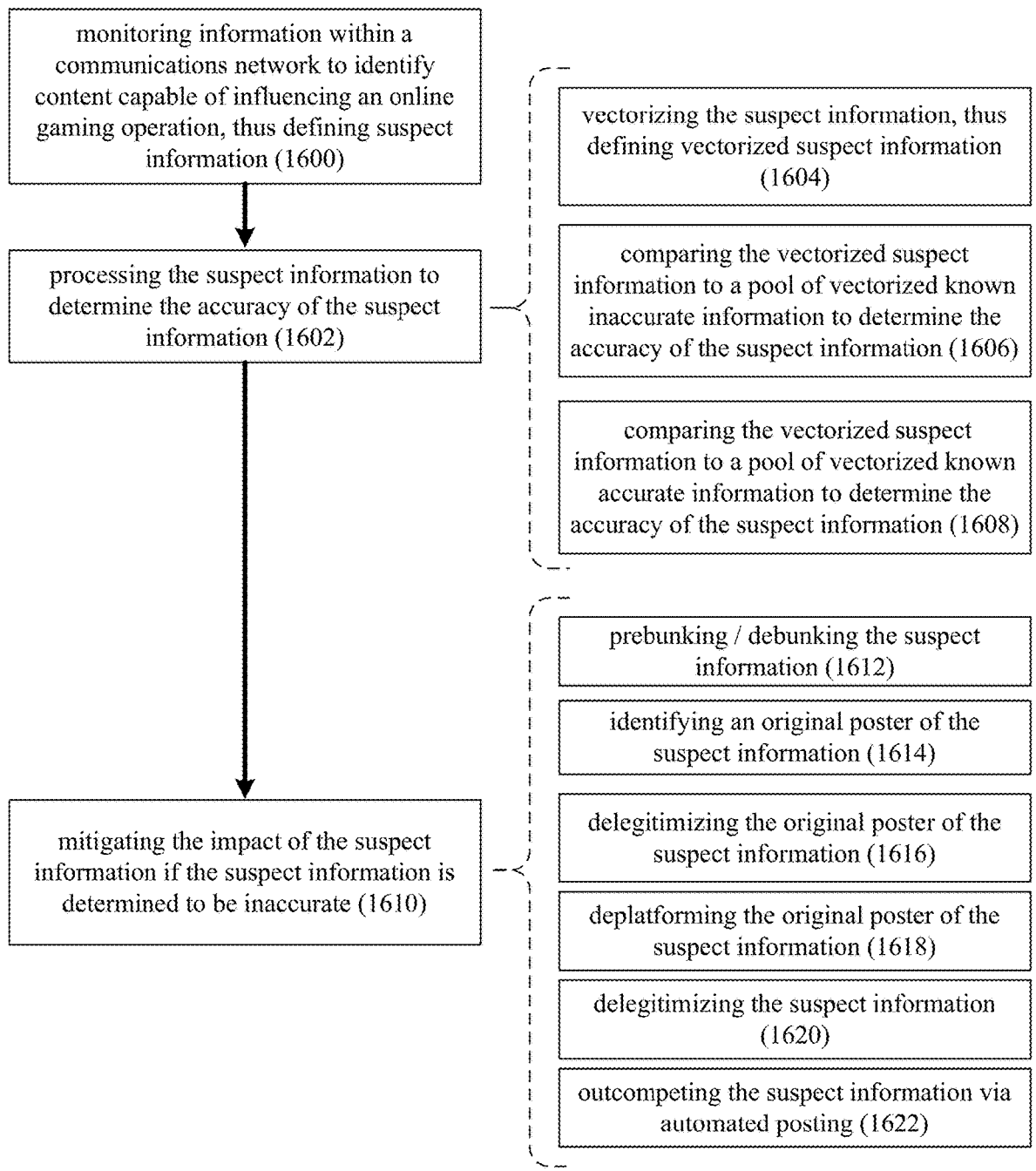
FIG. 17 is a flowchart of the information monitoring process of FIG. 1 according to an embodiment of the present disclosure.

Referring also to FIG. 17 and as will be discussed below in greater detail, information monitoring process 10 may be configured to monitor information to identify content capable of influencing an online gaming operation (thus defining suspect information) and processing the suspect information to determine its accuracy and mitigate the impact of the same if inaccurate.

Specifically, information monitoring process 10 may monitor 1600 information within a communications network (e.g., communications network 100) to identify content capable of influencing an online gaming operation (e.g., online gaming operation 84), thus defining suspect information (e.g., content 138). For this example, assume that content 138 on communications network 100 is a story about a quarterback (who is playing in the upcoming SuperBowl) suffering a devastating shoulder injury.

As discussed above, the communications network (e.g., communications network 100) may include one or more of: one or more social media platforms; one or more websites; one or more video-sharing platforms; one or more virtual reality platforms; one or more gaming platforms; one or more messaging platforms; one or more financial platforms; and one or more blog platforms, all of which were discussed above.

As discussed above, the suspect information (e.g., content 138) may include one or more of: social media posts; image-based content; audio-based content; video-based content; and text-based content, all of which were discussed above.

Information monitoring process 10 may process 1602 the suspect information (e.g., content 138) to determine the accuracy of the suspect information (e.g., content 138).

When processing 1602 the suspect information (e.g., content 138) to determine the accuracy of the suspect information (e.g., content 138), information monitoring process 10 may vectorize 1604 the suspect information (e.g., content 138), thus defining vectorized suspect information (e.g., vectorized information 66), wherein information monitoring process 10 may compare 1606 the vectorized suspect information (e.g., vectorized information 66) to a pool of vectorized known inaccurate information (e.g., pool of vectorized known information 68) to determine the accuracy of the suspect information (e.g., content 138) and/or compare 1608 the vectorized suspect information (e.g., vectorized information 66) to a pool of vectorized known accurate information (e.g., pool of vectorized known information 68) to determine the accuracy of the suspect information (e.g., content 138).

As discussed above, vectorizing information may refer to the process of converting textual or numerical data into a mathematical representation called a vector. In the context of natural language processing (NLP) and machine learning, vectorization is often applied to convert words, phrases, or entire documents into numerical vectors, which are then used as input for various algorithms.

Information monitoring process 10 may mitigate 1610 the impact of the suspect information (e.g., content 138) if the suspect information (e.g., content 138) is determined to be inaccurate.

For example and when mitigating 1610 the impact of the suspect information (e.g., content 138) if the suspect information (e.g., content 138) is determined to be inaccurate, information monitoring process 10 may prebunk/debunk 1612 the suspect information (e.g., content 138) in the manner described above.

When mitigating 1610 the impact of the suspect information (e.g., content 138) if the suspect information (e.g., content 138) is determined to be inaccurate, information monitoring process 10 may identify 1614 an original poster of the suspect information (e.g., content 138).

As discussed above, information monitoring process 10 may obtain electronic identification data (e.g., electronic identification data 60) and, through the use of such electronic identification data 60, information monitoring process 10 may determine an original poster of the suspect information (e.g., content 138). As discussed above, such electronic identification data (e.g., electronic identification data 60) may define e.g., the location and identity of the original poster of the suspect information (e.g., content 138) and may be accomplished via various methodologies (as described above).

Once identified 1614 and when mitigating 1610 the impact of the suspect information (e.g., content 138) if the suspect information (e.g., content 138) is determined to be inaccurate, information monitoring process 10 may delegitimize 1616 the original poster of the suspect information (e.g., content 138).

As discussed above, to delegitimize a poster of content means to undermine or question the credibility, authority, or legitimacy of the person who posted the content. This can be done through various means, such as casting doubt on their qualifications, expertise, intentions, or the accuracy of the information they provide. Delegitimizing a poster is often a strategy employed in online discussions, debates, or disputes, and it can have a significant impact on how others perceive and engage with the content.

Once identified 1614 and when mitigating 1610 the impact of the suspect information (e.g., content 138) if the suspect information (e.g., content 138) is determined to be inaccurate, information monitoring process 10 may deplatform 1618 the original poster of the suspect information (e.g., content 138).

As discussed above, to deplatform a poster of content means to revoke or restrict an individual's access to a specific platform or online space, effectively removing their ability to share content or engage with the audience on that particular platform. Deplatforming is a measure taken by platform administrators or content hosting services to address various issues, including violations of community guidelines, terms of service, or ethical standards. It is a form of moderation that aims to limit the reach and impact of a user whose behavior is deemed inappropriate, harmful, or in violation of the platform's rules.

Further and when mitigating 1610 the impact of the suspect information (e.g., content 138) if the suspect information (e.g., content 138) is determined to be inaccurate: information monitoring process 10 may delegitimize 1620 the suspect information (e.g., content 138).

As discussed above, delegitimizing information through the use of a bot army, upvote/downvote manipulation, or changing directions may refer to tactics employed to undermine the credibility, visibility, or perceived legitimacy of specific content online. These strategies are often used to manipulate public opinion, influence discussions, or distort the narrative around certain topics.

Additionally and when mitigating 1610 the impact of the suspect information (e.g., content 138) if the suspect information (e.g., content 138) is determined to be inaccurate, information monitoring process 10 may outcompete 1622 the suspect information (e.g., content 138) via automated posting.

As discussed above, outcompeting content through automated posting is a strategy where automated tools or bots are used to flood a platform with a large volume of content in an attempt to dominate or overshadow other content. This strategy can be employed on various online platforms, such as social media, forums, or websites.

Figure 18:
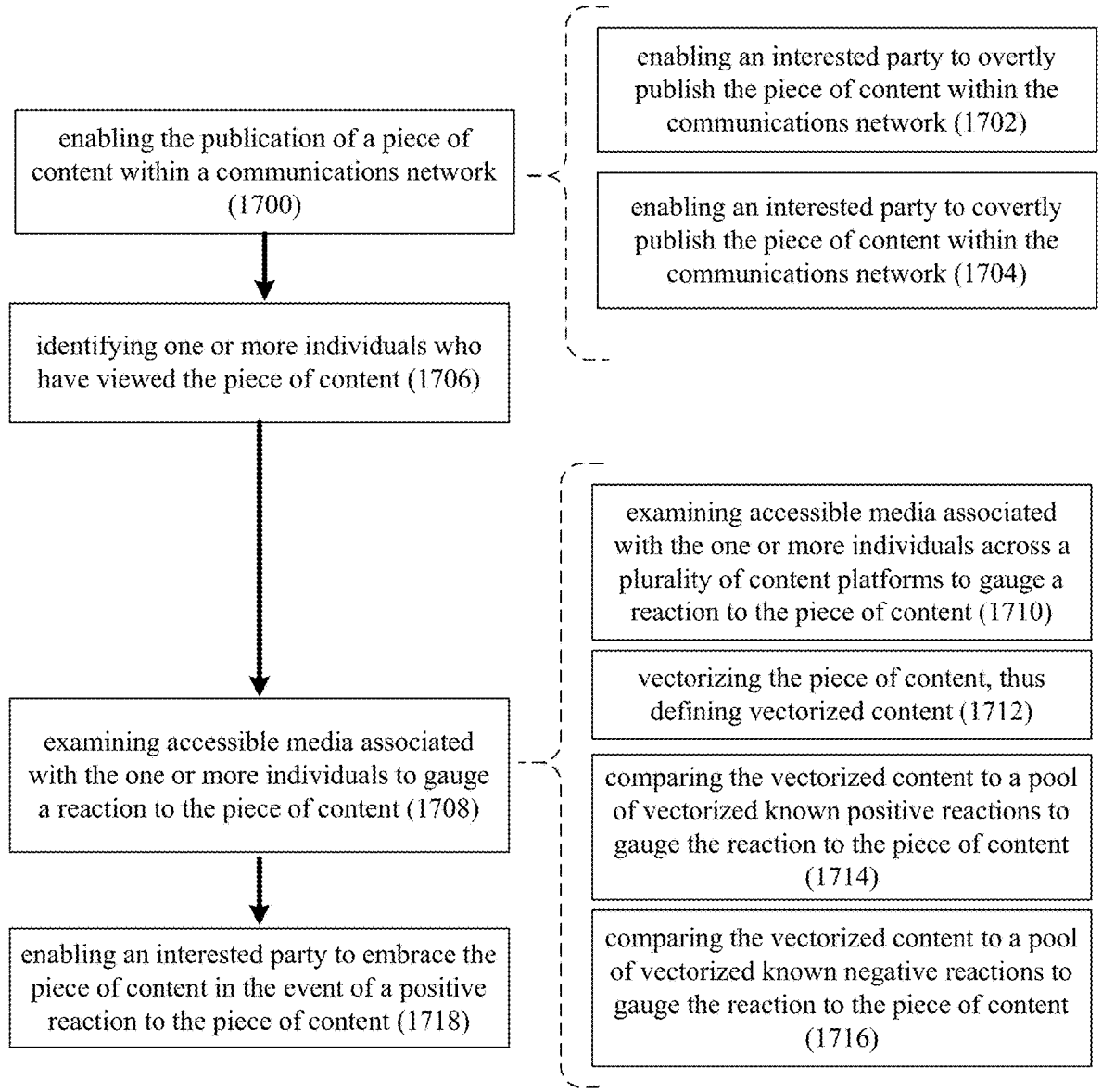
FIG. 18 is a flowchart of the information monitoring process of FIG. 1 according to an embodiment of the present disclosure.

16) Floating Content to Gauge a Reaction to the Content:

Referring also to FIG. 18 and as will be discussed below in greater detail, information monitoring process 10 may be configured to enable the publication of a piece of content within a communications network and identify one or more individuals who have viewed the piece of content; wherein accessible media associated with the one or more individuals is examined to gauge a reaction to the piece of content.

Specifically, information monitoring process 10 may enable 1700 the publication of a piece of content (e.g., piece of content 140) within a communications network (e.g., communications network 100).

As discussed above, the communications network (e.g., communications network 100) may include one or more of: one or more social media platforms; one or more websites; one or more video-sharing platforms; one or more virtual reality platforms; one or more gaming platforms; one or more messaging platforms; one or more financial platforms; and one or more blog platforms, all of which are discussed above.

As discussed above, the piece of content (e.g., piece of content 140) may include one or more of: one or more image-based content; one or more audio-based content; one or more video-based content; one or more social media posts; one or more advertisements; one or more press releases; and one or more stories, all of which were discussed above.

When enabling 1700 the publication of a piece of content (e.g., piece of content 140) within a communications network (e.g., communications network 100), information monitoring process 10 may enable 1702 an interested party (e.g., interested party 86) to overtly publish the piece of content (e.g., piece of content 140) within the communications network (e.g., communications network 100).

Overtly publishing content means to openly and publicly share information, media, or any other form of material on online platforms. "Overtly" in this context emphasizes that the action is done in a conspicuous and transparent manner, without attempting to conceal or hide the content. When you overtly publish content on the internet, it becomes accessible to a wide audience, potentially reaching people across the globe. This could include sharing text-based articles, images, videos, audio recordings, or any other digital material on websites, blogs, social media platforms, forums, or other online spaces. Overt publication contrasts with more private or restricted forms of sharing, as the intention is for the content to be readily available to anyone with internet access.

When enabling 1700 the publication of a piece of content (e.g., piece of content 140) within a communications network (e.g., communications network 100), information monitoring process 10 may enable 1704 an interested party (e.g., interested party 86) to covertly publish the piece of content (e.g., piece of content 140) within the communications network (e.g., communications network 100).

Covertly publishing content involves sharing information or media in a way that is intentionally discreet, hidden, or not easily traceable. Unlike overt publication, which is open and transparent, covert publication seeks to conceal the identity of the publisher or the existence of the content itself. This can be done for various reasons, including privacy concerns, avoiding censorship, or disseminating sensitive information. Examples of covert publishing might include anonymous blogging, using pseudonyms to conceal one's identity, or sharing information through encrypted channels. It's important to note that while covert publishing can be used for legitimate purposes, such as protecting whistleblowers or activists in repressive regimes, it can also be employed for malicious activities, like spreading misinformation or engaging in illicit behavior. In many cases, individuals or groups may choose to covertly publish content to control access to the information, limit exposure, or protect themselves from potential repercussions. However, the ethical and legal implications of covert publishing can vary depending on the nature of the content and the intentions behind its dissemination.

For this example, assume that the interested party (e.g., interested party 86) is a car manufacturer who produces a very popular model of car. However, they plan on doing a drastic redesign of this very popular model of car. So they want to "leak" the redesign of the car (e.g., piece of content 140) so that the interested party (e.g., interested party 86) may gauge the reaction of the public. Accordingly, information monitoring process 10 may enable 1704 the interested party (e.g., interested party 86) to covertly publish the redesign of the car (e.g., piece of content 140) within the communications network (e.g., communications network 100) to see what the public thinks.

Once published, information monitoring process 10 may identify 1706 one or more individuals (e.g., individuals 134) who have viewed the piece of content (e.g., piece of content 140). Such identification 1706 of the one or more individuals (e.g., individuals 134) may occur by e.g., reviewing the viewing history of one or more individuals (e.g., individuals 134).

Information monitoring process 10 may examine 1708 accessible media (e.g., accessible media 114) associated with the one or more individuals (e.g., individuals 134) to gauge a reaction to the piece of content (e.g., piece of content 140). As discussed above, accessible media (e.g., accessible media 114) may refer to content that is shared and accessible to a wide audience without restrictions on viewing. Platforms are designed to facilitate the sharing of information, opinions, and multimedia content among users. Publicly available media (e.g., accessible media 114) on these platforms can include various formats such as text posts, images, videos, links, and more.

Information monitoring process 10 may use machine learning and/or artificial intelligence to examine 1708 the accessible media (e.g., accessible media 114) associated with the one or more individuals (e.g., individuals 134) to gauge a reaction to the piece of content (e.g., piece of content 140).

Machine learning (ML) and artificial intelligence (AI) play pivotal roles in assessing reactions to content by employing sophisticated analysis techniques. Sentiment analysis, a subset of natural language processing (NLP), enables the determination of sentiments expressed in textual content, ranging from positive and negative to neutral. ML models can be trained to scrutinize social media posts, comments, reviews, and other text-based data, providing insights into user sentiments regarding specific content. Furthermore, computer vision allows AI to analyze images and videos, recognizing emotions, facial expressions, and visual cues that convey reactions. User behavior analysis involves studying metrics such as click-through rates, dwell time, and engagement patterns to discern how audiences interact with content. Predictive analytics leverages historical data to forecast potential reactions to new content. User feedback analysis involves processing and categorizing comments and reviews to extract valuable insights. Personalization algorithms use individual preferences and behavior to tailor content recommendations, enhancing positive reactions and engagement. Social media monitoring, facilitated by AI tools, tracks mentions, hashtags, and discussions, offering a broader understanding of public sentiments surrounding content. In essence, ML and AI empower content creators and businesses to make informed, data-driven decisions for optimizing audience engagement and content strategy.

As discussed above, communications network 100 (e.g., the internet) may include a plurality of communications platforms (e.g., platforms 102, 104, 106, 108, 110). Accordingly and when examining 1708 accessible media associated with the one or more individuals (e.g., individuals 134) to gauge a reaction to the piece of content (e.g., piece of content 140), information monitoring process 10 may examine 1710 accessible media (e.g., accessible media 114) associated with the one or more individuals (e.g., individuals 134) across a plurality of content platforms (e.g., platforms 102, 104, 106, 108, 110) to gauge a reaction to the piece of content (e.g., piece of content 140).

When examining 1708 accessible media (e.g., accessible media 114) associated with the one or more individuals (e.g., individuals 134) to gauge a reaction to the piece of content (e.g., piece of content 140), information monitoring process 10 may vectorize 1712 the piece of content (e.g., piece of content 140), thus defining vectorized content (e.g., vectorized information 66); wherein information monitoring process 10 may compare 1714 the vectorized content (e.g., vectorized information 66) to a pool of vectorized known positive reactions (e.g., pool of vectorized known information 68) to gauge the reaction to the piece of content (e.g., piece of content 140) and/or compare 1716 the vectorized suspect information (e.g., vectorized information 66) to a pool of vectorized known negative reactions (e.g., pool of vectorized known information 68) to gauge the reaction to the piece of content (e.g., piece of content 140).

As discussed above, vectorizing information may refer to the process of converting textual or numerical data into a mathematical representation called a vector. In the context of natural language processing (NLP) and machine learning, vectorization is often applied to convert words, phrases, or entire documents into numerical vectors, which are then used as input for various algorithms.

Information monitoring process 10 may enable 1718 an interested party (e.g., interested party 86) to embrace the piece of content (e.g., piece of content 140) in the event of a positive reaction to the piece of content (e.g., piece of content 140). Continuing with the above-stated example in which the interested party (e.g., interested party 86) is a car manufacturer who produces a very popular model of car that they are thinking of drastically redesigning. Accordingly, the interested party (e.g., interested party 86) "leaked" (i.e., covertly published) the redesign of the car (e.g., piece of content 140) so that the interested party (e.g., interested party 86) may gauge the reaction of the public. Therefore and if the reaction is positive, information monitoring process 10 may enable 1718 an interested party (e.g., interested party 86) to embrace the piece of content (e.g., piece of content 140) and say e.g., "Yep . . . that is our redesign". However and if the reaction is negative, information monitoring process 10 may enable an interested party (e.g., interested party 86) to distance themselves from the piece of content (e.g., piece of content 140) and say e.g., "We have no idea where this came from . . . but it is not ours".

Figure 19:
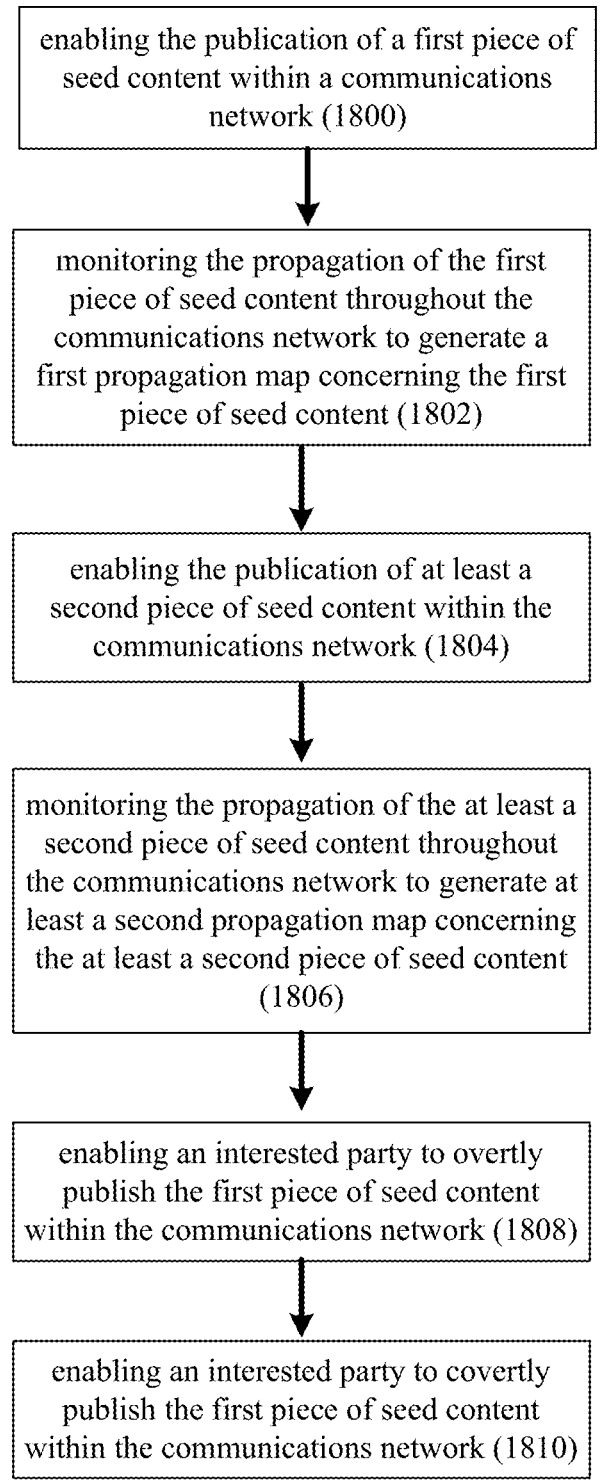
FIG. 19 is a flowchart of the information monitoring process of FIG. 1 according to an embodiment of the present disclosure.

17) Seeding Content to Track Propagation:

Referring also to FIG. 19 and as will be discussed below in greater detail, information monitoring process 10 may be configured to enable the publication of a first piece of seed content so that its propagation can be monitored throughout a communications network to generate a first propagation map concerning the first piece of seed content.

Specifically, information monitoring process 10 may enable 1800 the publication of a first piece of seed content (e.g., first piece of seed content 142) within a communications network (e.g., communications network 100). The first piece of seed content (e.g., first piece of seed content 142) may concern a first content category. For this example, assume that this first content category is general automobile information.

The first piece of content (e.g., first piece of seed content 142) may include one or more of: one or more image-based content; one or more audio-based content; one or more video-based content; one or more social media posts; one or more advertisements; one or more press releases; and one or more stories, all of which were discussed above.

As discussed above, the communications network (e.g., communications network 100) may include one or more of: one or more social media platforms; one or more websites; one or more video-sharing platforms; one or more virtual reality platforms; one or more gaming platforms; one or more messaging platforms; one or more financial platforms; and one or more blog platforms, all of which were described above.

Information monitoring process 10 may monitor 1802 the propagation of the first piece of seed content (e.g., first piece of seed content 142) throughout the communications network (e.g., communications network 100) to generate a first propagation map (e.g., first propagation map 144) concerning the first piece of seed content (e.g., first piece of seed content 142).

The first propagation map (e.g., first propagation map 144) may define a first content propagation pattern for content falling within the first content category (e.g., general automobile information).

Information monitoring process 10 may enable 1804 the publication of at least a second piece of seed content (e.g., second piece of seed content 146) within the communications network (e.g., communications network 100). The at least a second piece of seed content (e.g., second piece of seed content 146) may concern at least a second content category. For this example, assume that this second content category is general political information.

The at least a second piece of content (e.g., second piece of seed content 146) may include one or more of: one or more image-based content; one or more audio-based content; one or more video-based content; one or more social media posts; one or more advertisements; one or more press releases; and one or more stories, all of which were discussed above.

Information monitoring process 10 may monitor 1806 the propagation of the at least a second piece of seed content (e.g., second piece of seed content 146) throughout the communications network (e.g., communications network 100) to generate at least a second propagation map (e.g., second propagation map 148) concerning the at least a second piece of seed content (e.g., second piece of seed content 146).

The at least a second propagation map (e.g., second propagation map 148) may define at least a second content propagation pattern for content falling within the at least a second content category (e.g., general political information).

Accordingly and through the use of information monitoring process 10, a user may be able to see the manner in which content propagates differently throughout communications network (e.g., communications network 100) based upon what category the content falls into (e.g., automotive versus political).

Information monitoring process 10 may enable 1808 an interested party (e.g., interested party 86) to overtly publish the first piece of seed content (e.g., first piece of seed content 142) within the communications network (e.g., communications network 100) in the manner discussed above.

Information monitoring process 10 may enable 1810 an interested party (e.g., interested party 86) to covertly publish the first piece of seed content (e.g., first piece of seed content 142) within the communications network (e.g., communications network 100) in the manner discussed above.

Figure 20:
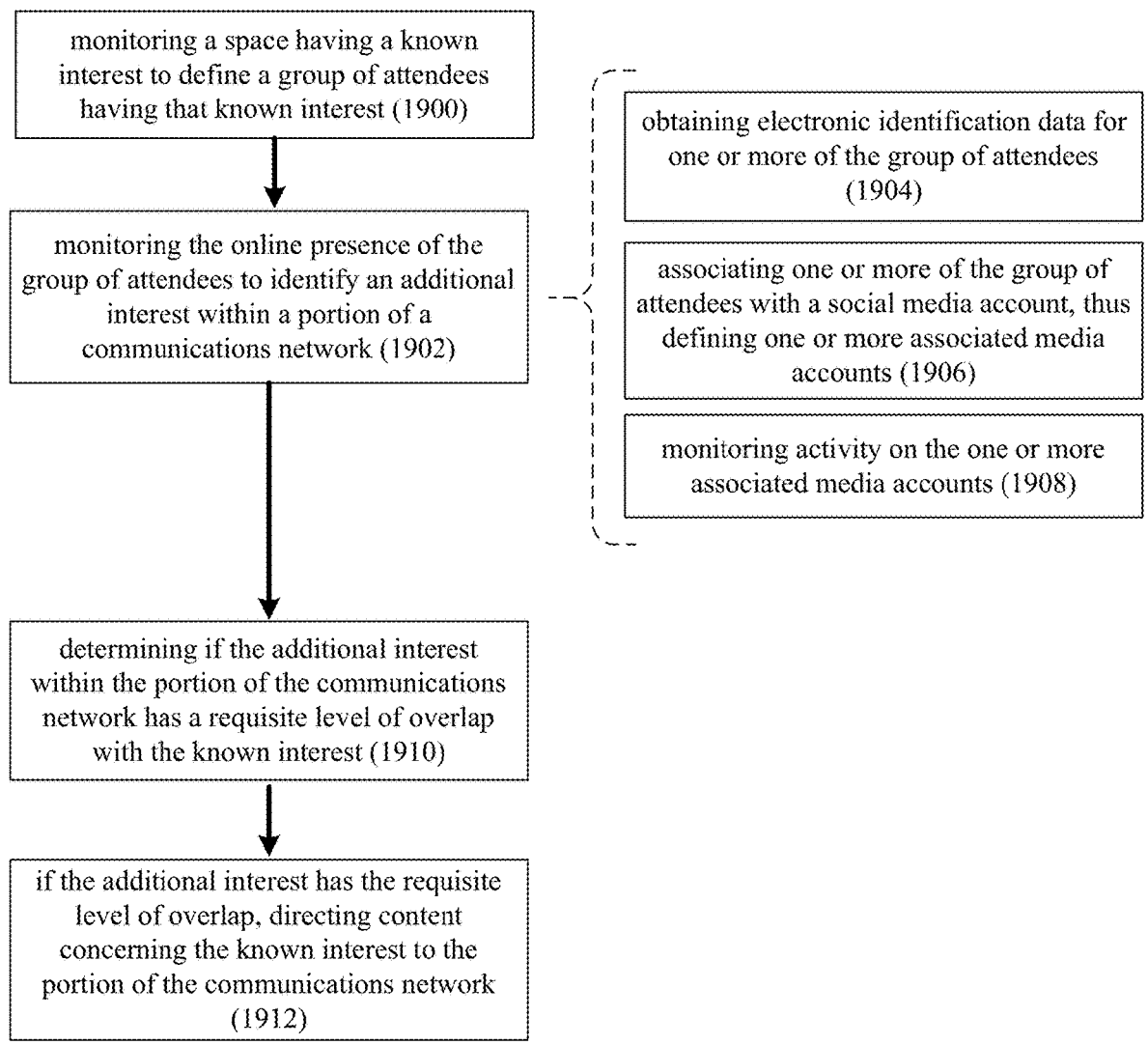
FIG. 20 is a flowchart of the information monitoring process of FIG. 1 according to an embodiment of the present disclosure.

18) Identifying Overlapping Interests:

Referring also to FIG. 20 and as will be discussed below in greater detail, information monitoring process 10 may be configured to monitor a space having a known interest to define a group of attendees having that known interest and monitor the online presence of the group of attendees to identify an additional interest within a portion of a communications network.

Specifically, information monitoring process 10 may monitor 1900 a space (e.g., space 88) having a known interest to define a group of attendees (e.g., individuals 134) having that known interest. The space (e.g., space 88) may be a physical space, wherein physical space may be associated with one or more of: sporting events; cultural festivals; religious pilgrimages; political events; social events; technology conferences; and pop culture conventions.

Sporting Events: Sporting events are organized competitions or games that bring athletes together to showcase their skills and compete for victory. These events cover a wide range of sports, from traditional ones like football, basketball, and soccer to niche sports and Olympic disciplines. Sporting events attract not only participants and fans but also sponsors, creating a vibrant atmosphere that fosters camaraderie, competition, and the celebration of athletic achievements.

Cultural Festivals: Cultural festivals are events that celebrate and showcase the rich diversity of traditions, arts, and heritage within a community or a specific cultural group. These festivals often feature a variety of activities, including performances, exhibitions, traditional ceremonies, and culinary experiences. Cultural festivals provide a platform for communities to express and share their unique identities, fostering understanding and appreciation among people from different backgrounds.

Religious Pilgrimages: Religious pilgrimages involve journeys to sacred or holy sites as an expression of faith and devotion. Pilgrims undertake these journeys for spiritual reasons, seeking a deeper connection with their religious beliefs. Pilgrimages can be individual or collective, and they often involve rituals, prayers, and ceremonies at significant religious landmarks. These journeys hold immense cultural and spiritual significance, contributing to the religious identity of communities and fostering a sense of unity among believers.

Political Events: Political events encompass gatherings, rallies, debates, and conferences that focus on political issues, policies, and ideologies. These events serve as platforms for political leaders to connect with their constituents, share their visions, and discuss critical matters. Political events play a crucial role in shaping public opinion, mobilizing support, and providing a forum for the exchange of ideas in the political arena.

Social Events: Social events cover a broad spectrum of gatherings that bring people together for various purposes, such as celebrations, parties, weddings, and reunions. These events contribute to social cohesion, offering opportunities for individuals to connect, build relationships, and share experiences. Whether formal or informal, social events play a vital role in strengthening community bonds and creating memorable moments.

Technology Conferences: Technology conferences are events that bring together professionals, experts, and enthusiasts from the technology industry to discuss, showcase, and explore the latest advancements, trends, and innovations. These conferences often feature keynote speakers, workshops, and product exhibitions, providing a platform for networking and knowledge exchange. Technology conferences play a pivotal role in shaping the future of the industry and fostering collaboration among individuals and organizations.

Pop Culture Conventions: Pop culture conventions are events that celebrate various aspects of popular culture, including movies, TV shows, comics, gaming, and more. Attendees often dress up in costumes, participate in panel discussions, meet celebrities, and engage in activities related to their favorite fandoms. These conventions, such as Comic-Con and fan expos, create immersive environments where fans can share their passion for pop culture and connect with like-minded individuals.

The known interest of the group of attendees (e.g., individuals 134) may be based upon the space (e.g., space 88), wherein: the known interest of attendees (e.g., individuals 134) of sporting events is sports; the known interest of attendees (e.g., individuals 134) of cultural festivals is culture; the known interest of attendees (e.g., individuals 134) of religious pilgrimages is religion; the known interest of the attendees (e.g., individuals 134) of political events is politics; the known interest of the attendees (e.g., individuals 134) of social events is socializing; the known interest of the attendees (e.g., individuals 134) of technology conferences is technology; and the known interest of the attendees (e.g., individuals 134) of pop culture conventions is pop culture.

Alternatively, the space (e.g., space 88) may be a virtual space. In the realm of the internet, a virtual space refers to a digital environment that is created and accessed online, devoid of physical existence. These spaces take various forms, including websites and web pages where information is presented and shared. Virtual worlds offer immersive computer-generated environments for users to interact, spanning online multiplayer games, social virtual platforms, and virtual reality environments. Social media platforms serve as virtual spaces facilitating connections, content sharing, and communication. Online forums and communities create digital environments for discussions among individuals with shared interests. Digital marketplaces, cloud storage services, and collaboration platforms establish virtual spaces for activities such as e-commerce, file sharing, and collaborative work. Additionally, virtual museums, educational platforms, and various other online spaces contribute to the diverse landscape of digital experiences, enabling users to engage and interact without physical constraints. Overall, virtual spaces on the internet play a crucial role in fostering connections, collaboration, and exploration in the digital realm.

For this example, assume that the group of attendees (e.g., individuals 134) are attendees of Minnesota Twins baseball games. Accordingly, the known interest of the group of attendees (e.g., individuals 134) is baseball (generally) and the Minnesota Twins (specifically).

As will be discussed below in greater detail, information monitoring process 10 may monitor 1902 the online presence of the group of attendees (e.g., individuals 134) to identify an additional interest within a portion of a communications network (e.g., communications network 100). As discussed above, the portion of the communications network (e.g., communications network 100) may include one or more of: one or more social media platforms; one or more websites; one or more video-sharing platforms; one or more virtual reality platforms; one or more gaming platforms; one or more messaging platforms; one or more financial platforms; and one or more blog platforms, all of which were discussed above.

When monitoring 1902 the online presence of the group of attendees (e.g., individuals 134) to identify an additional interest within a portion of a communications network (e.g., communications network 100), information monitoring process 10 may obtain 1904 electronic identification data (e.g., electronic identification data 60) for one or more of the group of attendees (e.g., individuals 134). And through the use of such electronic identification data 60, information monitoring process 10 may locate/identify one or more of the group of attendees (e.g., individuals 134), which may be accomplished via various methodologies (as described above).

When monitoring 1902 the online presence of the group of attendees (e.g., individuals 134) to identify an additional interest within a portion of a communications network (e.g., communications network 100), information monitoring process 10 may:
- associate 1906 one or more of the group of attendees (e.g., individuals 134) with a social media account, thus defining one or more associated media accounts (e.g., associated media accounts 150); and
- monitor 1908 activity on the one or more associated media accounts (e.g., associated media accounts 150). This may be accomplished by reviewing the accessible media (e.g., accessible media 114) associated with the associated media accounts (e.g., associated media accounts 150).

For this example, assume that by monitoring 1902 the online presence of the group of attendees (e.g., individuals 134), information monitoring process 10 identifies an additional interest for the group of attendees (e.g., individuals 134), as 53% of the group of attendees (e.g., individuals 134) also like (i.e., have interest in) the Minnesota Vikings.

Information monitoring process 10 may determine 1910 if the additional interest (i.e., the Minnesota Vikings) within the portion of the communications network (e.g., communications network 100) has a requisite level of overlap with the known interest (i.e., the Minnesota Twins). For example, the requisite level of overlap with the known interest may be a defined percentage of overlap. Assume that this defined percentage of overlap is 50%. As the actual overlap is 53%, assume that information monitoring process 10 determines 1910 that the additional interest (i.e., the Minnesota Vikings) has the requisite level of overlap with the known interest (i.e., the Minnesota Twins).

If the additional interest (i.e., the Minnesota Vikings) has the requisite level of overlap, information monitoring process 10 may direct 1912 content (e.g., directed content 152) concerning the known interest (i.e., the Minnesota Twins) to the portion of the communications network (e.g., communications network 100).

The content (e.g., directed content 152) concerning the known interest (i.e., the Minnesota Twins) directed to the portion of the communications network (e.g., communications network 100) may include one or more of: one or more image-based content; one or more audio-based content; one or more video-based content; one or more social media posts; one or more advertisements; one or more press releases; and one or more stories, all of which were described above.

Accordingly, information monitoring process 10 may direct 1912 directed content (e.g., directed content 152) concerning the known interest (i.e., the Minnesota Twins) to the portion of the communications network (e.g., communications network 100) associated with the group of attendees (e.g., individuals 134).

Figure 21:
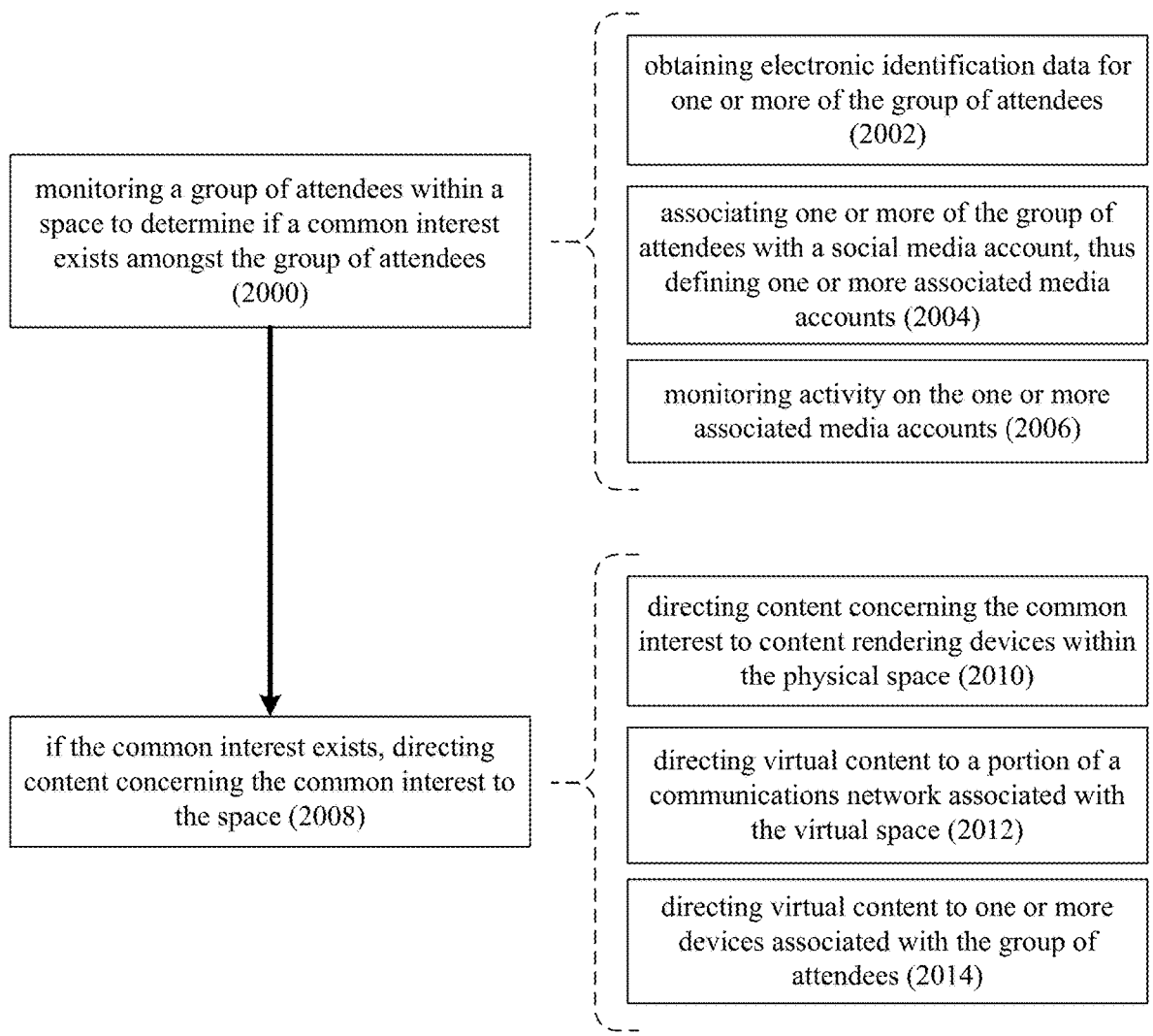
FIG. 21 is a flowchart of the information monitoring process of FIG. 1 according to an embodiment of the present disclosure.

19) Targeting Interests:

Referring also to FIG. 21 and as will be discussed below in greater detail, information monitoring process 10 may be configured to monitor a group of attendees within a space to determine if a common interest exists amongst the group of attendees and directing content concerning the common interest to the space (if the common interest exists).

Specifically, information monitoring process 10 may monitor 2000 a group of attendees (e.g., individuals 134) within a space (e.g., space 88) to determine if a common interest exists amongst the group of attendees (e.g., individuals 134).

The space (e.g., space 88) may be a physical space, wherein the physical space may be associated with one or more of: sporting events; cultural festivals; religious pilgrimages; political events; social events; technology conferences; and pop culture conventions.
- Sporting Events: Sporting events are organized competitions or games that bring athletes together to showcase their skills and compete for victory. These events cover a wide range of sports, from traditional ones like football, basketball, and soccer to niche sports and Olympic disciplines. Sporting events attract not only participants and fans but also sponsors, creating a vibrant atmosphere that fosters camaraderie, competition, and the celebration of athletic achievements.
- Cultural Festivals: Cultural festivals are events that celebrate and showcase the rich diversity of traditions, arts, and heritage within a community or a specific cultural group. These festivals often feature a variety of activities, including performances, exhibitions, traditional ceremonies, and culinary experiences. Cultural festivals provide a platform for communities to express and share their unique identities, fostering understanding and appreciation among people from different backgrounds.

Religious Pilgrimages: Religious pilgrimages involve journeys to sacred or holy sites as an expression of faith and devotion. Pilgrims undertake these journeys for spiritual reasons, seeking a deeper connection with their religious beliefs. Pilgrimages can be individual or collective, and they often involve rituals, prayers, and ceremonies at significant religious landmarks. These journeys hold immense cultural and spiritual significance, contributing to the religious identity of communities and fostering a sense of unity among believers.

Political Events: Political events encompass gatherings, rallies, debates, and conferences that focus on political issues, policies, and ideologies. These events serve as platforms for political leaders to connect with their constituents, share their visions, and discuss critical matters. Political events play a crucial role in shaping public opinion, mobilizing support, and providing a forum for the exchange of ideas in the political arena.

Social Events: Social events cover a broad spectrum of gatherings that bring people together for various purposes, such as celebrations, parties, weddings, and reunions. These events contribute to social cohesion, offering opportunities for individuals to connect, build relationships, and share experiences. Whether formal or informal, social events play a vital role in strengthening community bonds and creating memorable moments.

Technology Conferences: Technology conferences are events that bring together professionals, experts, and enthusiasts from the technology industry to discuss, showcase, and explore the latest advancements, trends, and innovations. These conferences often feature keynote speakers, workshops, and product exhibitions, providing a platform for networking and knowledge exchange. Technology conferences play a pivotal role in shaping the future of the industry and fostering collaboration among individuals and organizations.

Pop Culture Conventions: Pop culture conventions are events that celebrate various aspects of popular culture, including movies, TV shows, comics, gaming, and more. Attendees often dress up in costumes, participate in panel discussions, meet celebrities, and engage in activities related to their favorite fandoms. These conventions, such as Comic-Con and fan expos, create immersive environments where fans can share their passion for pop culture and connect with like-minded individuals.

Alternatively, the space (e.g., space 88) may be a virtual space. As discussed above and in the realm of the internet, a virtual space refers to a digital environment that is created and accessed online, devoid of physical existence. These spaces take various forms, including websites and web pages where information is presented and shared. Virtual worlds offer immersive computer-generated environments for users to interact, spanning online multiplayer games, social virtual platforms, and virtual reality environments. Social media platforms serve as virtual spaces facilitating connections, content sharing, and communication. Online forums and communities create digital environments for discussions among individuals with shared interests. Digital marketplaces, cloud storage services, and collaboration platforms establish virtual spaces for activities such as e-commerce, file sharing, and collaborative work. Additionally, virtual museums, educational platforms, and various other online spaces contribute to the diverse landscape of digital experiences, enabling users to engage and interact without physical constraints. Overall, virtual spaces on the internet play a crucial role in fostering connections, collaboration, and exploration in the digital realm.

For this example, assume that the group of attendees (e.g., individuals 134) are attendees of the Minneapolis Auto Show.

When monitoring 2000 a group of attendees (e.g., individuals 134) within a space (e.g., space 88) to determine if a common interest exists amongst the group of attendees (e.g., individuals 134), information monitoring process 10 may obtain 2002 electronic identification data (e.g., electronic identification data 60) for one or more of the group of attendees (e.g., individuals 134). And through the use of such electronic identification data 60, information monitoring process 10 may locate/identify one or more of the group of attendees (e.g., individuals 134), which may be accomplished via various methodologies (as described above).

When monitoring 2000 a group of attendees (e.g., individuals 134) within a space (e.g., space 88) to determine if a common interest exists amongst the group of attendees (e.g., individuals 134), information monitoring process 10 may:

associate 2004 one or more of the group of attendees (e.g., individuals 134) with a social media account, thus defining one or more associated media accounts (e.g., associated media accounts 150); and monitor 2006 activity on the one or more associated media accounts (e.g., associated media accounts 150). This may be accomplished by reviewing the accessible media (e.g., accessible media 114) associated with the associated media accounts (e.g., associated media accounts 150).

For this example, assume that by monitoring 2000 the group of attendees (e.g., individuals 134) within the space (e.g., space 88) to determine if a common interest exists amongst the group of attendees (e.g., individuals 134), information monitoring process 10 identifies a common interest for the group of attendees (e.g., individuals 134), as 62% of the group of attendees (e.g., individuals 134) like (i.e., have a common interest in) the Minnesota Vikings.

If a common interest exists, information monitoring process 10 may direct 2008 content (e.g., directed content 152) concerning the common interest (e.g., the Minnesota Vikings) to the space (e.g., space 88).

When directing 2008 content (e.g., directed content 152) concerning the common interest (e.g., the Minnesota Vikings) to the space (e.g., space 88), information monitoring process 10 may direct 2010 content (e.g., directed content 152) concerning the common interest (e.g., the Minnesota Vikings) to content rendering devices within the physical space (e.g., space 88). For example, information monitoring process 10 may direct 2010 directed content 152 (e.g., Minnesota Vikings advertisements) for rendering on display screens (not shown) within space 88 (e.g., the physical space housing the Minneapolis Auto Show).

When directing 2008 content (e.g., directed content 152) concerning the common interest to the space (e.g., space 88), information monitoring process 10 may direct 2012 virtual content (e.g., directed content 152) to a portion of a communications network (e.g., communications network 100) associated with the virtual space (e.g., space 88). For example, if the space was a virtual space (e.g., a virtual auto show) as opposed to a physical space, information monitoring process 10 may direct 2012 directed content 152 (e.g., Minnesota Vikings advertisements) for rendering within the virtual space (e.g., space 88).

As discussed above, the portion of a communications network (e.g., communications network 100) may include one or more of: one or more social media platforms; one or more websites; one or more video-sharing platforms; one or more virtual reality platforms; one or more gaming platforms; one or more messaging platforms; one or more financial platforms; and one or more blog platforms, all of which were described above.

Accordingly and when directing 2008 content (e.g., directed content 152) concerning the common interest (e.g., the Minnesota Vikings) to the space (e.g., space 88), information monitoring process 10 may direct 2014 virtual content (e.g., directed content 152) to one or more devices associated with the group of attendees (e.g., individuals 134). For example, information monitoring process 10 may direct 2014 directed content 152 (e.g., Minnesota Vikings advertisements) for rendering on handheld electronic devices (e.g., cell phones, not shown) associated with the group of attendees (e.g., individuals 134).

Figure 22:
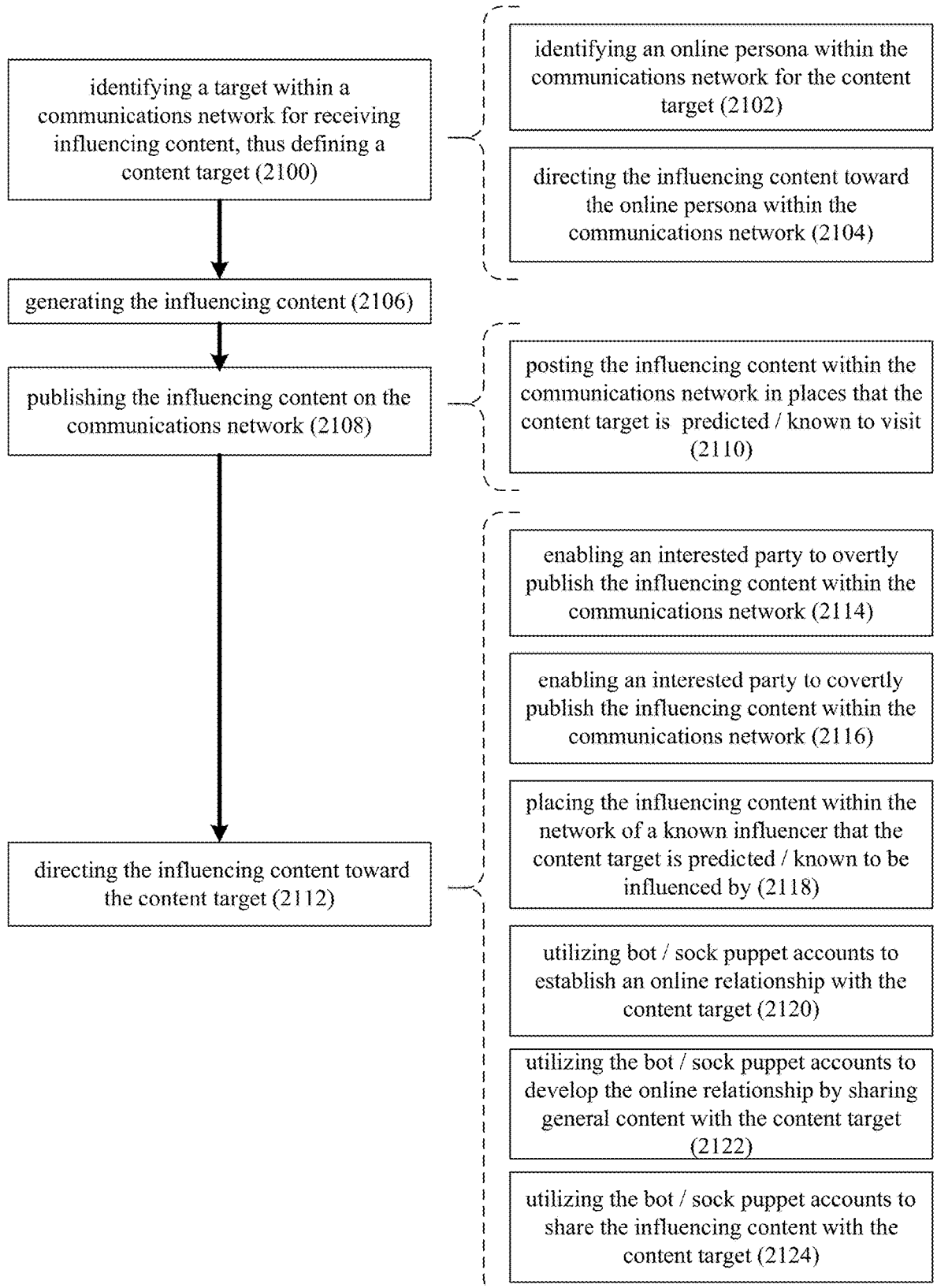
FIG. 22 is a flowchart of the information monitoring process of FIG. 1 according to an embodiment of the present disclosure.

20) Influencing a Target:

Referring also to FIG. 22 and as will be discussed below in greater detail, information monitoring process 10 may be configured to identify a target within a communications network for receiving influencing content (thus defining a content target), generating/publishing the same, and directing the influencing content toward the content target.

Specifically, information monitoring process 10 may identify 2100 a target within a communications network (e.g., communications network 100) for receiving influencing content (e.g., influencing content 118), thus defining a content target (e.g., target 154), As discussed above, the communications network (e.g., communications network 100) may include one or more of: one or more social media platforms; one or more websites; one or more video-sharing platforms; one or more virtual reality platforms; one or more gaming platforms; one or more messaging platforms; one or more financial platforms; and one or more blog platforms, all of which were discussed above.

The influencing content (e.g., influencing content 118) may include one or more of: one or more image-based content; one or more audio-based content; one or more video-based content; one or more social media posts; one or more advertisements; one or more press releases; and one or more stories, each of which was discussed above.

The content target (e.g., target 154) may be one or more of: a politician; an influencer; and a corporate executive.

Politician: A politician is an individual who is actively involved in politics, typically as a representative, leader, or decision-maker within a government or political organization. Politicians may hold elected or appointed positions at various levels of government, such as local, regional, or national. Their responsibilities include formulating policies, making laws, representing the interests of their constituents, and participating in political debates and negotiations.

Influencer: An influencer is a person who has the ability to affect the opinions, behaviors, or purchasing decisions of others due to their authority, expertise, or presence in a particular field or on social media platforms. Influencers often have a significant following on social media channels, such as Instagram, YouTube, or Twitter. They may specialize in various niches, including lifestyle, fashion, beauty, technology, or any other area where their recommendations and endorsements can influence their audience.

Corporate Executive: A corporate executive, or business executive, is a high-ranking professional within a corporation or business organization. Executives are responsible for strategic decision-making, leadership, and overall management of the company. Titles for corporate executives can include Chief Executive Officer (CEO), Chief Financial Officer (CFO), Chief Operating Officer (COO), and others. Their duties involve setting organizational goals, formulating and implementing business strategies, overseeing day-to-day operations, and ensuring the company's success and profitability.

Assume for this example that the content target (e.g., target 154) is Politician X, who (as discussed above) supports Position 3.

When identifying 2100 a target (e.g., target 154) within a communications network (e.g., communications network 100) for receiving influencing content (e.g., influencing content 118), information monitoring process 10 may identify 2102 an online persona within the communications network (e.g., communications network 100) for the content target (e.g., target 154). For this example, assume that the online persona for the content target (e.g., target 154) is @Politician_X.

When identifying 2100 a target (e.g., target 154) within a communications network (e.g., communications network 100) for receiving influencing content (e.g., influencing content 118), information monitoring process 10 may direct 2104 the influencing content (e.g., influencing content 118) toward the online persona (e.g., @Politician_X) within the communications network (e.g., communications network 100).

Information monitoring process 10 may generate 2106 the influencing content (e.g., influencing content 118). Continuing with the above-stated example, assume that user 36 generates 2106 the influencing content (e.g., influencing content 118) which says "Did you see that Candidate X supports Position 3? Call him and explain that this is unacceptable!" Information monitoring process 10 may publish 2108 the influencing content (e.g., influencing content 118) on the communications network (e.g., communications network 100).

When publishing 2108 the influencing content (e.g., influencing content 118) on the communications network (e.g., communications network 100), information monitoring process 10 may post 2110 the influencing content (e.g., influencing content 118) within the communications network (e.g., communications network 100) in places that the content target (e.g., target 154) is predicted/known to visit. For example, information monitoring process 10 may post 2110 influencing content 118 within the communications network (e.g., communications network 100) in places that target 154 is predicted/known to visit, such as e.g., the home page (not shown) of target 154, the campaign website (not shown) of target 154, the fundraising page (not shown) of target 154, activist pages (not shown) aligned with target 154, activist pages (not shown) against target 154, townhall pages (not shown) visited by target 154, etc.

Information monitoring process 10 may direct 2112 the influencing content (e.g., influencing content 118) toward the content target (e.g., target 154).

For example and when directing 2112 the influencing content (e.g., influencing content 118) toward the content target (e.g., target 154): information monitoring process 10 may:
  enable 2114 an interested party to overtly publish the influencing content (e.g., influencing content 118) within the communications network (e.g., communications network 100), in the manner described above; and/or enable 2116 an interested party to covertly publish the influencing content (e.g., influencing content 118) within the communications network (e.g., communications network 100), in the manner described above.

When directing 2112 the influencing content (e.g., influencing content 118) toward the content target (e.g., target 154), information monitoring process 10 may place 2118 the influencing content (e.g., influencing content 118) within the network of a known influencer (e.g., influencer 156) that the content target (e.g., target 154) is predicted/known to be influenced by. For this example, influencer 156 may be a very popular political activist.

An influencer is an individual who possesses the capability to impact the opinions, decisions, and purchasing behaviors of a specific target audience, often within a particular niche or industry. These individuals typically have a substantial and engaged following on social media platforms like Instagram, YouTube, Twitter, or other online channels. Influencers establish a connection with their audience through authenticity, expertise, or *charisma*, and brands frequently collaborate with them to endorse products, services, or ideas. Influencers can be categorized into various groups, including micro-influencers with smaller but highly engaged and niche-specific followings, macro-influencers with larger, more diverse audiences, celebrities who extend their influence to social media, and industry experts recognized for their deep knowledge within a specific field. In creating content that resonates with their followers, influencers often focus on niches like lifestyle, fashion, beauty, travel, or fitness. Brands leverage influencer partnerships to connect with their target demographics in a more authentic and relatable manner compared to traditional advertising. The efficacy of influencer marketing hinges on the perceived authenticity and trustworthiness of the influencer. Followers value genuine recommendations and experiences, making influencer endorsements influential in shaping trends, promoting products, and influencing consumer behavior in the digital age. As the influencer landscape continues to evolve, these individuals play a crucial role in the dynamic interplay between brands and consumers.

When directing 2112 the influencing content (e.g., influencing content 118) toward the content target (e.g., target 154): information monitoring process 10 may:
  utilize 2020 bot/sock puppet accounts to establish an online relationship with the content target (e.g., target 154);
  utilize 2022 the bot/sock puppet accounts to develop the online relationship by sharing general content with the content target (e.g., target 154); and/or
  utilize 2024 the bot/sock puppet accounts to share the influencing content (e.g., influencing content 118) with the content target (e.g., target 154).

A bot, derived from "robot," is an automated program designed to execute tasks on the internet. Bots can serve various purposes, both legitimate and malicious, and in the context of social media and online platforms, a bot account is one operated by a computer program rather than a human. These automated accounts can be programmed to perform actions such as posting content, liking, sharing, or following other accounts. On the other hand, a sock puppet account is created and managed by a human user but is used to deceive others about the user's identity or motives. The term "sock puppet" is often metaphorically employed to describe an online identity created for deceptive purposes. While bot accounts operate through automation, sock puppet accounts involve a human operator utilizing a false identity or persona, typically to promote a specific agenda, defend oneself in online debates, or create a misleading impression of support or opposition. Both bot and sock puppet accounts can be employed to manipulate online discussions, spread misinformation, or amplify particular viewpoints, prompting online platforms to implement measures to detect and combat their presence and maintain the integrity of their user communities and discussions.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method executed on a computing device comprising:
    identifying a piece of content within a first content platform to be monitored for propagation; and
    determining a likelihood of propagation for the piece of content, wherein the likelihood of propagation concerns the piece of content propagating with respect to the first content platform, wherein determining the likelihood of propagation includes analyzing the language included within the piece of content, and wherein analyzing the language included within the piece of content includes vectorizing the piece of content and applying, using artificial intelligence/machine learning, one or more of sentiment analysis, emotion recognition, and contextual analysis to the piece of content.

2. The computer-implemented method of claim 1 wherein the first content platform includes one or more of:
    one or more social media platforms;
    one or more websites;
    one or more video-sharing platforms;
    one or more virtual reality platforms;
    one or more gaming platforms;
    one or more messaging platforms;
    one or more financial platforms; and
    one or more blog platforms.

3. The computer-implemented method of claim 1 wherein determining a likelihood of propagation for the piece of content includes one or more of:
    determining a likelihood that the piece of content will propagate within the first content platform; and
    determining a likelihood that the piece of content will propagate from the first content platform to other content platforms.

4. The computer-implemented method of claim 1 wherein determining a likelihood of propagation for the piece of content includes one or more of:
    utilizing a graph neural network and/or graph database to identify connections between parties; and
    defining telemetry data for the piece of content.

5. The computer-implemented method of claim 1 wherein determining a likelihood of propagation for the piece of content includes one or more of:
    determining a publisher of the piece of content;
    identifying what groups/subgroups the publisher of the piece of content belongs to;

identifying financial supporters/backers of the publisher of the piece of content;
determining if the publisher of the piece of content is included in a bad actor database;
determining a publication history for the publisher of the piece of content;
determining a notoriety status for the publisher of the piece of content;
determining an audience status for the publisher of the piece of content; and
determining an influence status for the publisher of the piece of content.

6. The computer-implemented method of claim 1 further comprising:
monitoring the propagation of the piece of content from the first content platform to other content platforms.

7. The computer-implemented method of claim 6 wherein the other content platforms include one or more of:
one or more social media platforms;
one or more websites;
one or more video-sharing platforms;
one or more virtual reality platforms;
one or more gaming platforms;
one or more messaging platforms;
one or more financial platforms; and
one or more blog platforms.

8. The computer-implemented method of claim 6 wherein monitoring the propagation of the piece of content from the first content platform to other content platforms includes:
temporally monitoring the propagation of the piece of content from the first content platform to other content platforms at intervals over a defined period of time.

9. The computer-implemented method of claim 6 wherein monitoring the propagation of the piece of content from the first content platform to other content platforms includes:
generally monitoring the propagation of the piece of content from the first content platform to other content platforms.

10. The computer-implemented method of claim 6 wherein monitoring the propagation of the piece of content from the first content platform to other content platforms includes:
specifically monitoring the propagation of the piece of content from the first content platform to other content platforms.

11. A computer program product residing on a computer readable medium having a plurality of instructions stored thereon which, when executed by a processor, cause the processor to perform operations comprising:
identifying a piece of content within a first content platform to be monitored for propagation; and
determining a likelihood of propagation for the piece of content, wherein the likelihood of propagation concerns the piece of content propagating with respect to the first content platform, wherein determining the likelihood of propagation includes analyzing the language included within the piece of content, and wherein analyzing the language included within the piece of content includes vectorizing the piece of content and applying, using artificial intelligence/machine learning, one or more of sentiment analysis, emotion recognition, and contextual analysis to the piece of content.

12. The computer program product of claim 11 wherein the first content platform includes one or more of:
one or more social media platforms;
one or more websites;
one or more video-sharing platforms;
one or more virtual reality platforms;
one or more gaming platforms;
one or more messaging platforms;
one or more financial platforms; and
one or more blog platforms.

13. The computer program product of claim 11 wherein determining a likelihood of propagation for the piece of content includes one or more of:
determining a likelihood that the piece of content will propagate within the first content platform; and
determining a likelihood that the piece of content will propagate from the first content platform to other content platforms.

14. The computer program product of claim 11 wherein determining a likelihood of propagation for the piece of content includes one or more of:
utilizing a graph neural network and/or graph database to identify connections between parties; and
defining telemetry data for the piece of content.

15. The computer program product of claim 11 wherein determining a likelihood of propagation for the piece of content includes one or more of:
determining a publisher of the piece of content;
identifying what groups/subgroups the publisher of the piece of content belongs to;
identifying financial supporters/backers of the publisher of the piece of content;
determining if the publisher of the piece of content is included in a bad actor database;
determining a publication history for the publisher of the piece of content;
determining a notoriety status for the publisher of the piece of content;
determining an audience status for the publisher of the piece of content; and
determining an influence status for the publisher of the piece of content.

16. The computer program product of claim 11 further comprising:
monitoring the propagation of the piece of content from the first content platform to other content platforms.

17. The computer program product of claim 16 wherein the other content platforms include one or more of:
one or more social media platforms;
one or more websites;
one or more video-sharing platforms;
one or more virtual reality platforms;
one or more gaming platforms;
one or more messaging platforms;
one or more financial platforms; and
one or more blog platforms.

18. The computer program product of claim 16 wherein monitoring the propagation of the piece of content from the first content platform to other content platforms includes:
temporally monitoring the propagation of the piece of content from the first content platform to other content platforms at intervals over a defined period of time.

19. The computer program product of claim 16 wherein monitoring the propagation of the piece of content from the first content platform to other content platforms includes:

generally monitoring the propagation of the piece of content from the first content platform to other content platforms.

20. The computer program product of claim 16 wherein monitoring the propagation of the piece of content from the first content platform to other content platforms includes:
specifically monitoring the propagation of the piece of content from the first content platform to other content platforms.

21. A computing system including a processor and memory configured to perform operations comprising:
identifying a piece of content within a first content platform to be monitored for propagation; and
determining a likelihood of propagation for the piece of content, wherein the likelihood of propagation concerns the piece of content propagating with respect to the first content platform, wherein determining the likelihood of propagation includes analyzing the language included within the piece of content, and wherein analyzing the language included within the piece of content includes vectorizing the piece of content and applying, using artificial intelligence/machine learning, one or more of sentiment analysis, emotion recognition, and contextual analysis to the piece of content.

22. The computing system of claim 21 wherein the first content platform includes one or more of:
one or more social media platforms;
one or more websites;
one or more video-sharing platforms;
one or more virtual reality platforms;
one or more gaming platforms;
one or more messaging platforms;
one or more financial platforms; and
one or more blog platforms.

23. The computing system of claim 21 wherein determining a likelihood of propagation for the piece of content includes one or more of:
determining a likelihood that the piece of content will propagate within the first content platform; and
determining a likelihood that the piece of content will propagate from the first content platform to other content platforms.

24. The computing system of claim 21 wherein determining a likelihood of propagation for the piece of content includes one or more of:
utilizing a graph neural network and/or graph database to identify connections between parties; and
defining telemetry data for the piece of content.

25. The computing system of claim 21 wherein determining a likelihood of propagation for the piece of content includes one or more of:
determining a publisher of the piece of content;
identifying what groups/subgroups the publisher of the piece of content belongs to;
identifying financial supporters/backers of the publisher of the piece of content;
determining if the publisher of the piece of content is included in a bad actor database;
determining a publication history for the publisher of the piece of content;
determining a notoriety status for the publisher of the piece of content;
determining an audience status for the publisher of the piece of content; and
determining an influence status for the publisher of the piece of content.

26. The computing system of claim 21 further comprising:
monitoring the propagation of the piece of content from the first content platform to other content platforms.

27. The computing system of claim 26 wherein the other content platforms include one or more of:
one or more social media platforms;
one or more websites;
one or more video-sharing platforms;
one or more virtual reality platforms;
one or more gaming platforms;
one or more messaging platforms;
one or more financial platforms; and
one or more blog platforms.

28. The computing system of claim 26 wherein monitoring the propagation of the piece of content from the first content platform to other content platforms includes:
temporally monitoring the propagation of the piece of content from the first content platform to other content platforms at intervals over a defined period of time.

29. The computing system of claim 26 wherein monitoring the propagation of the piece of content from the first content platform to other content platforms includes:
generally monitoring the propagation of the piece of content from the first content platform to other content platforms.

30. The computing system of claim 26 wherein monitoring the propagation of the piece of content from the first content platform to other content platforms includes:
specifically monitoring the propagation of the piece of content from the first content platform to other content platforms.

* * * * *